(12) United States Patent
Hosoya et al.

(10) Patent No.: US 8,508,409 B2
(45) Date of Patent: Aug. 13, 2013

(54) CONTROL METHOD OF WIRELESS COMMUNICATION SYSTEM, WIRELESS COMMUNICATION SYSTEM, ADJUSTMENT METHOD OF ARRAY WEIGHT VECTOR, AND WIRELESS COMMUNICATION DEVICE

(75) Inventors: Kenichi Hosoya, Tokyo (JP); Kenichi Maruhashi, Tokyo (JP); Naoyuki Orihashi, Tokyo (JP)

(73) Assignee: NEC Corporation, Tokyo (JP)

( * ) Notice: Subject to any disclaimer, the term of this patent is extended or adjusted under 35 U.S.C. 154(b) by 166 days.

(21) Appl. No.: 13/062,265

(22) PCT Filed: Oct. 16, 2009

(86) PCT No.: PCT/JP2009/005425
§ 371 (c)(1),
(2), (4) Date: Mar. 4, 2011

(87) PCT Pub. No.: WO2010/052835
PCT Pub. Date: May 14, 2010

(65) Prior Publication Data
US 2012/0119953 A1 May 17, 2012

(30) Foreign Application Priority Data

Nov. 4, 2008 (JP) .................................. 2008-282697
May 26, 2009 (JP) .................................. 2009-126804

(51) Int. Cl.
*H01Q 3/00* (2006.01)
*G01S 5/04* (2006.01)
(52) U.S. Cl.
USPC .......................................... 342/373; 342/443
(58) Field of Classification Search
USPC ................... 342/371–373, 443; 455/562.1
See application file for complete search history.

(56) References Cited

U.S. PATENT DOCUMENTS

2007/0205943 A1    9/2007   Nassiri-Toussi et al.

FOREIGN PATENT DOCUMENTS

| JP | 2000165959 A | 6/2000 |
| JP | 2000174536 A | 6/2000 |
| JP | 2001251233 A | 9/2001 |
| JP | 2002135032 A | 5/2002 |
| JP | 2005136862 A | 5/2005 |
| JP | 2006245986 A | 9/2006 |
| JP | 2007049754 A | 2/2007 |
| JP | 2008160532 A | 7/2008 |
| JP | 2008228013 A | 9/2008 |
| WO | 2008090836 A | 7/2008 |

OTHER PUBLICATIONS

International Search Report for PCT/JP2009/005425 mailed Nov. 24, 2009.

(Continued)

*Primary Examiner* — Dao Phan

(57) ABSTRACT

To suppress an adverse effect caused by side lobes of an antenna array when determining an AWV to be used in communication. A first communication device transmits/receives a training signal while scanning a beam pattern, and a second communication device receives/transmits the training signal with a fixed beam pattern. A primary DOD/DOA in the first communication device is determined based on the transmission/reception result of the training signal. Then, second round training is performed. In this point, the first communication device transmits/receives the training signal while scanning a beam pattern in a state where transmission to the primary DOD or reception from the primary DOA is restricted. A secondary DOD/DOA is determined based on the result of the second round training. An AWV corresponding to the primary DOD/DOA and an AWV corresponding to the secondary DOD/DOA are selectively used in communication between the first and second devices.

55 Claims, 30 Drawing Sheets

(56) References Cited

OTHER PUBLICATIONS

K. Maruhashi et al., "60-Ghz-band LTCC Module Technology for Wireless Gigabit Transceiver Applications", IEEE International Workshop on Radio-Frequency Integration Technology, Digest, Dec. 2005, pp. 131-134.

K. Ohata et al., "1.25Gbps Wireless Gigabit Ethernet Link at 60GHz-Band", IEEE MTT-S International Microwave Symposium, Digest, Jun. 2003, pp. 373-376.

J. F. Buckwalter et al., "An Integrated Subharmonic Coupled-Oscillator Scheme for a 60-GHz Phased-Array Transmitter", IEEE Transactions on Microwave Theory and Techniques, vol. 12. Dec. 2006, pp. 4271-4280.

S. Alalusi et al., "A 60GHz Phased Array in CMOS", IEEE 2006 Custom Integrated Circuits Conference, Digest, Sep. 2006, pp. 393-396.

I. Lakkis et al., "IEEE P802.15 Working Group for Wireless Personal Area Networks (WPANS): TG3c Call for Proposals", 15-08-0355-00-003c, May 2008.

K. Sato et al., "Channel model for millimeter-wave WPAN", The 18th Annual IEEE International Symposium on Personal, Indoor and Mobile Wireless communications (PIMRC'07), 2007.

A. Feuer et al., "Convergence Analysis of LMS Filters with Uncorrelated Gaussian Data", IEEE Transactions on Acoustics, Speech, and Signal Processing, vol. ASSP-33, No. 1, Feb. 1985, pp. 222-230.

N. K. Jablon et al., "Steady State Analysis of the Generated Sidelobe Canceller by Adaptive Noise Cancelling Techniques", IEEE Transactions on Antennas and Propagation, vol. AP-34, No. 3, Mar. 1986, pp. 330-377.

J. C. Lee et al., "Performance of Transform-Domain LMS Adaptive Digital Filters", IEEE Transactions on Acoustics, Speech, and Signal Processing, Vol. ASSP-34, No. 3, Jun. 1986, pp. 499-510.

CONTROL METHOD OF WIRELESS COMMUNICATION SYSTEM, WIRELESS COMMUNICATION SYSTEM, ADJUSTMENT METHOD OF ARRAY WEIGHT VECTOR, AND WIRELESS COMMUNICATION DEVICE

This application is the National Phase of PCT/JP2009/005425, filed Oct. 16, 2009 which is based upon and claims the benefit of priorities from Japanese patent application No. 2008-282697 filed on Nov. 4, 2008 and Japanese patent application No. 2009-126804 filed on May 26, 2009, the disclosures of which are incorporated herein in their entirety by reference.

TECHNICAL FIELD

The present invention relates to a system that performs wireless communication by adaptively controlling radio beams, and its control method.

BACKGROUND ART

In recent years, use of wireless devices using wideband millimeter waves (30 GHz to 300 GHz) has become increasingly widespread. The millimeter-wave radio technology has been expected to be used especially for high-rate wireless data communication in the order of gigabit such as wireless transmission of high-resolution images (for example, see Non-patent literatures 1, 2 and 3).

Millimeter waves, which have high frequencies, have a high rectilinear propagation property, and therefore it poses a problem in cases where wireless transmission is to be implemented indoors. In addition to the high rectilinear propagation property, millimeter waves are significantly attenuated by a human body or a similar object. Therefore, if a person stands between the transmitter and the receiver in a room or a similar circumstance, no unobstructed view can be obtained, thus making the transmission very difficult (shadowing problem). This problem results from the fact that the propagation environment has been changed because of the increase in the rectilinear propagation property of the radio waves, which results from the increase in the frequency. Therefore, this problem is not limited to the millimeter waveband (30 GHz and above). Although it is impossible to clearly specify the transition frequency at which the propagation environment of the radio waves changes, it has been believed to be around 10 GHz. Note that according to recommendations of the International Telecommunications Union ("Propagation data and prediction methods for the planning of indoor wireless communication systems and radio local area networks in the frequency range 900 MHz to 100 GHz," ITU-R, P. 1238-3, April, 2003), a power loss coefficient, which indicates the attenuation amount of a radio wave with respect to the propagation distance, is 22 for 60 GHz in an office, while it is 28 to 32 for 0.9 to 5.2 GHz. Considering that it is 20 in the case of free-space loss, the effects of scattering, diffraction, and the like are considered to be small for higher frequencies in the order of 60 GHz.

To solve the problem described above, Patent literature 2, for example, describes a system in which a plurality of transmission paths are provided by installing a plurality of receiving units in the receiving device, so that when one of the transmission paths between the transmitting device and the receiving units is shielded, the transmission is carried out by another transmission path(s).

Further, as another method for solving the problem, Patent literature 3 describes a contrivance to secure a plurality of transmission paths by installing reflectors on the walls and ceilings.

In the method described in Patent literature 2, it is very difficult to continue the communication when shielding occurs in the vicinity of the transmitting device or when all of the installed receiving units are shielded. Meanwhile, the method described in Patent literature 3 requires users to give particular consideration to the configuration. For example, the reflectors need to be installed with consideration given to the positions of the transmitter and the receiver.

However, recent studies on propagation properties of millimeter waves have found out that reflected waves could be utilized without intentionally installing reflectors. FIG. 27 shows a configuration of a system using a wide-angle antenna, and FIG. 28 shows an example of a delay profile of a system using a wide-angle antenna like the one shown in FIG. 27 when the system is used indoors. In the system using the wide-angle antennas shown in FIG. 27, the received power of the dominant wave, which is arrives faster than any other waves, is larger than that of any other waves as shown in FIG. 28. After that, although delayed waves such as the second and third waves arrive, the received power of these waves is smaller than that of the dominant wave. These second and third waves are waves reflected from the ceiling and the walls. This situation is remarkably different from the propagation environment of radio waves having a lower rectilinear propagation property, such as a 2.4 GHz band used in wireless LANs (Local Area Networks). In 2.4 GHz band, it is very difficult to clearly separate waves in their directions of Arrival (DOAs) because of the effects of diffraction and multiple reflections. In contrast to this, in the millimeter waves having a high rectilinear propagation property, although radio waves are relatively clearly distinguished in their DOAs, the number of delayed waves is limited and their received-signal levels are small.

Therefore, when the direct wave (dominant wave) is blocked, it is necessary to ensure a sufficient received-signal level at the receiver by pointing a narrow beam having a high directive gain to the DOA of a reflected wave as shown in FIGS. 26A and 26B in order to continue the transmission by using the reflected wave. However, in order to eliminate the necessity for the user to take the trouble in regard to the relative positions of the transmitter and receiver, and the like, a beam forming technique capable of dynamically controlling the direction of a narrow beam is indispensable.

In the beam forming, it is necessary to construct an antenna array. For millimeter waves having a short wavelength (e.g., 5 mm in the case of a frequency of 60 GHz), the antenna array can be implemented in a small area. Phase shifter arrays and oscillator arrays for use in such antenna arrays for millimeter waves have been developed (for example, see Non-patent literatures 3 and 4).

Further, as a technique for a different purpose from the beam forming using an antenna array, direction-of-arrival (DOA) estimation techniques have been known. The DOA estimation techniques are used in, for example, radars, sonars, and propagation environment measurements, and used for estimating DOAs and power of radio waves to be received at antenna arrays with high accuracy. For example, a beam former method has been known as an algorithm that can be used for such techniques.

When these DOA estimation techniques are used in propagation environment measurement with an installed radio wave source, an omni-antenna (nondirectional antenna) is often used as the radio wave source. Non-patent literature 6 shows an example of such a technique.

CITATION LIST

Patent Literature

Patent literature 1: International Patent Publication WO/2008/090836

Patent literature 2: Japanese Unexamined Patent Application Publication No. 2006-245986

Patent literature 3: Japanese Unexamined Patent Application Publication No. 2000-165959

Patent literature 4: United States Patent Publication No. 2007/0205943

Patent literature 5: Japanese Unexamined Patent Application Publication No. 2000-174536

Patent literature 6: Japanese Unexamined Patent Application Publication No. 2008-160532

Patent literature 7: Japanese Unexamined Patent Application Publication No. 2008-228013

Non Patent Literature

Non-patent literature 1: K. Maruhashi et al., "60-GHz-band LTCC Module Technology for Wireless Gigabit Transceiver Applications", IEEE International Workshop on Radio-Frequency Integration Technology, Digest, pp. 131-134, December, 2005. Non-patent literature 2: K. Ohata et al., "1.25 Gbps Wireless Gigabit Ethernet Link at 60-GHz-Band", IEEE MTT-S International Microwave Symposium, Digest, pp. 373-376, June 2003.

Non-patent literature 3: J. F. Buckwalter et al., "An Integrated Subharmonic Coupled-Oscillator Scheme for a 60-GHz Phased-Array Transmitter", IEEE Transactions on Microwave Theory and Techniques, Vol. 12, pp. 4271-4280, December 2006.

Non-patent literature 4: S. Alausi et al., "A 60 GHz Phased Array in CMOS", IEEE 2006 Custom Integrated Circuits Conference, Digest, pp. 393-396, San Jose, September 2006.

Non-patent literature 5: I. Lakkis et al., "IEEE P802.15 Working Group for Wireless Personal Area Networks (WPANS): TG3c Call for Proposals", 15-08-0355-00-003c, May 2008.

Non-patent literature 6: K. Sato et al., "Channel model for millimeter-wave WPAN", The 18th Annual IEEE International Symposium on Personal, Indoor and Mobile Wireless communications (PIMRC'07), 2007.

Non-patent literature 7: A. Feuer et al., "Convergence Analysis of LMS Filters with Uncorrelated Gaussian Data", IEEE Transactions on Acoustics, Speech, and Signal Processing, Vol. ASSP-33, No. 1, pp. 222-230, February 1985.

Non-patent literature 8: N. K. Jablon et al., "Steady State Analysis of the Generated Sidelobe Canceller by Adaptive Noise Cancelling Techniques", IEEE Transactions on Antennas and Propagation, Vol. AP-34, No. 3, pp. 330-337, March 1986.

Non-patent literature 9: J. C. Lee et al., "Performance of Transform-Domain LMS Adaptive Digital Filters", IEEE Transactions on Acoustics, Speech, and Signal Processing, Vol. ASSP-34, No. 3, pp. 499-510, June 1986.

SUMMARY OF INVENTION

Technical Problem

The present inventors have found that, when the direct wave is blocked and the radio transmission is to be continued by using a reflected wave in indoor millimeter-wave systems, the following problem arises.

When the wave to be used (direct wave, reflected wave) is switched, it is desirable to decrease the time during which the transmission is disconnected. Such reduction of the transmission-disconnected time becomes especially an important requirement, for example, in the transmission of non-compressed images for which real-time capability is required. Meanwhile, when a reflected wave is used, it is necessary to increase the reception strength by narrowing the antenna beam width and increasing the directive gain of the antenna.

However, the number of directions (the number of steps) in which the search needs to be performed increases as the beam width becomes narrower. Therefore, the time necessary to find and set the beam direction with which the incoming wave is effectively received becomes longer, and therefore transmission-disconnected time also becomes longer. Accordingly, it has been desired to develop a beam direction setting method that can shorten the transmission-disconnected time even in such situations. It should be noted that the use of a device capable of temporally storing data is impractical because a huge buffer memory is required when the transmission-disconnected time becomes longer.

FIG. 4 shows a configuration of a transceiver used in a beam forming. Note that circuits that are inessential for the explanation of the operation are omitted in the figure. It has M transmitting antennas and N receiving antennas. A transmitter 401 includes a transmitter circuit 403 to which external data is input. The output of the transmitter circuit 403 is branched into M signals, and they are input to the respective AWV (array weight vector) control circuits 404-1 to M. Each signal is changed either in its amplitude or in its phase, or both in its amplitude and in its phase, and eventually output through a transmitting antenna array composed of respective antenna elements 405-1 to M. Each of the AWV control circuits 404-1 to M can be implemented by, for example, series connection of an analog phase shifter and a variable-gain amplifier. In such a configuration, both the amplitude and phase of a signal are controlled in a continuous manner. Further, when the AWV control circuits 404-1 to M are implemented by digital phase shifters, only the phases of signals are controlled in a discrete manner. AWVs that are controlled by the AWV control circuits 404-1 to M are, in general, expressed as the following Formula (1):

$$\vec{W}=[w_1, w_2, \ldots, w_M]^T \quad (1)$$

where $w_1, w_2, \ldots, w_M$ are complex numbers and the superscript T indicates transposition. Further, when only the phases are controlled, Formula (1) can be expressed as the following Formula (2):

$$\vec{W}=[e^{j\theta_1}, e^{j\theta_2}, \ldots, e^{j\theta_M}]^T \quad (2)$$

where $\theta_1, \theta_2, \ldots, \theta_M$ are phase control amounts.

Further, a process/arithmetic circuit 406 provides instructions on the AWV setting of the AWV control circuits 404-1 to M through a control circuit 407. With the change in both or either of the amplitude and phase that is made to each signal, it is possible to control the direction, the width, and the like of the beam emitted from the transmitter.

Meanwhile, a receiver 402 has a reversed configuration with respect to the transmitter 401. Signals received by a receiving antenna array composed of antenna elements 411-1 to N are adjusted in both or either of amplitudes and phases in AWV control circuits 410-1 to N, and combined. Then, data is externally output through a receiver circuit 409. As in the case of the transmitter 401, a process/arithmetic circuit 406 controls both or either of the amplitude and phase of the AWV control circuits 410-1 to N.

FIG. 5 is a conceptual diagram of a wireless communication system composed of two transceivers (400 and 500) each having the configuration shown in FIG. 4. The transceiver 500 has K transmitting antennas and L receiving antennas.

Characteristics of a propagation path between two communication devices are expressed by a channel state information matrix. It has been known that if this channel state information matrix is determined, the optimal phase combination of the antenna array of the transceiver can be obtained by using SVD (Singular-Value Decomposition). However on the other hand, since SVD is complex and requires a long processing time, it is very difficult to implement SVD, for example, in a non-compressed image transmission apparatus in which high-rate processing is required.

Accordingly, Patent literature 4, for example, discloses a method for obtaining an optimal AWV with which the signal strength is maximized by adding a unitary matrix (e.g., Hadamard matrix) as phases of the antenna array and repeating the training of the antenna array of the transmitter and the training of the antenna array of the receiver. Although this method can reduce the processing time in comparison to SVD, it still requires a certain time to obtain the optimal AWV combination because the switching between the transmission and the reception needs to be repeatedly carried out.

Meanwhile, Non-patent literature 5 discloses a technique to optimize a transmitting/receiving beam direction by gradually increasing the beam resolution. However, this technique also requires measuring communication quality for a number of combinations of the transmitting/receiving beam directions by repeatedly carrying out the switching between the transmission and the reception, and thereby requiring a huge amount of time to obtain an optimal beam combination.

Further, Non-patent literature 5 also brings up an idea called "quasi-omni (quasi-nondirectional) pattern" as a beam having the lowest resolution. This quasi-omni pattern means a pattern having a constant antenna gain over a very wide angle in the space around the transceiver, though it is not a complete omni (nondirectional) pattern. Since it is often very difficult to obtain a complete omni pattern with millimeter-wave antenna arrays, this quasi-omni pattern is often used as a substitute in such cases.

In general, when a link is to be established at the initial stage, it would be acceptable if the acquisition of an optimal AWV combination requires a long time. However, in a case where a link needs to be re-established when disconnection of the transmission occurs in the previously-established link, it is necessary to search for another optimal AWV combination in a very short time. Further, in the case of multipoint communication, a faster search for an optimal AWV combination is also required because it requires re-establishment of a plurality of links.

In view of the above-described problems existing in the related art, the inventors of the present application have proposed a radio control method capable of reducing a time necessary to find and set a beam direction and thereby reducing transmission-disconnected times in another patent application filed in the past (Japanese Patent Application No. 2008-240156 filed on Sep. 19, 2008). Further, the inventors of the present application have also found out that when an AWV to be used in communication between communication devices is determined based on a transmission/reception result of a training signal, the presence of the side lobe of the antenna array could become an obstacle depending on the propagation environment and/or characteristics of the antenna array. Note that the adverse effect caused by the side lobe is not limited to the above-mentioned previous application (Japanese Patent Application No. 2008-240156). That is, in communication devices that perform wireless communication by performing beam forming, the adverse effect caused by the side lobe could become a widespread problem when an AWV to be used in the communication is determined based on a transmission/reception result of a training signal.

An exemplary object of the present invention is, in communication devices that perform wireless communication by performing beam forming, to provide a control method of a wireless communication system capable of suppressing the adverse effect caused by the side lobe of the antenna array when an AWV to be used in the communication is determined based on a transmission/reception result of a training signal, a wireless communication system, an adjustment method of an array weight vector, and a wireless communication device.

Solution to Problem

A first exemplary aspect of the invention relates to a control method of a wireless communication system including first and second communication devices. The first communication device includes an antenna array including a plurality of antenna elements, and an array weight vector (AWV) control circuit that changes at least one of amplitudes and phases of transmission signals or received signals of the plurality of antenna elements. The method includes following steps:
(a) transmitting a training signal between the first and second communication devices, the first communication device being configured to transmit or receive the training signal while scanning a beam pattern, and the second communication device being configured to receive or transmit the training signal with a fixed beam pattern;
(b) determining at least one primary direction of departure (DOD) or direction of arrival (DOA) in the first communication device based on a relation between a DODs or DOAs of the training signal in the first communication device and a received signal characteristic of the training signal in the first or the second communication device;
(c) transmitting the training signal again between the first and second communication devices, the first communication device being configured to transmit or receive the training signal while scanning a beam pattern in a state where signal emission toward the at least one primary DOD or signal reception from the at least one primary DOA is restricted, and the second communication device being configured to receive or transmit the training signal with a fixed beam pattern;
(d) determining at least one secondary DOD or DOA based on a relation between DODs or a DOAs of the training signal in the first communication device and a received signal characteristic of the training signal in the first or the second communication device obtained while restricting signal emission toward the at least one primary DOD or signal reception from the at least one primary DOA;
(e) obtaining at least one primary AWV each having a main beam direction or a sub-beam direction pointing to respective one of the at least one primary DOD or DOA and at least one secondary AWV each having a main beam direction or a sub-beam direction pointing to respective one of the at least one secondary DOD or DOA; and (f) selectively using the at least one primary AWV and the at least one secondary AWV in communication between the first and second communication devices.

A second exemplary aspect of the invention relates to a wireless communication system including first and second communication devices. The first communication device includes an antenna array including a plurality of antenna elements, and an array weight vector (AWV) control circuit that changes at least one of amplitudes and phases of transmission signals or received signals of the plurality of antenna elements. The first and second communication devices are configured to perform an AWV determination process in cooperation. The AWV determination process includes following steps:
(a) transmitting a training signal between the first and second communication devices, the first communication device being configured to transmit or receive the training signal while scanning a beam pattern, and the second communication device being configured to receive or transmit the training signal with a fixed beam pattern;
(b) determining at least one primary direction of departure (DOD) or direction of arrival (DOA) in the first communication device based on a relation between DODs or DOAs of the training signal in the first communication device and a received signal characteristic of the training signal in the first or the second communication device;
(c) transmitting the training signal again between the first and second communication devices, the first communication device being configured to transmit or receive the training signal while scanning a beam pattern in a state where signal emission toward the at least one primary DOD or signal reception from the at least one primary DOA is restricted, and the second communication device being configured to receive or transmit the training signal with a fixed beam pattern;
(d) determining at least one secondary DOD or DOA based on a relation between DODs or DOAs of the training signal in the first communication device and a received signal characteristic of the training signal in the first or the second communication device obtained while restricting signal emission toward the at least one primary DOD or signal reception from the at least one primary DOA;
(e) obtaining at least one primary AWV each having a main beam direction or a sub-beam direction pointing to respective one of the at least one primary DOD or DOA and at least one secondary AWV each having a main beam direction or a sub-beam direction pointing to respective one of the at least one secondary DOD or DOA; and
(f) selectively using the at least one primary AWV and the at least one secondary AWV in communication between the first and second communication devices.

A third exemplary aspect of the invention relates to an AWV adjustment method for a wireless communication device including an antenna array, and an array weight vector (hereinafter called "AWV") control circuit that changes at least one of amplitudes and phases of signals received by a plurality of antenna elements constituting the antenna array. The method includes following steps:
(a) receiving a training signal transmitted from a device to be communicated with while scanning a beam direction of the antenna array in the wireless communication device;
(b) determining at least one primary direction of arrival (hereinafter called "first DOA") based on a reception result of the training signal in the wireless communication device;
(c) receiving the training signal while scanning a beam direction of the antenna array in a state where signal reception from the first DOA is restricted in the wireless communication device;
(d) determining at least another direction of arrival (hereinafter called "second DOA") different from the first DOA in the wireless communication device based on a reception result of the training signal obtained while restricting signal reception from the first DOA;
(e) obtaining an AWV having a main beam direction or a sub-beam direction pointing to the first DOA and an AWV having a main beam direction or a sub-beam direction pointing to the second DOA; and
(f) using the AWV obtained in the step (e) in communication with the device to be communicated with.

A fourth exemplary aspect of the invention relates to a wireless communication device. The wires communication device includes an antenna array, an array weight vector (hereinafter called "AWV") control unit, a processing unit, and a receiving unit. The AWV control unit changes at least one of amplitudes and phases of signals received by a plurality of antenna elements constituting the antenna array. The processing unit determines an AWV to be used in communication with a device to be communicated with, and supplies the determined AWV to the AWV control unit. The receiving unit performs a demodulation process on a signal received by the antenna array.

Further, the processing unit is configured to perform following processes of:
(a) determining at least one primary direction of arrival (hereinafter called "first DOA") based on a reception result of a training signal being transmitted by the device to be communicated with and received by the receiving unit while scanning a beam direction of the antenna array;
(b) determining at least another direction of arrival (hereinafter called "second DOA") different from the first DOA based on a reception result of the training signal being received by the receiving unit while scanning a beam direction of the antenna array in a state where signal reception from the first DOA is restricted; and
(c) obtaining an AWV having a main beam direction or a sub-beam direction pointing to the first DOA and an AWV having a main beam direction or a sub-beam direction pointing to the second DOA in order to supply the obtained AWVs to the AWV control unit.

Advantageous Effects of Invention

In accordance with each of the above-described aspects of the invention, in communication devices that perform wireless communication by performing beam forming, a control method of a wireless communication system capable of suppressing the adverse effect caused by the side lobe of the antenna array when an AWV to be used in the communication is determined based on a transmission/reception result of a training signal, a wireless communication system, an adjustment method of an array weight vector, and a wireless communication device are provided.

DESCRIPTION OF EMBODIMENTS

Specific exemplary embodiments to which the present invention is applied are explained hereinafter in detail with reference to the drawings. The same signs are assigned to the same components throughout the drawings, and duplicate explanation is omitted as appropriate for clarifying the explanation.

First Exemplary Embodiment

Figure 5:
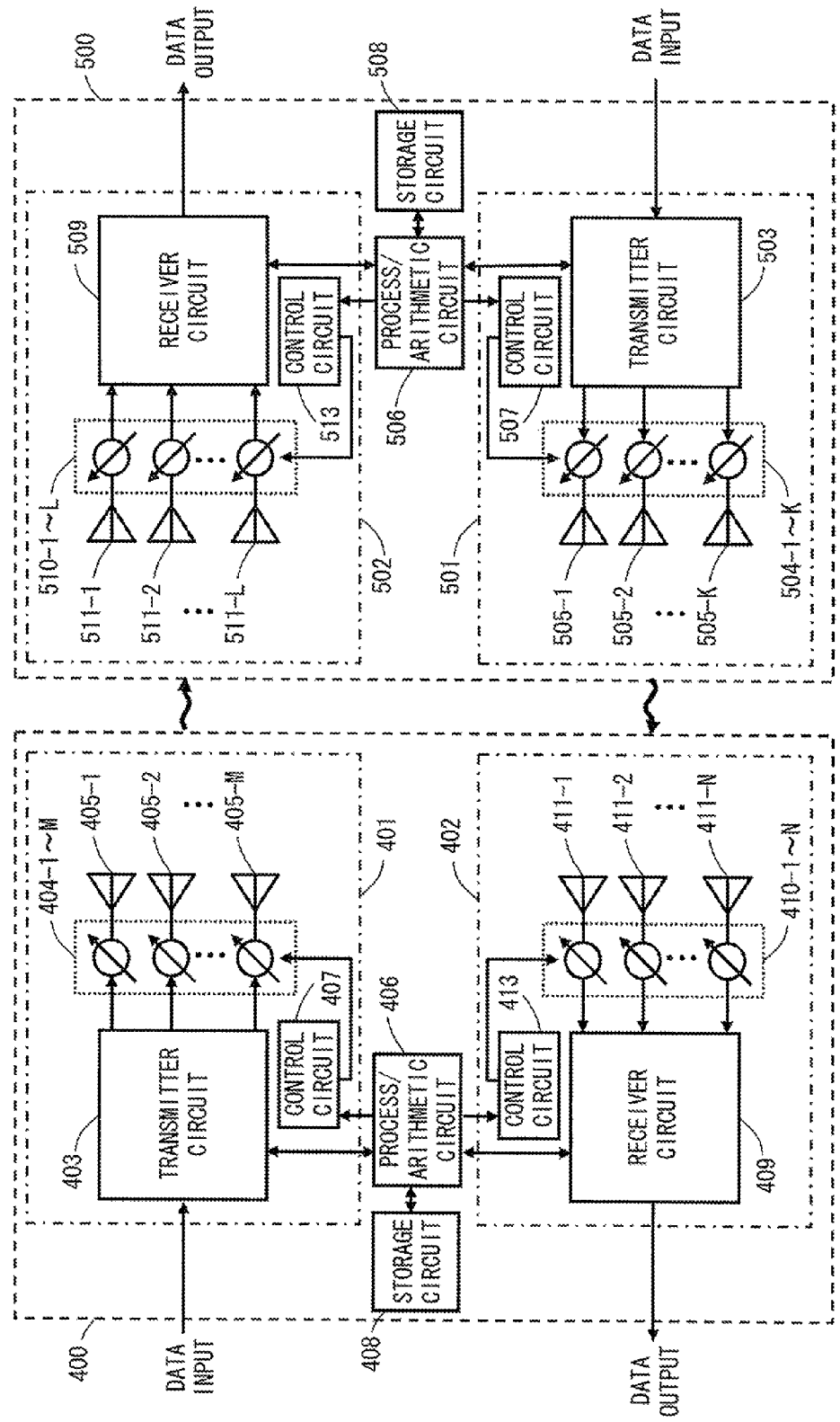
FIG. 5 a schematic view for illustrating a wireless communication system composed of two transceivers.

A first exemplary embodiment of the present invention is explained hereinafter with reference to a transition diagram shown in FIG. 1. It should be noted that a device configuration shown in FIG. 5, for example, can be used as the device configuration of the wireless communication system in accordance with this exemplary embodiment.

Figure 1:
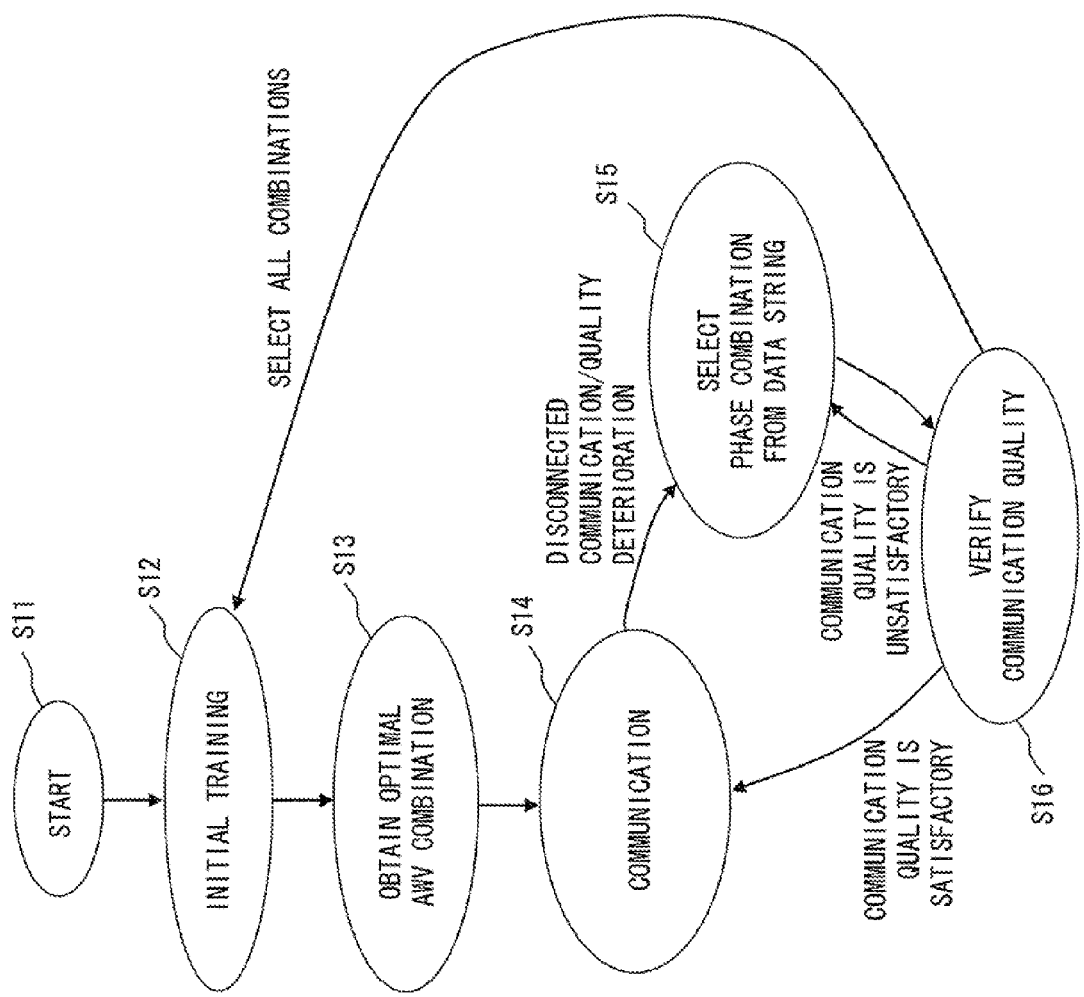
FIG. 1 shows transitions in radio control procedure in accordance with a first exemplary embodiment of the present invention.

In S12 in FIG. 1, transceivers 400 and 500 perform initial training to optimize AWV control circuits 404-1 to M, 410-1 to N, 504-1 to K, and 510-1 to L installed therein. In S13, candidate AWV combinations are calculated by a process/arithmetic circuit 406 or 506 or by cooperation of these two circuits. The calculation method for candidate AWV combinations in S13 will be explained later. The obtained candidate AWV combinations are stored as a data string in both or either of the storage circuits 408 and 508.

In S14, one of the candidate AWV combinations obtained in the state S13 is selected, and communication is performed by using the selected combination. The way of selecting an AWV combination is also explained later. The transceivers 400 and 500 monitor the communication state while the communication is continued. For example, when the transceiver 500 is operated in a receiving mode, this monitoring may be implemented by measuring the communication quality in the receiver circuit 509 or the process/arithmetic circuit 506. For example, communication quality such as a received-signal level, a Signal to Noise Ratio (SNR), a Bit Error Rate (BER), a Packet Error Rate (PER), and a Frame Error Rate (FER) may be measured. Meanwhile, the monitoring of a communication state in the transceiver 400, which is operated as a transmitter at this time, may be implemented by measuring a reception situation of a communication quality deterioration alert from the transceiver 500 or a reception situation of a reception confirmation response (ACK). It should be noted that since publicly-known common techniques may be used for the communication state monitoring technique, detailed explanation of the monitoring technique in this exemplary embodiment is omitted.

When deterioration in the communication quality such as disconnected communication is detected while the communication is continued, the transceivers 400 and 500 select another AWV combination from the data string stored in both or either of the storage circuits 408 and 508 (S15).

In S16, it is determined whether the quality of the communication using the newly selected AWV combination is satisfactory or not. In a case where the transceiver 500 is operated in a receiving mode, for example, the pass/fail of the communication quality is determined by measuring a received-signal level, an SNR, or the like at the receiver circuit 509 or the process/arithmetic circuit 506. When the communication quality is determined to be satisfactory in S16, the transceivers 400 and 500 return to the communication state (S14). On the other hand, when the communication quality is determined to be unsatisfactory in S16, the transceivers 400 and 500 change to the state S15 and select another AWV combination again.

If no AWV combination with which a satisfactory communication state is achieved is found from the AWV combinations stored in the storage circuits 408 and 508, the process returns to and repeats from the initial training.

Next, procedure for the initial training in S12 and procedure to obtain candidate AWV combinations in S13 shown in FIG. 1 are explained hereinafter.

Firstly, the transceiver 400 is operated in a transmitting mode, and its AWV is set so as to generate an omni or quasi-omni pattern. The AWV control method for generating a quasi-omni pattern will be described later with seventeenth to nineteenth exemplary embodiments of the present invention. The transceiver 400 transmits a training signal in that state. The training signal arrives at the transceiver 500 through a plurality of propagation paths.

At this point, the transceiver 500 is operated in a receiving mode. Further, the transceiver 500 operates its antenna array 511-1 to L, receiver circuit 509, control circuit 513, process/arithmetic circuit 506 in a connected manner so as to scan the main beam direction by changing the AWV of the antenna array, and to obtain a data string describing a relation between the DOA and the received power of a signal in the transceiver 500 performing the receiving operation. In the following explanation, a data string describing relations between the DOAs and received power of signals is called "angle profile". Control of an AWV and acquisition of an angle profile may be implemented by using commonly-known DOA estimation algorisms. The DOA estimation algorithms are used in radars, sonars, propagation environment measurements, and the likes, and there are various DOA algorithms. For example, a beam former method may be applied. Further, although an angle profile describing relations between DOAs and received power are obtained in the above-described example, the DOAs may be associated with any received-signal characteristic other than the received power. Examples of the received-signal characteristics other than received power include an SNR (Signal to Noise Ratio) and the like.

Figure 6:
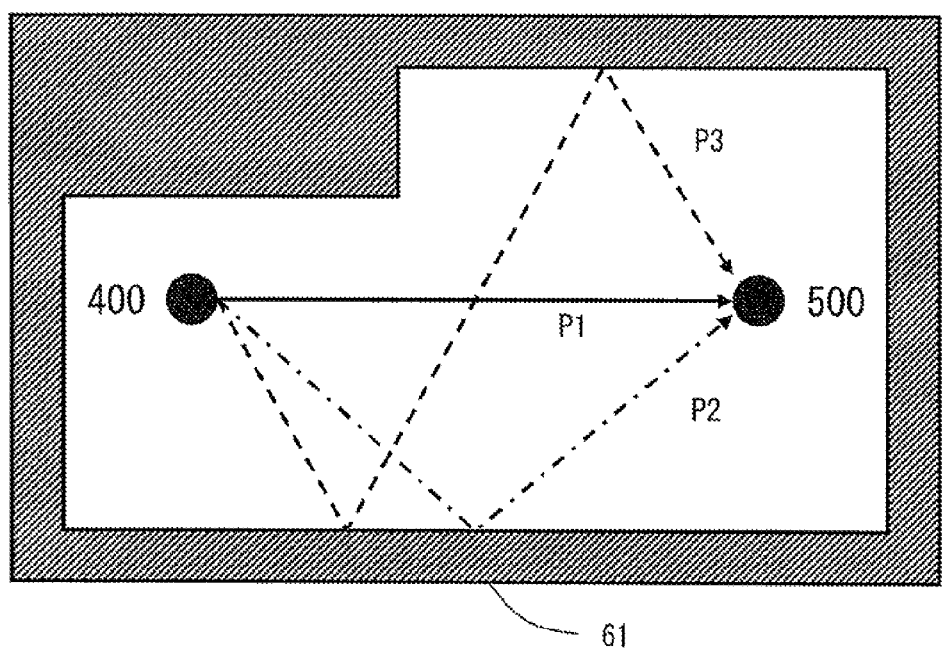
FIG. 6 is a plane view illustrating an example of propagation environment to which the present invention can be applied.

For example, assume a propagation environment shown in FIG. 6. In the example shown in FIG. 6, the transceivers 400 and 500 are disposed in a room (two dimensions) enclosed with a wall 61. Assume that there are three propagation paths P1 to P3 between the transceivers 400 and 500 as available paths for communication. By performing a DOA estimation algorithm, an angle profile indicating relations between received powers and DOAs like a schematic diagram shown in FIG. 7 can be obtained. By detecting peaks (three peaks in this example) of this profile, it is possible to detect the DOAs of the signal, i.e., directions of propagation paths available for the communication. Assume that priority orders are assigned to propagation paths or their directions (in practice, to AWVs) detected in this manner, for example, in the descending order of the received power, and that they are used for the communication one by one. The term "one by one" means to switch a propagation path having a higher priority order to another propagation path having the next priority order when the communication characteristics of the propagation path having the higher priority order is deteriorated by shielding or the like. The concept that a plurality of AWVs available for communication are prepared in advance and they are used one by one during actual communication is disclosed, for example, in Patent literatures 1 and 5. Further, a technique for ranking AWVs according to received power is disclosed, for example, in Patent literature 6.

Figure 7:
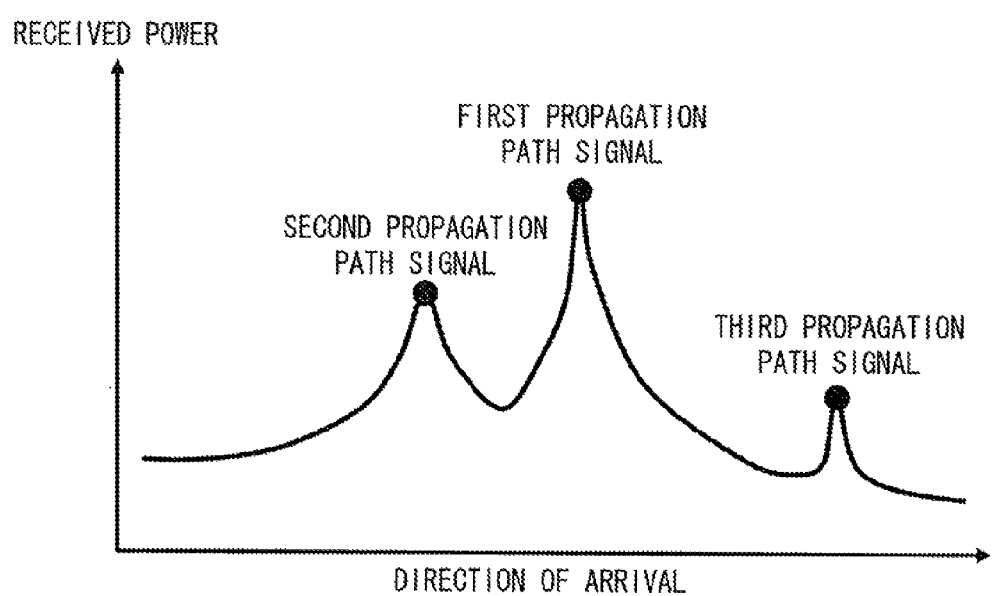
FIG. 7 is a schematic diagram showing an example of an angle profile obtained during control procedure in accordance with an exemplary aspect of the present invention.

Note that planar (two-dimensional) propagation environment as shown in FIG. 6 is assumed for simplifying the explanation, and therefore the horizontal axis in FIG. 7 indicates values in one dimension. It is also assumed that the antenna array has one dimension. However, the present invention can be also applied to other cases where a 2D (two-dimensional) antenna array is used in three-dimensional (3D) propagation environment. In such cases, the horizontal axis in FIG. 7 becomes a 2D array composed of two angles.

Figure 8:
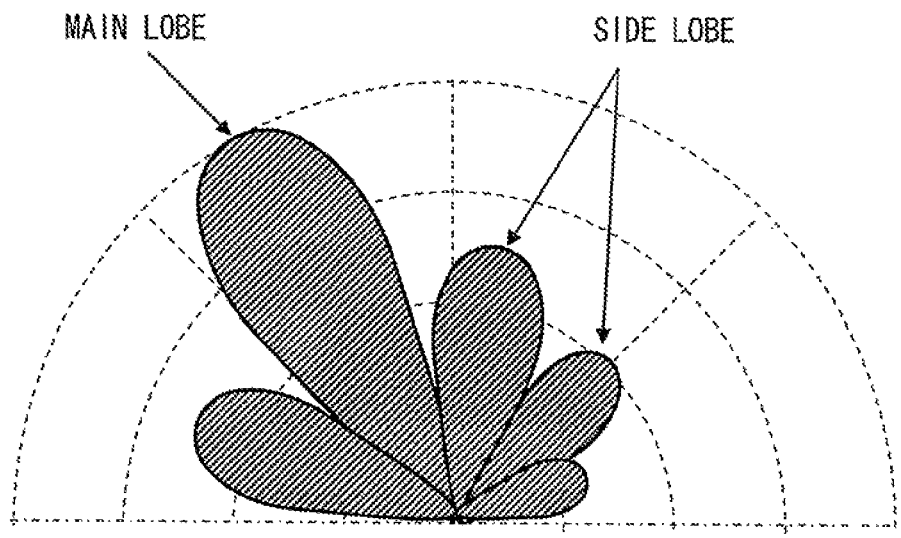
FIG. 8 is a schematic diagram for explaining a main lobe and side lobes in an antenna array.

The influence of the side lobes of an antenna array on the measurement accuracy of an angle profile is examined hereinafter. It has been stated in the above explanation that the main beam direction, i.e., main lobe is scanned by operating the transceiver 500 for reception. However, an actual antenna array has electric field radiation components called "side lobes" in addition to the main lobe. FIG. 8 schematically shows its aspect.

Figure 9:
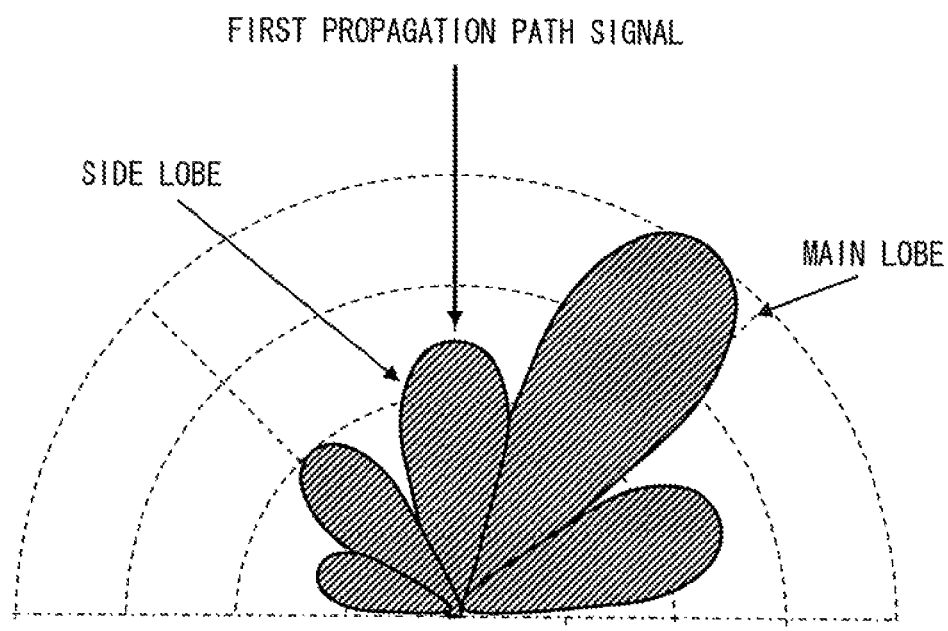
FIG. 9 is a schematic diagram for explaining the influence of side lobes.

As shown in FIG. 9, when a training signal is to be received while scanning the main lobe, a signal coming from a direction other than the main lobe direction (direction called "direction of arrival" regardless of the presence or absence of an arriving signal in FIG. 7) could be sometimes received by a side lobe. The signal received by the side lobe is combined with a signal received by the main lobe within the receiver circuit 509, and thereby affecting the received power (or other received-signal characteristics) to be measured. Since the way of influence depends on the phase difference between the signal received by the main lobe and the signal received by the side lobe, it does not necessarily become a simple addition. Although the above explanation is made by using reception as an example, a similar phenomenon also occurs in transmission. That is, when a side lobe of the transmitter points toward a propagation path direction, radiation from the side lobe reaches the receiver, and thereby affecting the received power (or other received-signal characteristics).

Figure 10:
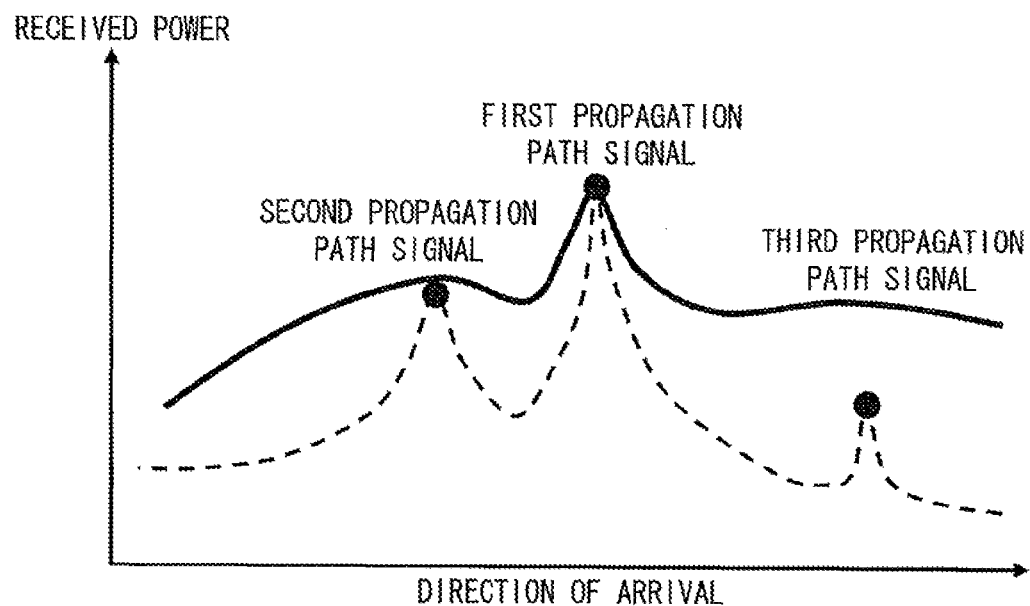
FIG. 10 is a schematic diagram for explaining a first influence exerted on an angle profile caused by the side lobe effects.

The effect of side lobe could affect the angle profile shown in FIG. 7 in two ways. The solid line in FIG. 10 schematically shows an aspect of a first effect. As shown by the solid line in the graph of FIG. 10, the angle profile could be blunted because the effect of a signal received by the side lobe could be piled up on the profile shown in FIG. 7 (which is illustrated by a broken line for comparison in the graph of FIG. 10). As a result, it could be very difficult to detect a relatively small peak in the received power.

Figure 11:
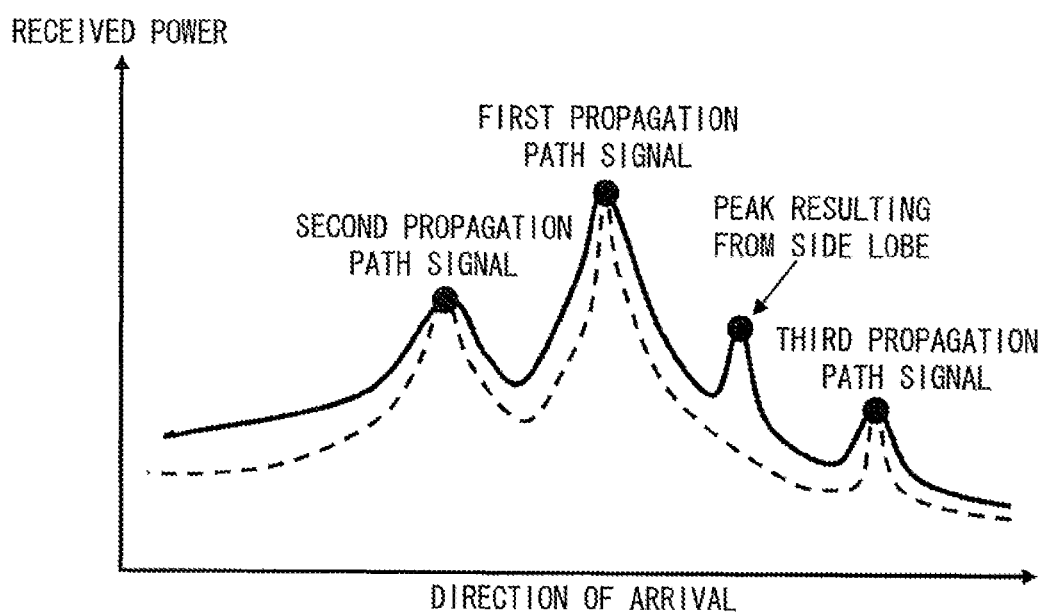
FIG. 11 is a schematic diagram for explaining a second influence exerted on an angle profile by the side lobe effects.

The solid line in FIG. 11 schematically shows an aspect of a second effect. Similarly to FIG. 10, the profile with no side lobe effect affecting thereon is shown by a broken line for comparison. There is a possibility that when a signal having large power (typically, a direct wave propagating through a propagation path having a high priority) is received by a side lobe having relatively large electric field strength, a peak resulting from the side lobe appears as shown in FIG. 11. The DOA corresponding to the peak resulting from the side lobe is the direction to which the main lobe points when the high-power signal is being received by the side lobe. That is, the DOA corresponding to the peak resulting from the side lobe is the direction from which no actual signal is arriving. By using the AWV setting of this state, it is possible to perform communication by using the side lobe instead of the main lobe. However, the propagation path that is actually used is a propagation path through which a high-power signal propagates (propagation path having a higher priority). Therefore, if the communication quality of the propagation path having a higher priority is deteriorated by shielding or the like, the communication quality in the AWV setting in which reception is performed by the side lobe will be also deteriorated at the same time. Therefore, the AWV setting in which reception is performed by the side lobe has little value as a reserve AWV setting.

Two phenomena that could appear in the angle profile due to the side lobe effect have been described above. The degree of appearance of these phenomena depends on characteristics of the antenna array and the propagation environments. Note that the characteristics of the antenna array mean a level difference between the main lobe and the side lobe, and the like. The propagation environment means, for example, a fact that the above-mentioned phenomenon tends to appear when the LOS (Line of Sight) propagation path component is outstandingly strong (received power is large). In such a case, it is expected that the detection of other NLOS (Non Line of Sight) propagation path components becomes difficult because of the blunted profile, and that the probability of peak appearances resulting from side lobes increases. In subsequent procedures explained below, these phenomena are taken into consideration.

Figure 12:
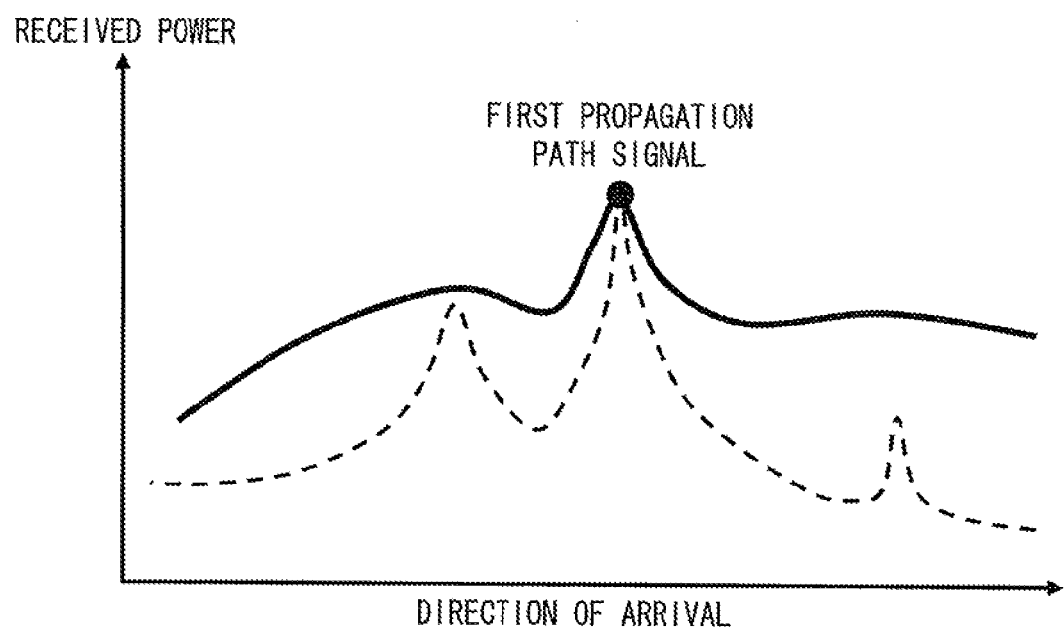
FIG. 12 is a schematic diagram showing an example of a first angle profile obtained in the process of a control procedure in accordance with an exemplary aspect of the present invention.

An angle profile obtained by the above-described procedure in which the main lobe direction is scanned by operating the transceiver 500 for reception is called "first angle profile". Assume an angle profile shown by the solid line in FIG. 12 as an example of a first angle profile in which the above-mentioned side lobe effect is taken into consideration. Note that the broken line in FIG. 12 is the ideal angle profile shown in FIG. 7. The process/arithmetic circuit 506 identifies only a signal having the maximum received power (or the optimal received-signal characteristic) by performing a peak search using the data string of the obtained first angle profile. In this example, the signal having the maximum received power is a signal that has propagated through a first propagation path P1. The DOA of this signal having the maximum received power is called "first DOA".

The transceiver 400 transmits again or successively transmits a training signal while maintaining its AWV in the setting for generating an omni or quasi-omni pattern. This training signal arrives at the transceiver 500 through a plurality of propagation paths.

Figure 13:
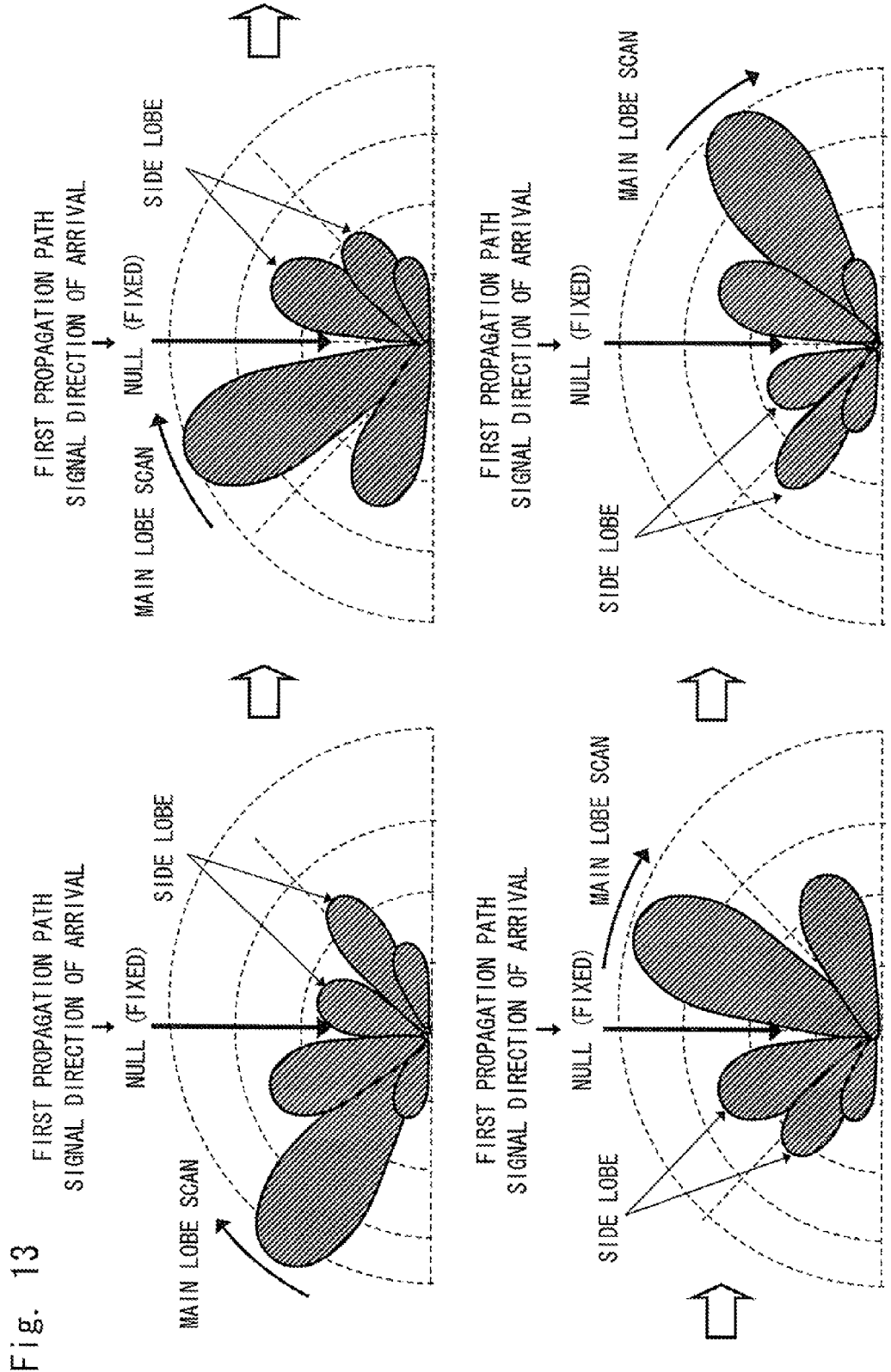
FIG. 13 is a schematic diagram for explaining a directional pattern when the scanning of a main lobe is performed with a fixed null point.

At this point, the transceiver 500 is operated again or continuously operated in a receiving mode, so that the transceiver 500 scans the main beam direction (main lobe direction) by changing the AWV of its antenna array and obtains a data string describing a relation between the DOAs and the received power of signals in the transceiver 500 performing the receiving operation. Note that at this point, the main beam direction (main lobe direction) is scanned while fixing the null point in the first DOA that was determined by using the previous scan result. In this way, a data string describing a relation between the DOAs and received power of signals in the transceiver 500 performing the receiving operation is obtained. The null point means a direction in which the electric field strength becomes very small in the directional characteristic of the antenna array. FIG. 13 schematically shows changes in the directional pattern in this state. It should preferably include a point at which the main beam scanning direction coincides with the first DOA or the vicinity thereof, and the null point should be preferably pointed toward that direction. Alternatively, it may be configured so that the main beam scanning is not performed in and around the first DOA. An angle profile that is obtained by scanning the main beam direction (main lobe direction) while fixing the null point in the first DOA is called "second angle profile". Note that the AWV control method for scanning the main beam direction (main lobe direction) while fixing the null point in the first DOA will be described later with eleventh to sixteenth exemplary embodiments of the present invention.

Figure 14:
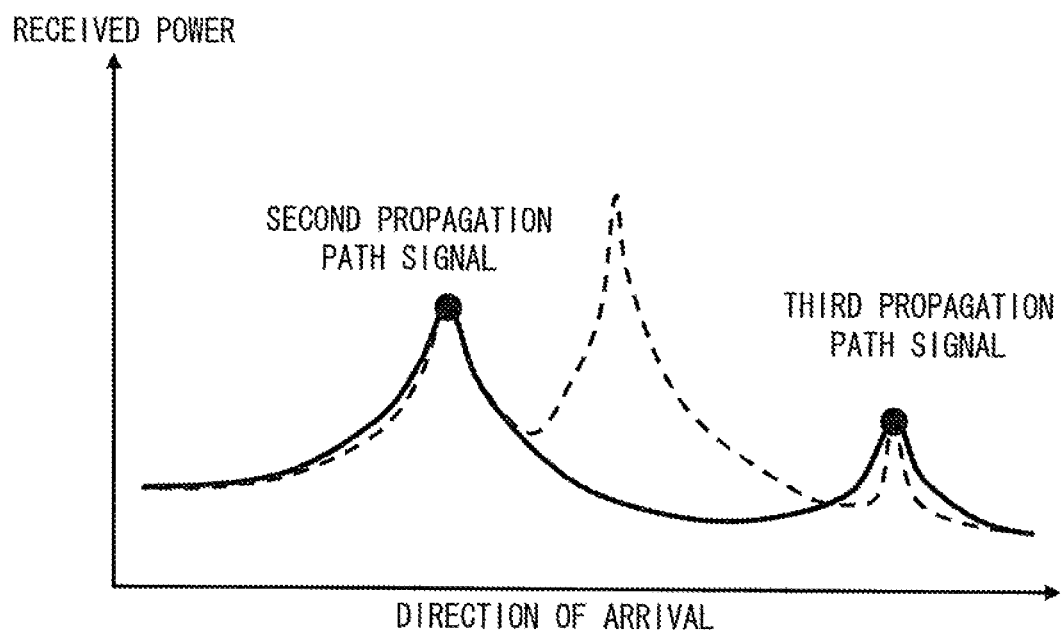
FIG. 14 is a schematic diagram showing an example of a second angle profile obtained in the process of a control procedure in accordance with an exemplary aspect of the present invention.

In the above-described main beam scanning performed to obtain the second angle profile, the null point is constantly pointed toward the first DOA, or the main beam scanning itself is omitted in the first DOA. Therefore, the peak in the maximum received power (first propagation path), which appears in the first angle profile, does not appear at all or is significantly suppressed. Further, the above-described two phenomena caused by the side lobe effect also do not appear at all or is significantly reduced. This is because since the null point is constantly pointed toward the signal on the first propagation path, which is the main cause of these two phenomena, that signal is not received by the side lobe. Therefore, a second profile shown by the solid line in FIG. 14 is obtained. In this second profile, the blunting at and around the signals on the second and third propagation paths is improved (suppressed) and no peaks that are caused by side lobes appear. Therefore, it becomes possible to detect peaks at the signals on the second and subsequent paths with high accuracy, and no peaks that are caused by side lobes are detected.

The process/arithmetic circuit 506 identifies signals in the order of the received power by performing a peak search again using the data string of the obtained second profile. Note that the identification process can be terminated at the point when a predetermined number of signals are identified. Note that Patent literature 7 states that after creating a database in which beam patterns are arranged according to the received power, a threshold is defined for the received power and only beam patterns exceeding the threshold are to be updated. Although it is the same in the concept that AWVs to be processed are limited to AWVs having received power larger than or equal to a certain value, its application and object are different.

Next, the process/arithmetic circuit 506 calculates AWVs that are used to point the main beam or a sub-beam to the DOAs of the respective signals, and stores these AWVs in the storage circuit 508 in the order of the received power. Note that the "respective signals" include both the first propagation path signal detected from the first angle profile and the signals on the second and subsequent propagation paths detected from the second angle profile. Further, in this process, both the AWVs for the AWV control circuits 510-1 to L of the receiver 502 and the AWVs for the AWV control circuits 504-1 to K of the transmitter 501 are calculated. When the transceiver 500 is operated in a receiving mode, the former is used, whereas when it is operated in a transmitting mode, the latter is used. Further, instead of newly calculating AWVs, AWVs with which the main beam or a sub-beam is pointed toward the corresponding DOA may be selected from among the AWVs that were used when the beam scan was performed.

Figure 15:
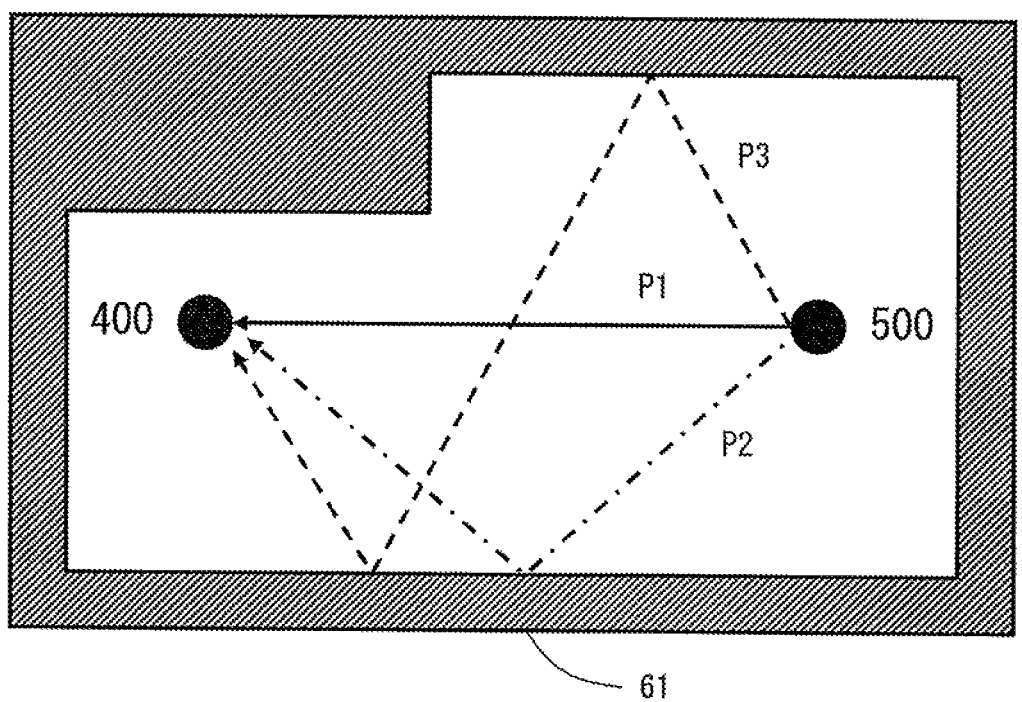
FIG. 15 is a plane view illustrating an example of propagation environment to which the present invention can be applied.

Next, the transceivers 400 and 500 alternate their roles, and similar processes are performed. That is, the transceiver 500 is operated in a transmitting mode, and its AWV is established so as to generate an omni or quasi-omni pattern. The transceiver 500 transmits a training signal in that state. The training signal arrives at the transceiver 400 through a plurality of propagation paths. Note that there are first to third propagation paths P1 to P3 as available paths for communication as shown in FIG. 15, and the directions of these propagation paths are opposite to those shown in FIG. 6.

Figure 16:
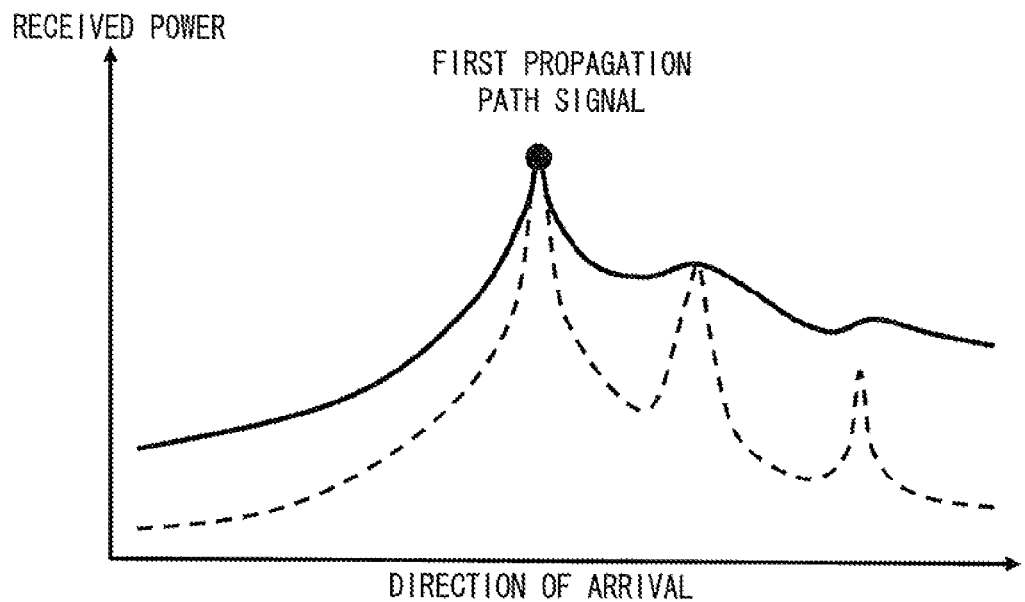
FIG. 16 is a graph showing an example of a first angle profile obtained during control procedure in accordance with an exemplary aspect of the present invention.

At this point, the transceiver 400 is operated in a receiving mode and performs main beam scanning by operating its antenna array 411-1 to L, receiver circuit 409, control circuit 413, process/arithmetic circuit 406 in a connected manner. As a result, a first angle profile shown by the solid-line in FIG. 16 can be obtained. Note that the broken line in FIG. 16 is an ideal angle profile that is not affected by the reception by the side lobe at all. The process/arithmetic circuit 406 specifies the DOA of the first propagation path signal by performing a peak search by using the first angle profile. Next, the transceiver 400 obtains a second angle profile as shown by the solid line in FIG. 17 by performing main bean scanning while fixing the null point in the specified first DOA.

The process/arithmetic circuit 406 identifies signals in the order of the received power by performing a peak search again using the data string of the obtained second profile. In this process, the identification process can be terminated at the point when a predetermined number of signals are identified. Next, the process/arithmetic circuit 406 calculates AWVs that are used to point the main beam or a sub-beam to the DOAs of the respective signals, and stores these AWVs in the storage circuit 408 in the order of the received power. Note that the "respective signals" include both the first propagation path signal detected from the first angle profile and the signals on the second and subsequent propagation paths detected from the second angle profile. Further, in this process, both the AWVs for the AWV control circuits 410-1 to N of the receiver 402 and the AWVs for the AWV control circuits 404-1 to M of the transmitter 401 are calculated. When the transceiver 400 is operated in a receiving mode, the former is used, whereas when it is operated in a transmitting mode, the latter is used. Further, instead of newly calculating AWVs, AWVs with which the main beams or a sub-beam is pointed toward the corresponding DOA may be selected from among the AWVs that were used when the beam scan was performed.

Figure 17:
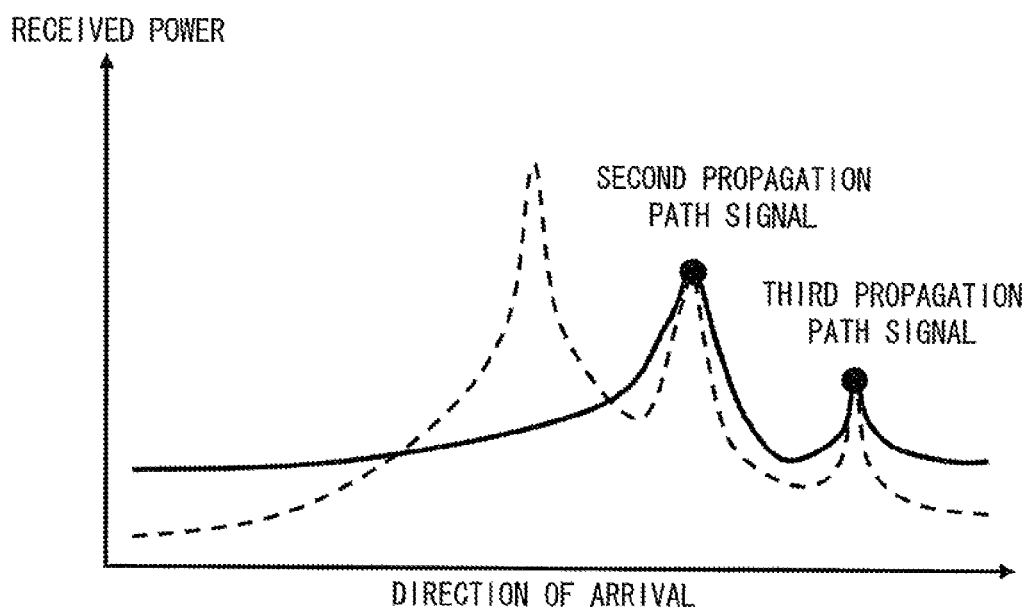
FIG. 17 is a graph showing an example of a second angle profile obtained in the process of a control procedure in accordance with an exemplary aspect of the present invention.

Note that, in general, there is no clear relation between the DOAs of the horizontal axes in FIGS. 12 and 14 and those in FIGS. 16 and 17. However, since three signals shown in FIGS. 12 and 14 and the corresponding three signals shown in FIGS. 16 and 17 propagate through the same paths in the opposite directions, the propagation losses are substantially equal to each other. Therefore, the relation of the magnitudes of their power is often maintained. Note that in this example, an assumption is made that the distance between the antenna array 405-1 to M of the transmitter 401 and the antenna array 411-1 to N of the receiver 402 in the transceiver 400 is negligible since it is considerably smaller compared to the distances of the propagation paths. Similarly, an assumption is also made that the distance between the antenna array 505-1 to K of the transmitter 501 and the antenna array 511-1 to L of the receiver 502 in the transceiver 500 is negligible since it is considerably smaller compared to the distances of the propagation paths. These assumptions are sufficiently satisfied in ordinary propagation environments. Further, the present invention is also applicable to transceivers having such a configuration that a common antenna array is used for both transmission and reception. In such configurations, the above-described assumption is unnecessary.

Each of the transceivers 400 and 500 selects an AWV at the same ranks from the AWVs stored in the storage circuits 408 and 508 in the above-described method, and then start communication (S13 and S14 in FIG. 1). At this point, when the transceiver 400 is operated in a transmitting mode, the AWV control circuits 404-1 to M of the transmitter 401 should be set with an AWV at a predetermined rank among the AWVs stored in the storage circuit 408. When the transceiver 400 is operated in a receiving mode, the AWV control circuits 410-1 to N of the receiver 402 should be set with an AWV at a predetermined rank among the AWVs stored in the storage circuit 408. A similar setting is made for the transceiver 500. Note that AWV combinations between the transceivers 400 and 500 are determined based on the received power order obtained at the time of training. As described previously, Patent literature 6, for example, discloses a way of ranking AWVs according to the received power. However, AWV combinations between the transceivers 400 and 500 are determined by using their respective received power order in this exemplary embodiment, and it is conceptually different from the technique disclosed in Patent literature 6.

Then, if the communication with the AWV combination that is selected at the early stage deteriorates, the transceivers 400 and 500 select another AWV combination at the same ranks from the AWVs stored in the storage circuits 408 and 508 (S15, FIG. 1), verify the communication quality (S16 in FIG. 1), and use that candidate when the communication quality is satisfactory (transition from S13 to S14). In the above processes, the selection of AWVs may be performed, for example, in the order in which the AWVs are stored, i.e., in the order of the received power obtained in the initial training.

Note that when the dependence of the antenna gain on the main beam direction (DOA) is too large to be ignored, a correction may be made to the above-mentioned first and second profiles by using the directional dependence of the antenna gain before carrying out the above-described operations.

Although the terms such as "data string" and "angle profile" are used in the above explanation, there are no particular restrictions on their aspects provided that they represent a relation between the DOA or DOD of the signal and the received-signal characteristic.

Figure 18A:
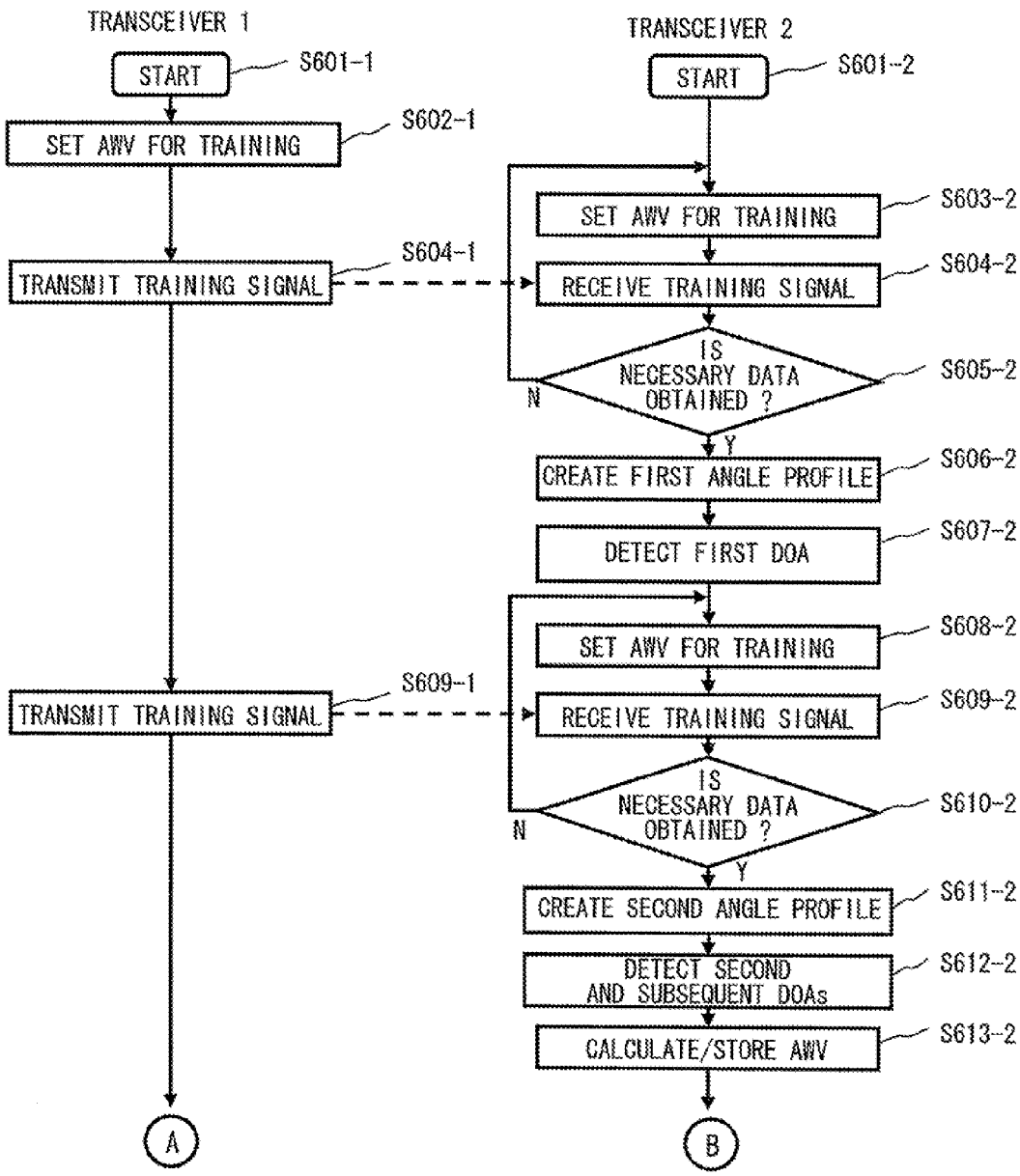
FIG. 18A is a sequence diagram illustrating operations of a transmitter and a receiver that are carried out before actual wireless communication in radio control procedure in accordance with a first exemplary embodiment of the present invention.
Figure 18B:
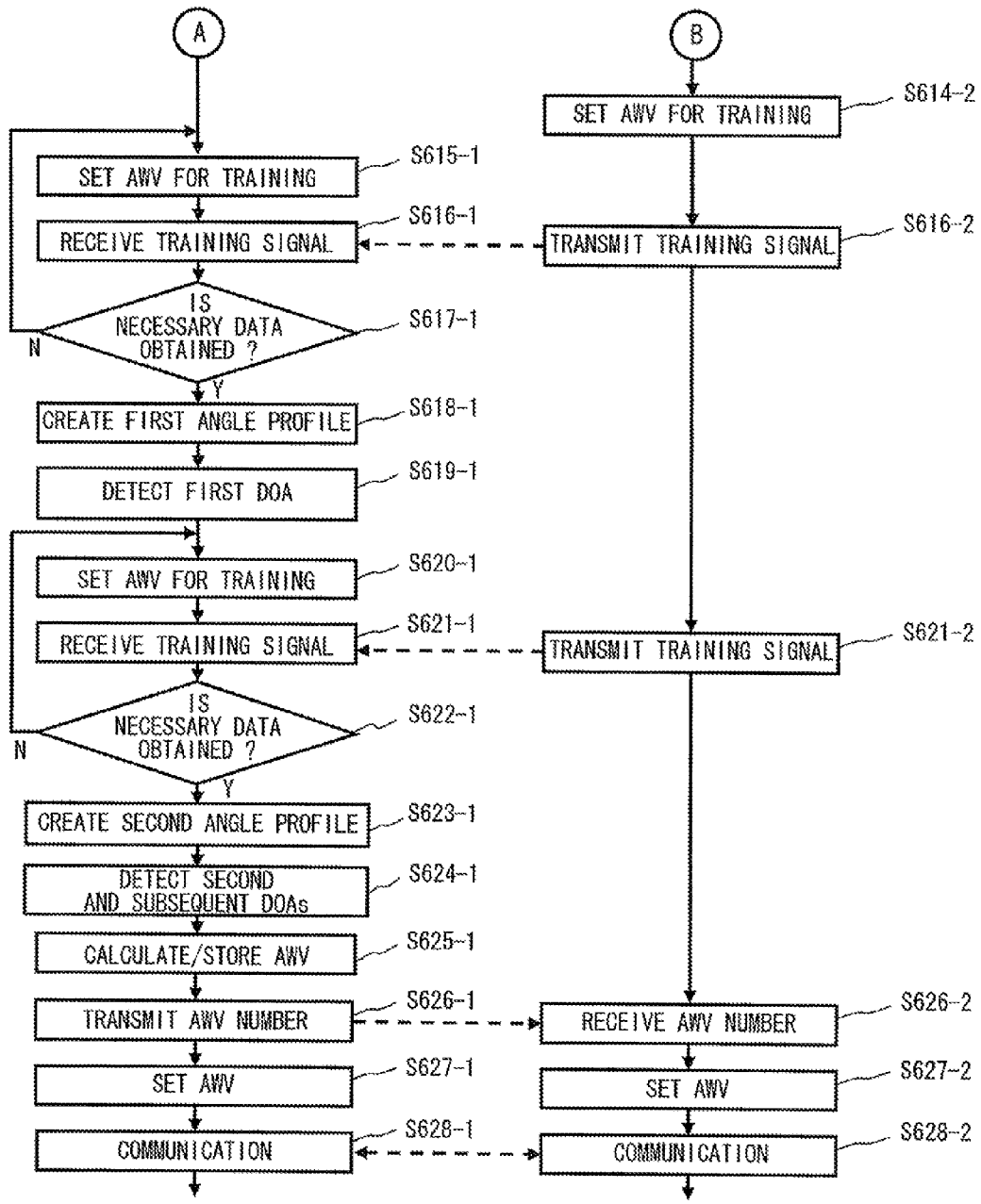
FIG. 18B is a sequence diagram illustrating operations of a transmitter and a receiver that are carried out before actual wireless communication in radio control procedure in accordance with a first exemplary embodiment of the present invention.

Next, operations of the transceivers 400 and 500 performed in the state transition processes shown in FIG. 1 are explained hereinafter in detail. FIGS. 18A and 18B are sequence diagrams illustrating operations of the transceivers 400 and 500 in the transition processes from S11 to S13 in FIG. 1, i.e., the processes from the initial training to the start of actual communication. When the transceiver 400 is operated in a transmitting mode and the transceiver 500 is operated in a receiving mode, the transceiver 400 transmits external input data to the transceiver 500 in the normal communication. Meanwhile, in the training, the process/arithmetic circuit 406 causes the transmitter circuit 403 to output a training signal. As a result, in the training, a training signal is transmitted from the transceiver 400 to the transceiver 500. Similar operations are also performed in a reversed case, i.e., a case where the transceiver 400 is operated in a receiving mode and the transceiver 500 is operated in a transmitting mode. For the sake of simplicity, the transceivers 400 and 500 are denoted as "transceiver 1" and "transceiver 2" respectively in FIGS. 18A to 24B.

Hereinafter, each step in the sequence diagram shown in FIGS. 18A and 18B is explained one by one. Firstly, the transceiver 400 (the transceiver 1 in FIGS. 18A and 18B) sets an AWV to a value for training, i.e., a value for generating an omni or quasi-omni pattern (S602-1), and transmits a training signal (S604-1). The transceiver 500 (the transceiver 2 in FIGS. 18A and 18B) repeatedly receives the training signal (S604-2) while changing the AWV (S603-2) until the signal reception is completed in all the predetermined AWV settings (S605-2).

Then, the transceiver 500 creates an angle profile (first angle profile), which is a data string indicating a relation between received power and DOAs of the received signals, from the measurement result of the received signals (S606-2). Next, the transceiver 500 identifies a signal having the maximum received power by performing a peak search by using the data string of the angle profile, and detects its DOA (first DOA) (S607-2).

The transceiver 400 (transceiver 1 of FIGS. 18A and 18B) transmits a training signal successively or again (S609-1). The transceiver 500 (the transceiver 2 of FIGS. 18A and 18B) repeatedly receives the training signal (S609-2) while changing the AWV (S608-2) until the signal reception is completed in all the predetermined AWV settings (S610-2). In this time, the AWV setting is performed in such a manner that the null point is fixed in the first DOA while scanning the main beam.

Then, the transceiver 500 creates an angle profile (second angle profile), which is a data string indicating a relation between received power and DOAs of the received signals, from the measurement result of the received signals (S611-2). Next, the transceiver 500 identifies signals in the order of the received power by performing peak searches using the data string of the second angle profile, and detects DOAs for the identified signals (S612-2). In this process, the identification process can be terminated at the point when a predetermined number of signals are identified. Then, the transceiver 500 calculates AWVs each having the main beam direction or a sub-beam direction pointing to respective one of the DOAs of the respective signals, and stores these AWVs in the order of the received power (S613-2).

Next, the roles of the transceivers 400 and 500 alternate their roles, and similar processes are performed. That is, the transceiver 500 sets an AWV to a value for training, i.e., a value for generating an omni or quasi-omni pattern (S614-2), and transmits a training signal (S616-2). The transceiver 400 repeatedly receives the training signal (S616-1) while changing the AWV (S615-1) until signal reception is completed in all the predetermined AWV settings (S617-1). Then, the transceiver 400 creates a first angle profile, which is a data strings indicating a relation between received power and DOAs of the received signals, from the measurement result of the received signal (S618-1). Next, the transceiver 400 identifies a signal having the maximum received power by performing a peak search by using the data string of the first angle profile, and detects its DOA (first DOA) (S619-2).

The transceiver 500 (transceiver 2 of FIGS. 18A and 18B) transmits a training signal successively or again (S621-1). The transceiver 400 (transceiver 1 of FIGS. 18A and 18B) repeatedly receives the training signal (S621-1) while changing the AWV (S620-1) until the signal reception is completed in all the predetermined AWV settings (S622-1). In this time, the AWV setting is performed in such a manner that the null point is fixed in the first DOA while scanning the main beam.

Then, the transceiver 400 creates an angle profile (second angle profile), which is a data string indicating a relation between received power and DOAs of the received signals, from the measurement result of the received signals (S623-2). Next, the transceiver 400 identifies signals in the order of the received power by performing peak searches using the data string of the second angle profile, and detects DOAs for the identified signal (S624-2). In this process, the identification process can be terminated at the point when a predetermined number of signals are identified. Then, the transceiver 400 calculates AWVs each having the main beam direction or a sub-beam direction pointing to respective one of the DOAs of the respective signals, and stores these AWVs in the order of the received power (S625-2).

To prepare to start the communication, the transceiver 400 transmits an AWV number to be used (S626-1), and the transceiver 500 receives this number (S626-2). The AWV number is the order of AWVs that are stored in the order of the received power in the training. By using AWVs at the same ranks in the transceiver 400 and the transceiver 500, it is possible to form a beam that is directed to a common propagation path. This AWV number may be transmitted in the opposite direction, i.e., from the transceiver 500 to the transceiver 400. The selection of this AWV number is preferably performed, for example, in the order of the storage, i.e., in the order of the received power. Next, the transceivers 400 and 500 set their own AWV control circuits with AWVs corresponding to the AWV number (S627-1 and S627-2). With these processes, the transceivers 400 and 500 become ready for bilateral communication therebetween (S628-1 and S628-2).

Figure 19:
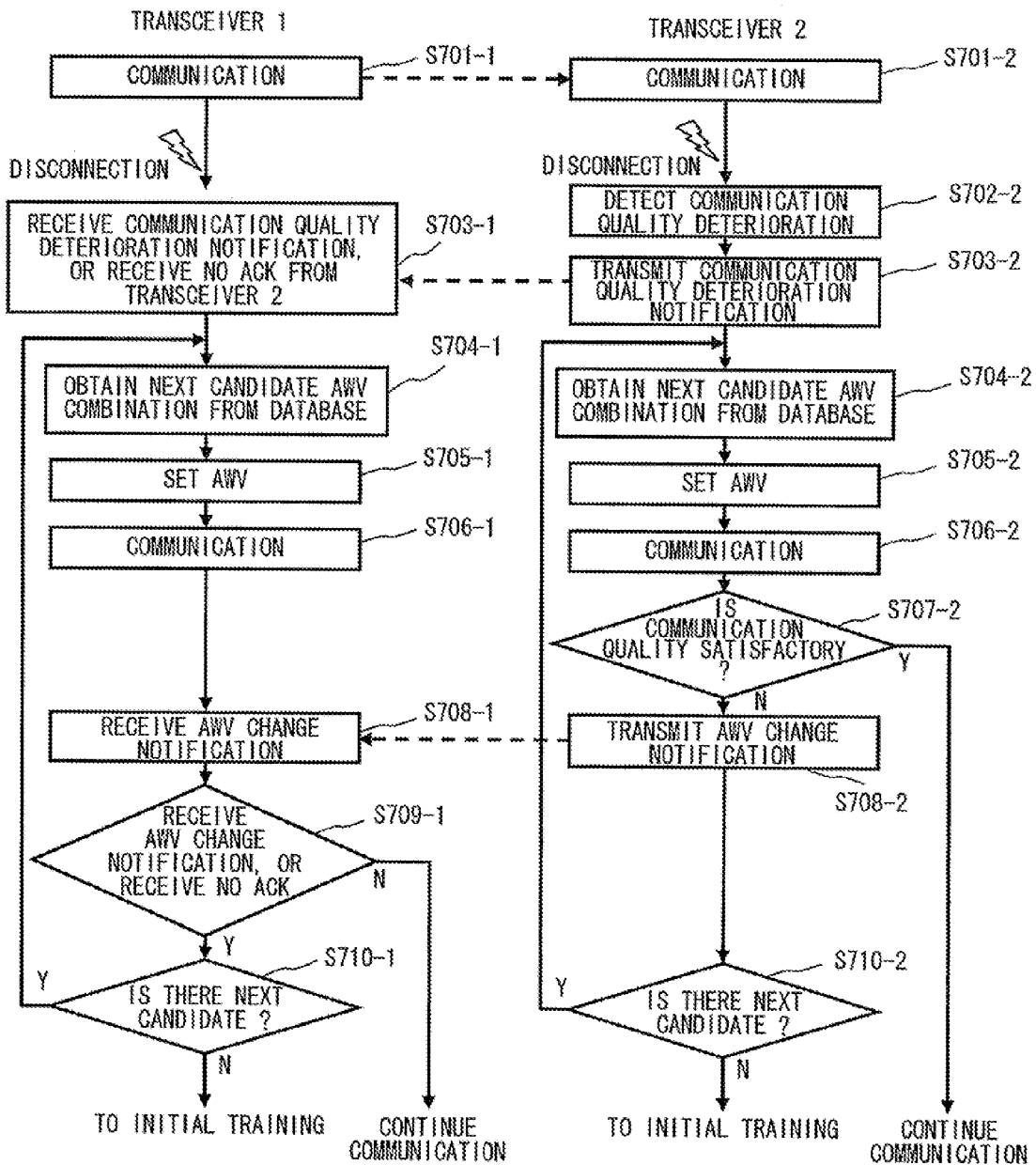
FIG. 19 is a sequence diagram illustrating operations of a transmitter and a receiver that are carried out when shielding of wireless communication occurs in radio control procedure in accordance with a first exemplary embodiment of the present invention.
Figure 20A:
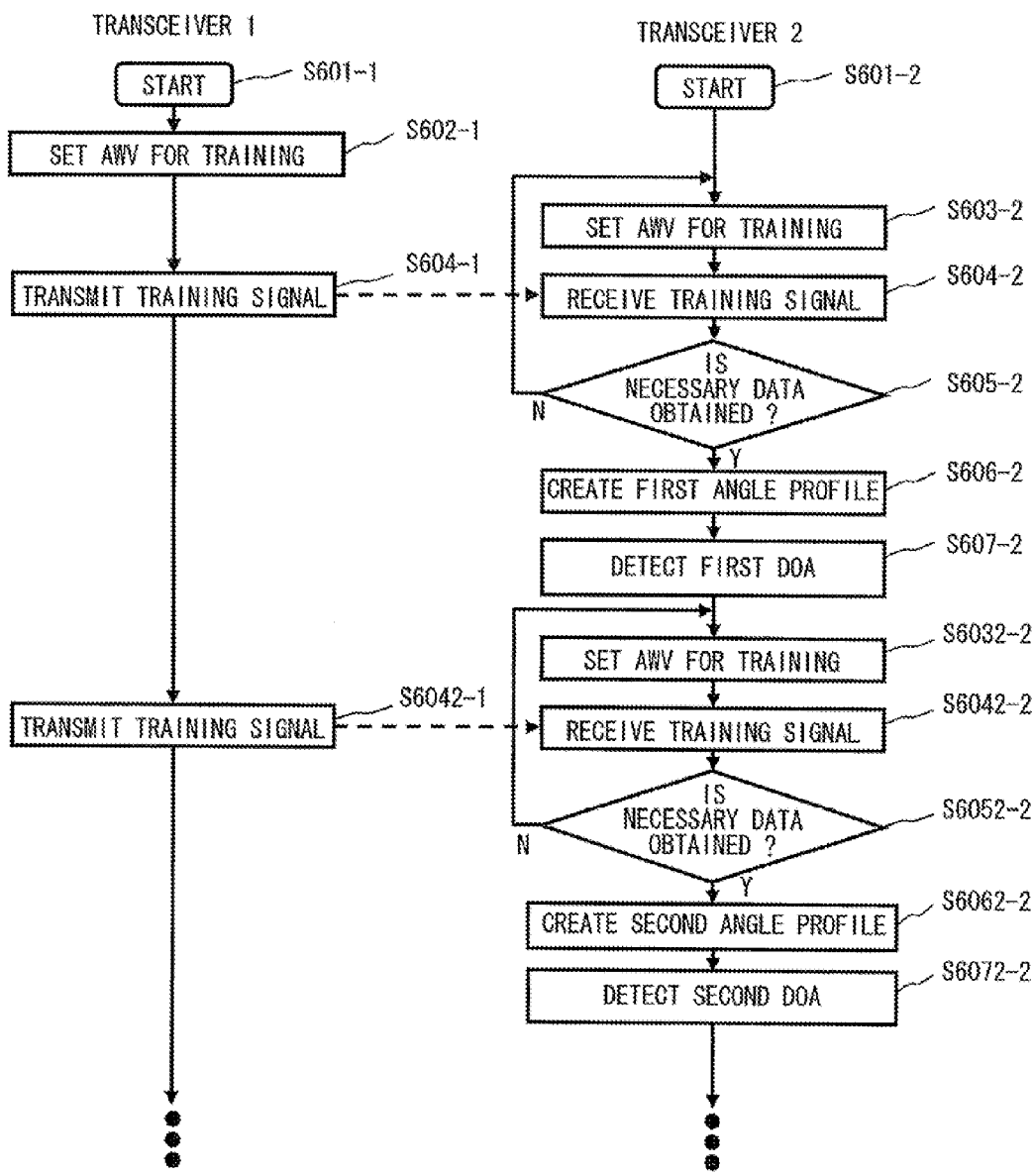
FIG. 20A is a sequence diagram illustrating operations of a transmitter and a receiver that are carried out before actual wireless communication in radio control procedure in accordance with a fifth exemplary embodiment of the present invention.
Figure 20B:
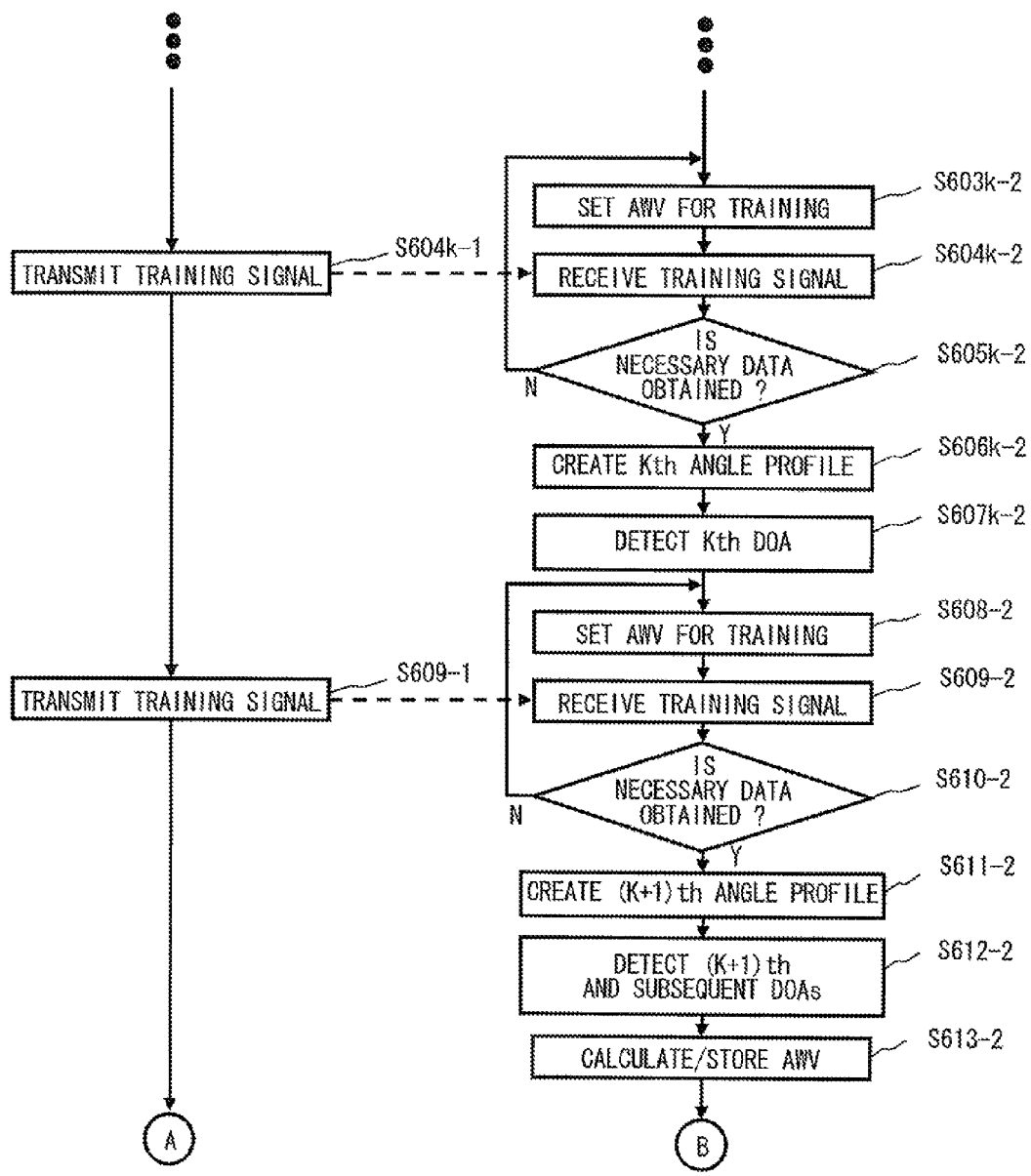
FIG. 20B is a sequence diagram illustrating operations of a transmitter and a receiver that are carried out before actual wireless communication in radio control procedure in accordance with a fifth exemplary embodiment of the present invention.
Figure 20C:
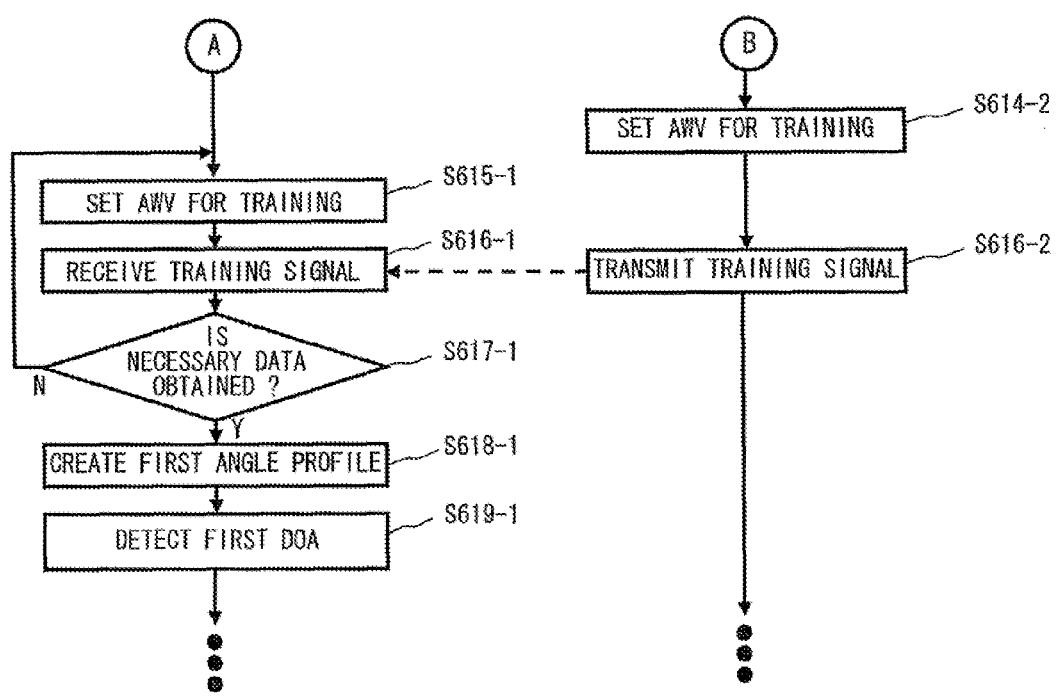
FIG. 20C is a sequence diagram illustrating operations of a transmitter and a receiver that are carried out before actual wireless communication in radio control procedure in accordance with a fifth exemplary embodiment of the present invention.
Figure 20D:
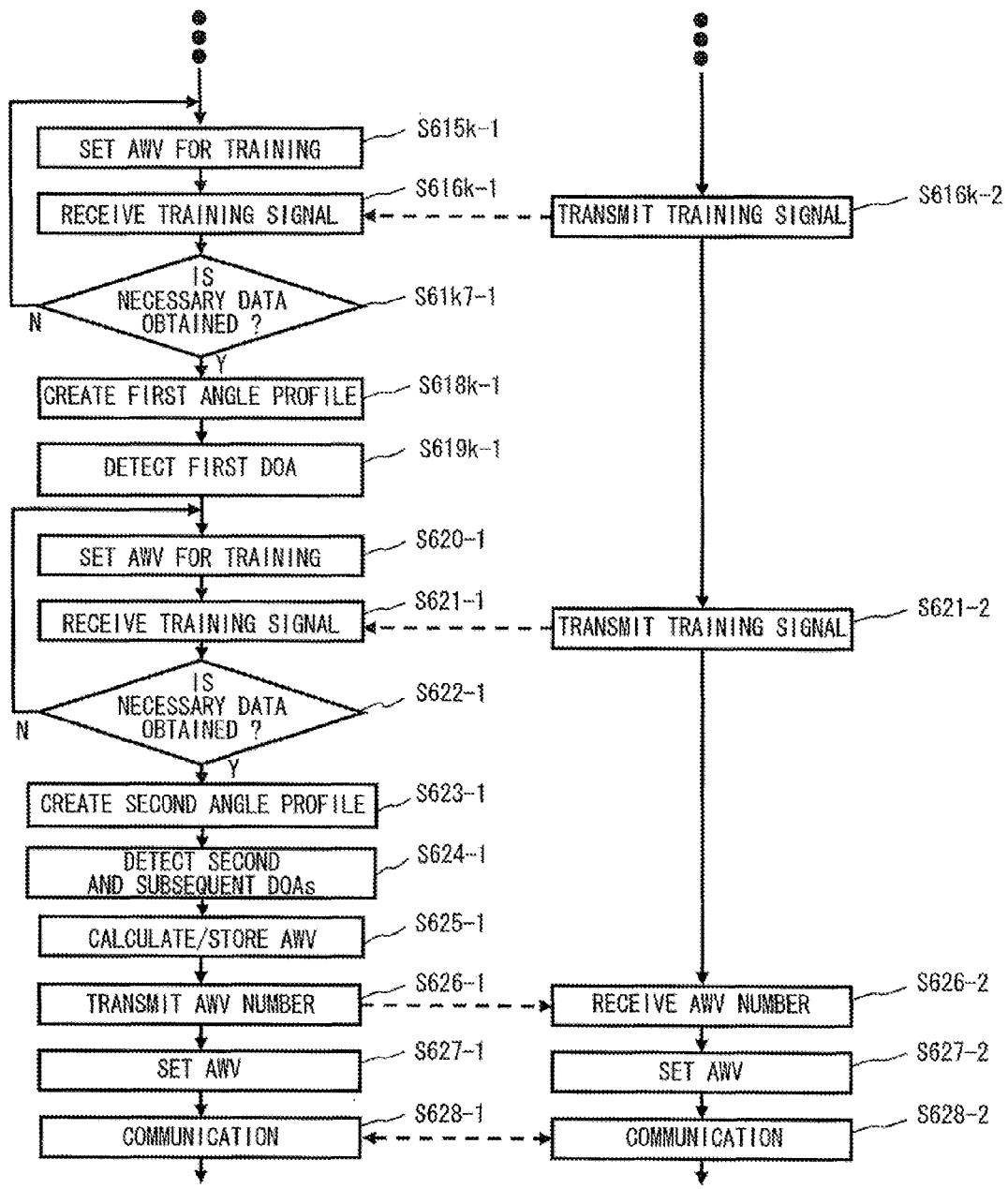
FIG. 20D is a sequence diagram illustrating operations of a transmitter and a receiver that are carried out before actual wireless communication in radio control procedure in accordance with a fifth exemplary embodiment of the present invention.

Next, operations in a case where deterioration in the communication quality such as disconnected communication or the like occurs are explained with reference to FIG. 19. FIG. 19 is a sequence diagram showing operations of the transceivers 400 and 500 in the transition processes from S14 to S16 in FIG. 1. Note that in the following explanation, a case where the transceiver 400 (transceiver 1 in FIG. 19) is operated in a transmitting mode and the transceiver 500 (transceiver 2 in FIG. 11) is operated in a receiving mode.

When a problem such as disconnected communication occurs, the transceiver 500, which is performing the receiving operation, detects the deterioration in the communication quality (S702-2), and notifies the transceiver 400 of the deterioration (S703-2). The transceiver 400 receives the notification of the communication quality deterioration from the transceiver 500. Alternatively, transceiver 400 recognizes the disconnected communication (or deteriorated communication state) base on the fact that an ACK signal, which would be otherwise transmitted from the transceiver 500 upon successful reception of the data under normal communication circumstances, is not received. At this point, the transceivers 400 and 500 obtain their respective next candidate AWVs from their own databases (S704-1 and S704-2).

In a step S705-1, the transceiver 400 sets the AWV control circuits 404-1 to M with the next candidate AWV. Similarly, in a step S705-2, the transceiver 500 sets the AWV control circuits 510-1 to L with the next candidate AWV. After that, the transceivers 400 and 500 resume the communication (S706-1 and S706-2). After the communication is resumed, the transceiver 500 verifies the communication quality (S707-2). When the communication quality is satisfactory, the communication is continued, whereas when it is unsatisfactory, the transceiver 500 transmits a notification for AWV change (S708-2). The transceiver 400 continues the communication without any change unless the transceiver 400 receives a notification for AWV change or cannot receive an ACK signal from the transceiver 500 (S709-1). If not so, the transceivers 400 and 500 attempt communication with a next candidate AWV combination as long as there is another candidate AWV combination (S710-1 and S710-2). If the communication quality cannot be improved with any of the candidate AWV combinations stored in the storage devices 408 and 508 and there is no remaining candidate, the transceivers 400 and 500 returns to the initial training.

Incidentally, although the training in the transceiver 500 precedes the training in the transceiver 400 in the exemplary embodiment in FIGS. 18A and 18B, the training may be carried out in the transceiver 400 before the training in the transceiver 500. Further, although the creation of first and second angle profiles and the calculation/storage of AWVs are performed in their respective transceivers 400 and 500 in the exemplary embodiment of FIGS. 18A and 18B, it is possible to perform all of these processes in either one of the transceivers. For example, data obtained in the training in the transceiver 500 may be transmitted to the transceiver 400 so that the creation of angle profiles and the calculation/storage of AWVs for the transceiver 500 can be performed in the process/arithmetic circuit 406 of the transceiver 400. Further, only the creation of an angle profile may be performed in the transceiver 500, and after the created angle profile is transmitted to the transceiver 400, only the calculation/storage of AWVs is performed in the transceiver 400. In such cases, AWVs themselves may be transmitted from the transceiver 400 to the transceiver 500, instead of transmitting the AWV number from the transceiver 400 to the transceiver 500 (S626-1). Further, when the database is created, AWV combinations that are obtained by a method other than the method specifically described in the specification of the present application may be added to the database. Such configurations also fall within the scope of this exemplary embodiment of the present invention.

In accordance with this exemplary embodiment, when deterioration in the communication quality such as disconnected wireless communication or the like occurs, communication can be swiftly resumed by selecting another candidate AWV combination that is generated in advance. In other words, it is unnecessary to carry out operations such as training, acquisition of an angle profile, and generation of an AWV combination whenever deterioration in the communication quality occurs in this exemplary embodiment, and thus making it possible to determine a new beam in a short time. Further, in accordance with this exemplary embodiment, it is also unnecessary to measure communication quality for every AWV combination between two communication devices when the above-mentioned candidate AWV combinations are generated, and thus making it possible to generate the candidate AWV combinations in a short time. Furthermore, in accordance with this exemplary embodiment, it is possible to generate candidate AWV combinations with high accuracy even when the angle profile is blunted due to the effect of side lobes or when a peak resulting from side lobes occurs.

The following is supplementary explanation for the reason why this method is effective for millimeter waves or microwaves that are higher than or equal to around 10 GHz and have a high rectilinear propagation property when the method is used indoors. The propagation paths that can be used for wireless communication are limited. That is, only the direct wave and reflected waves from certain objects such as walls, windows, and furniture can be used. Therefore, angles at which waves (signals) should be emitted for respective propagation paths or angles at which waves (signals) should be received are significantly different from one wave (signal) to another. Meanwhile, when propagation paths having a low rectilinear propagation property such as a 2.4 GHz micro waveband are used, it is necessary to give consideration to effects by multiple scattering and diffraction. Therefore, in general, directional antennas are not be used. Therefore, situations are different between communication using microwaves and millimeter waves that have higher than or equal to around 10 GHz and communication using microwaves in the order of 2.4 GHz. It should be noted that there are some examples of development of adaptive antennas having a directivity for the purpose of eliminating interferences even in the field of communication using 2.4 GHz microwaves. However, even when an adaptive-type directional antenna is used, it is relatively easy to ensure satisfactory communication quality at the angle of the direct wave or angles close to the direct wave in the 2.4 GHz band because diffraction effects can be expected in the 2.4 GHz band.

In indoor communication using beam forming in millimeter wavebands, it is necessary to take the following characteristics into consideration. As described above, the number of reflected waves other than the direct wave is limited. Further, even if a certain direct wave or a reflected wave is blocked by an obstacle (e.g., human body), there is no correlation between the blocked certain wave and other waves. Therefore, as described with this exemplary embodiment, in millimeter wave communication systems, it is possible to perform communication in a beam direction having the best communication state while ensuring reserve beam directions. Meanwhile, when the frequency is lower than around 10 GHz, contribution of multiple reflections and diffractions on the communication quality is large. Therefore, even if a directional antenna is used, the propagation state of the reserve beam directions varies depending on the presence/absence of an obstacle. That is, there is a high possibility that the received signal state of the reserve beam direction, which has satisfactory quality without any obstacle, is changed due to the presence of an obstacle. Therefore, it is difficult to obtain an advantageous effect of the present invention in 2.4 GHz microwave communication or the like.

Figure 26A:
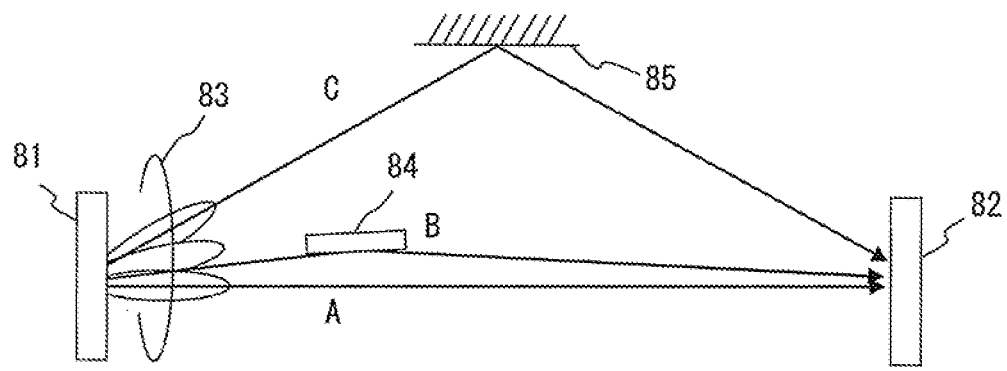
FIG. 26A is a figure for illustrating radio wave propagation aspects where propagation paths are created by the results of local reflections of radio signals in radio control procedure in accordance with a first exemplary embodiment of the present invention (when no shield exists)
Figure 26B:
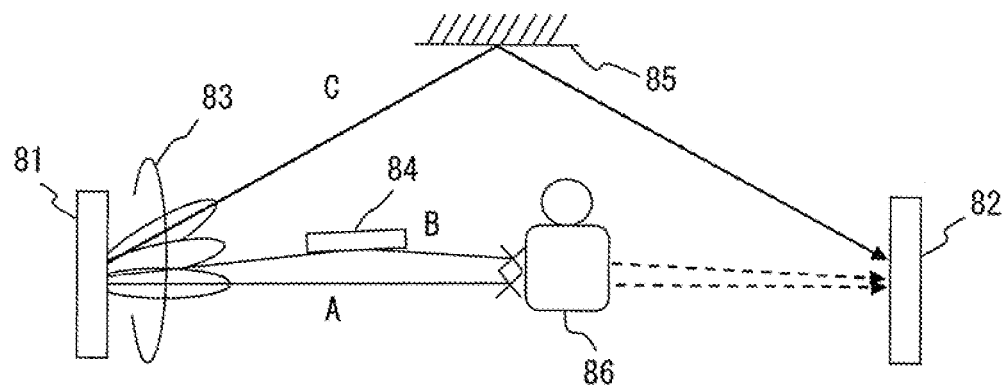
FIG. 26B is a figure for illustrating radio wave propagation aspects where propagation paths are created by the results of local reflections of radio signals in radio control procedure in accordance with a first exemplary embodiment of the present invention (when some of the paths are blocked by a human body)
Figure 27:
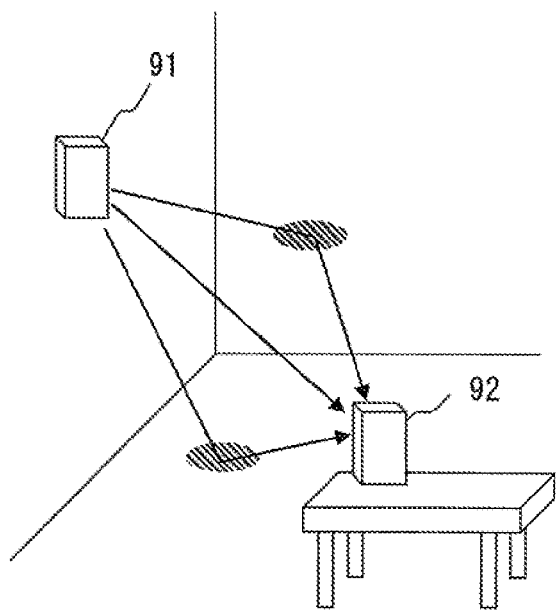
FIG. 27 shows a configuration of a system using wide-angle antennas.
Figure 28:
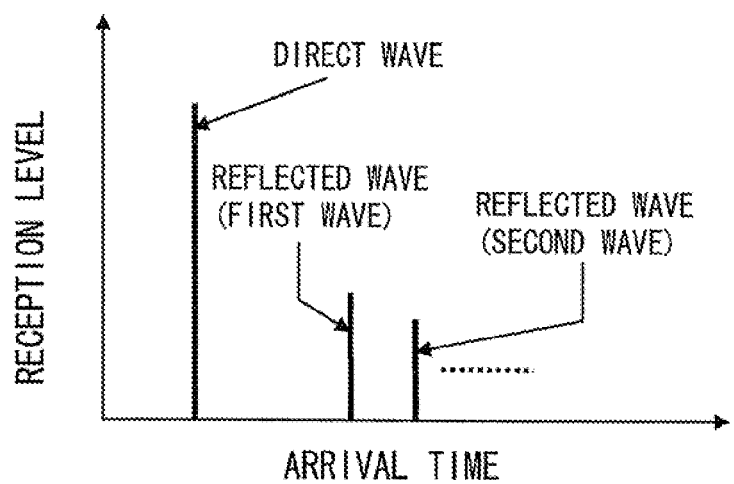
FIG. 28 shows an example of a delay profile of a system using wide-angle antennas when the system is used indoors.

Further, in millimeter wave communication, a local reflection may sometimes create a propagation path. FIGS. 26A and 26B show an aspect of such a situation. In FIG. 26A, there are a transceiver 81 and a receiver 82, and it is assumed that there are propagation paths in the beam forming including a direct wave A, a locally reflected wave B, and a reflected wave C propagating through a long path. There is a possibility that the direct wave A and the locally reflected wave B are blocked at the same time, for example, by a human body. To cope with this problem, Patent literature 1 discloses a technique including giving no or a low priority to a beam direction located in the vicinity of another beam direction to which a priority is already assigned. Although examples in which priority order is assigned to AWV combinations in the order of received power has been described so far in the above explanation, it is also possible to take angular relations between candidate beams into account in addition to the criterion based on the received power in the assignment of the priority order. Since information about angular relations between candidate beams in the respective transceivers is already obtained in this exemplary embodiment, it is possible to perform such priority order assignment.

In the above explanation, AWV combinations that are to be set in the transceivers 400 and 500 are combined based on the order of the received power obtained in the initial training. However, in certain situations such as when two or more propagation paths have propagation losses close to each other, or when the quasi-omni pattern has poor accuracy, i.e., when there are variations among the antenna gains depending on the DOD, there is a possibility that an error occurs in the AWV combinations. Note that the "error" means a situation where AWVs corresponding to different propagation paths are combined. However, even if such an error occurs, the quality verification is performed in the step S16 in FIG. 1. Therefore, when such an error occurs in the combination, the process transits again to S15 in order to select another AWV combination. Consequently, critical situations such as long-time disconnection of communication and complete stop of communication are prevented. A different countermeasure against such AWV combination errors will be described later with a seventh exemplary embodiment.

In the above explanation, an AWV of the transceiver performing a transmitting operation is set in an omni or quasi-omni pattern. However, if it is very difficult to generate an omni or quasi-omni pattern, other fixed patterns may be used as a substitute. That is, a fixed pattern beam whose antenna gain has directional dependence may be also used. However, it is necessary to use a pattern having an antenna gain over a sufficiently wide angle range. In such a case, a process to remove the effects caused by the directional dependence of the antenna gain of the fixed pattern beam from the angle profile obtained by the above-described method should be added. Further, if necessary, a data string describing the directional dependence of the antenna gain of the fixed pattern beam may be transmitted/received between the transceivers.

In the above explanation, beam forming between two transceivers is explained. Such operations are often performed between two transceivers in a system including three or more transceivers. In general, there is a transceiver having special authority called "Piconet coordinator" or "access point" in the system. The decision on which two transceivers perform a beam forming operation therebetween among the three or more transceivers is typically made by instructions from this transceiver having special authority called "Piconet coordinator" or "access point". The Piconet coordinator or the access point receive requests from other general transceivers and issue these instructions.

Further, in this exemplary embodiment, the roles of two transceivers 400 and 500 alternate their roles and then similar processes are performed therebetween. Note that the decision on which of the two transceivers performs which of the roles in the earlier state may be also made by instructions from the transceiver having special authority called "Piconet coordinator" or "access point".

Further, although expressions such as "to operate a transceiver in a receiving mode" and "to generate an omni (non-directional) or quasi-omni (pseudo-nondirectional) pattern" are used in the above explanation, these processes are performed in accordance with schedules that are incorporated in advance in the process/arithmetic circuits or the like of the respective transceivers.

Second Exemplary Embodiment

A second exemplary embodiment of the present invention is explained hereinafter with reference to a transition diagram shown in FIG. 2. It should be noted that a configuration similar to that shown in FIG. 5 can be used as the configuration of a wireless communication system in accordance with this exemplary embodiment. Each of S21 to S26 and transition conditions therebetween are similar to S11 to S16 and their transition conditions shown in FIG. 1, which are described above with the first exemplary embodiment. Therefore, detailed explanation of S21 to S26 is omitted.

Figure 2:
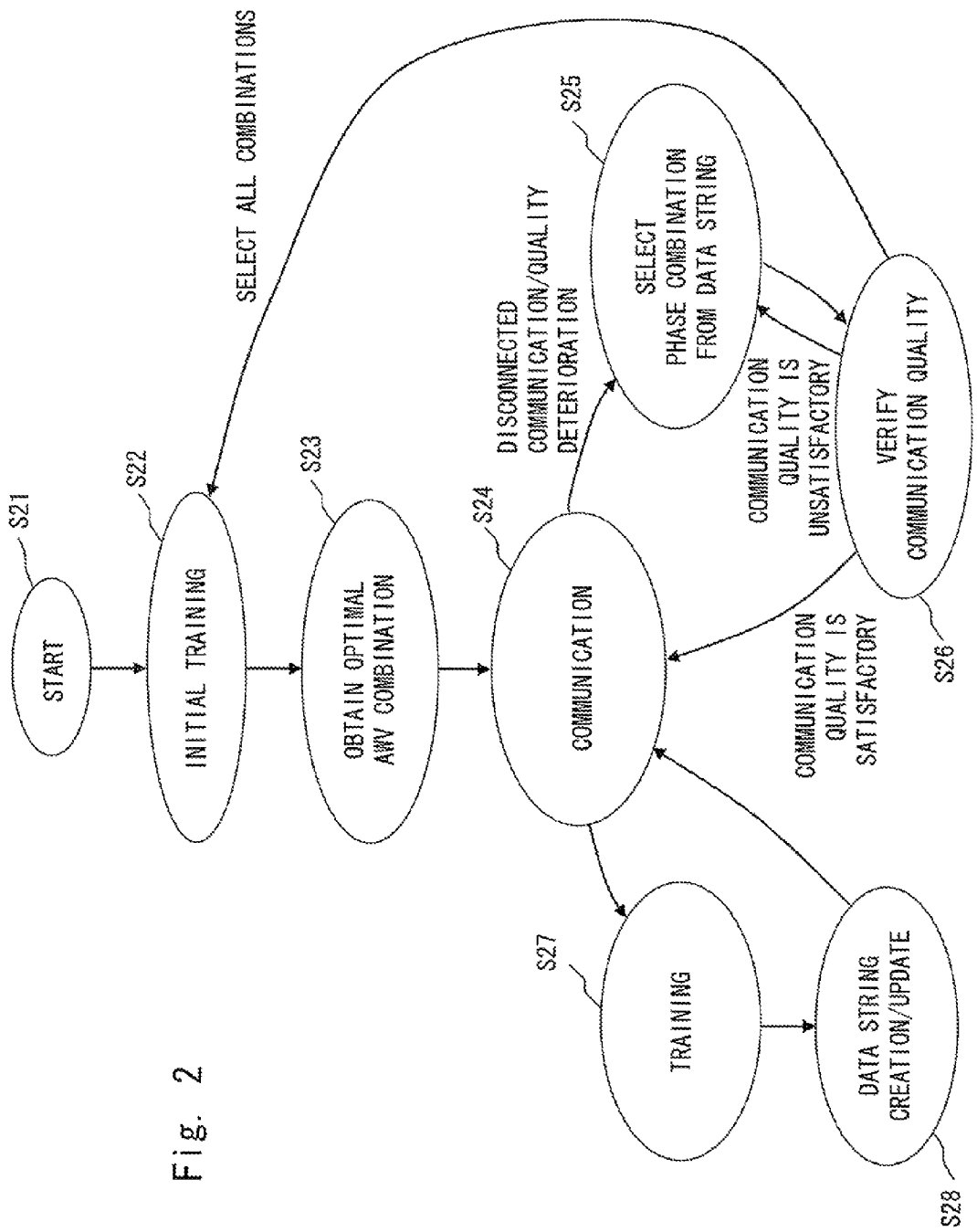
FIG. 2 shows transitions in radio control procedure in accordance with a second exemplary embodiment of the present invention.

In S27 in FIG. 2, additional second training is performed after transition from the state (S24) where the communication is continued. The second training may be periodically performed, or may be performed during idle times in which there are no data to be transmitted/received.

In S28, the process/arithmetic circuit 406 and 506 calculate a plurality of candidate AWV combinations again. The process/arithmetic circuits 406 and 506 update the data strings stored in the storage circuits 408 and 508 with the plurality of candidate AWVs obtained by the recalculation.

In this exemplary embodiment, the situation with regard to reserve beam directions is periodically or appropriately examined by the second training to update the plurality of AWV combinations. In this way, the wireless communication system in accordance with this exemplary embodiment can ensure AWV combinations that are constantly updated to the newest state. Note that the second training (S27) may be divided and performed in the intervals between the communication. In this way, it can eliminate the need to suspend the communication for a long time. Further, when the communication is disconnected or the communication quality is deteriorated, it is desired to recover the communication in a short time. However, since this second training does not need to be performed immediately, it will not cause any problem even if an DOA estimation algorithm is performed.

Furthermore, since this second training often requires less immediacy even in comparison to the initial training, the beam direction scanning may be performed with higher angular resolution by changing the AWV of the antenna array. In this way, it is possible to find an AWV combination that makes it possible to achieve better communication quality.

Further, the beam direction scanning in the second training may be performed in such a manner that the scan range is limited within ranges close to the DOAs corresponding to the respective AWV combinations obtained in the initial training. In this way, the search for an AWV combination that makes it possible to achieve better communication quality can be performed in a shorter time.

Third Exemplary Embodiment

Figure 3:
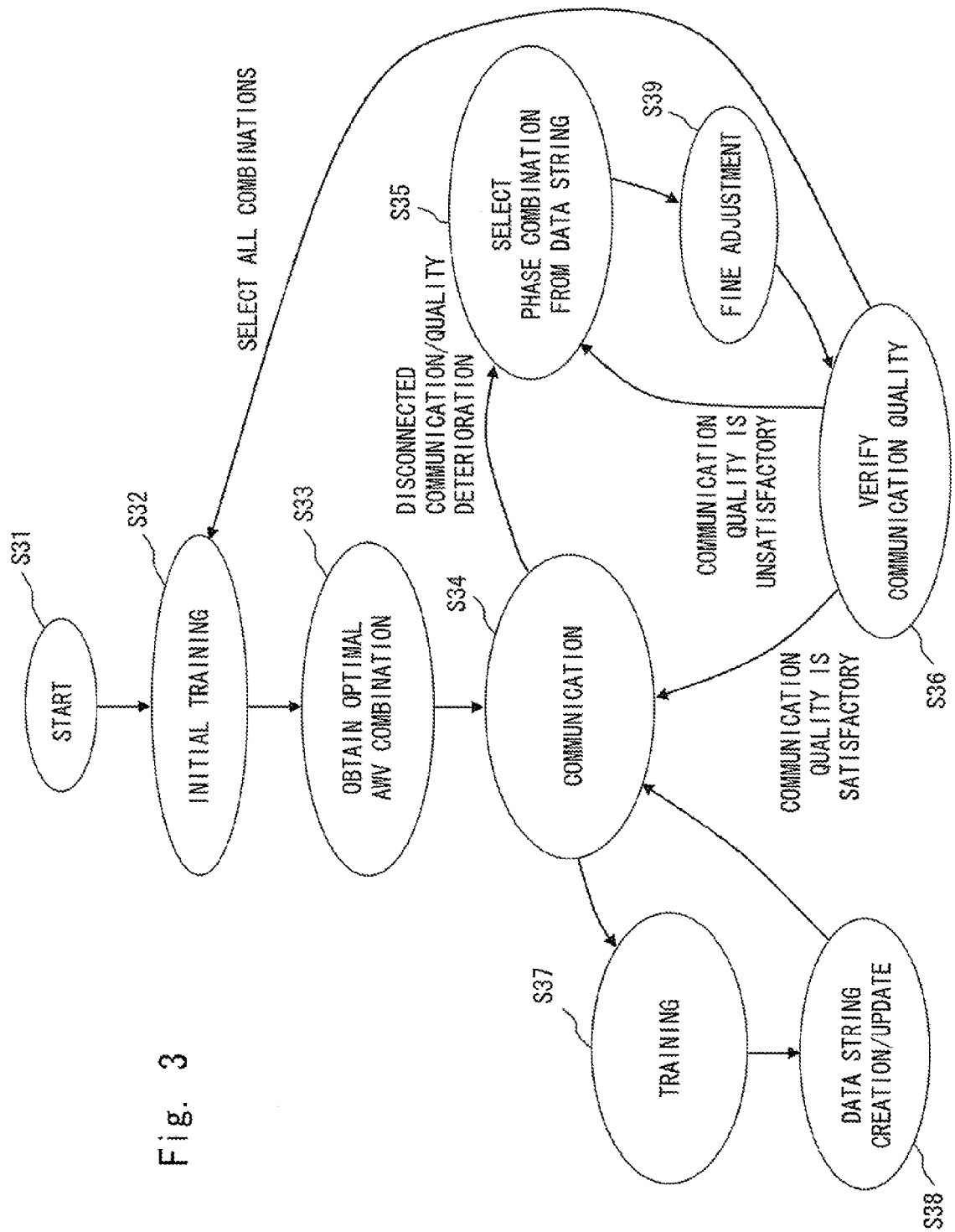
FIG. 3 shows transitions in radio control procedure in accordance with a first exemplary embodiment of the present invention.
Figure 4:
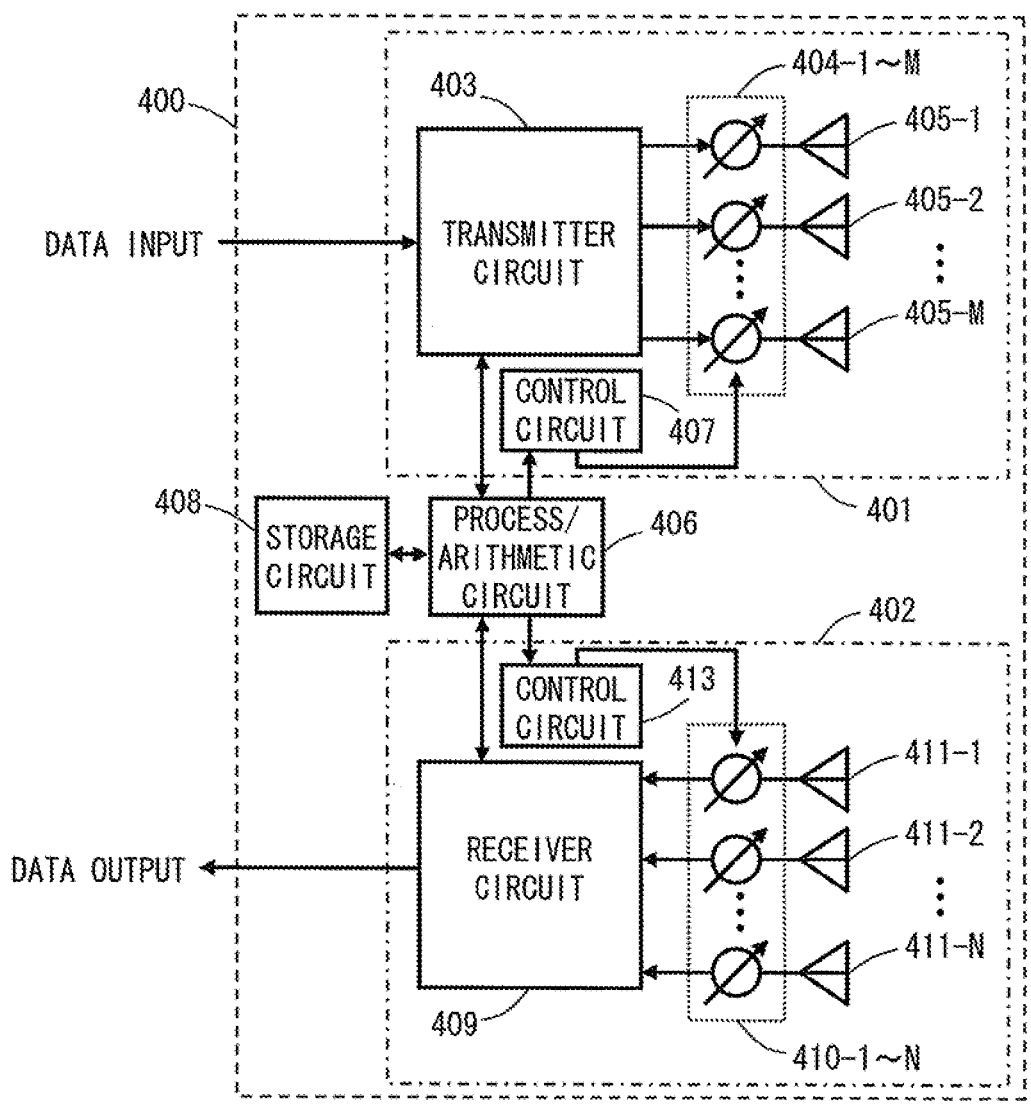
FIG. 4 shows an example of a configuration of an apparatus for use in beam forming to which the present invention is applicable.

A third exemplary embodiment of the present invention is explained hereinafter with reference to a transition diagram shown in FIG. 3. It should be noted that a configuration similar to the one shown in FIG. 5 can be used as the configuration of a wireless communication system in accordance with this exemplary embodiment. Further, the operations of the third exemplary embodiment are substantially the same as those of the second exemplary embodiment. That is, each of S31 to S38 and transition conditions therebetween are similar to S21 to S28 and their transition conditions shown in FIG. 2, which are described above with the second exemplary embodiment. Therefore, detailed explanation of S31 to S38 is omitted.

In this exemplary embodiment, when deterioration in the communication quality such as disconnected communication or the like occurs, the next candidate AWV combination is selected from the AWV combinations recorded in the database (S35) and fine adjustment is made in that state (S39). The "fine adjustment" means a method for searching for an optimal beam without spending too much time. Specifically, adjustment may be performed by slightly changing the beam or the set AWV so that better communication quality is obtained. Further, simplified beam searching procedure such as "Beam Tracking" disclosed in Patent literature 4 may be applied. Furthermore, processes similar to those of the initial training may be performed with higher angular resolution within ranges close to the DOA corresponding to the newly selected AWV combinations.

For example, when the AWV combination is to be shifted from an AWV combination corresponding to larger received power to an AWV combination corresponding to smaller received power as described in detail with the first exemplary embodiment, the received power becomes gradually smaller and therefore the accuracy could deteriorate. Accordingly, this exemplary embodiment provides an advantageous effect that, in a state where shielding occurs and the received power is thereby weakened, an AWV combination with which stable transmission can be achieved with high accuracy can be found, for example, by performing gain adjustment for the receiving operation, and then performing fine adjustment in the optimal state.

Fourth Exemplary Embodiment

A fourth exemplary embodiment is characterized in that the training and the acquirement/establishment of AWV combinations are performed at a low-rate (with a narrow band) and actual communication is performed at a relatively high-rate (with a wide band). The other operations may be performed by using the method in accordance with one of first to third exemplary embodiments of the present invention.

Since free space propagation losses are large in millimeter wave communication, the received power is expected to be small. Therefore, if AWVs on the transmission side are set so as to generate an omni or quasi-omni pattern in the training, there is a possibility that a sufficient CNR (Carrier to Noise Ratio) is not achieved. Accordingly, it is expected that the use of the low-rate (narrow band) having better reception sensitivity provides advantageous effects such as making the training possible and improving the accuracy. It should be noted that the "use of low-rate (narrow band)" means to narrow the frequency band used to transmit a training signal in order to narrow the noise bandwidth or to adopt a modulation technique having a small necessary CNR. Note that "to adopt a modulation technique having a small necessary CNR" means, in other words, to adopt a modulation technique in which the distance between signal points on the constellation is large (typically a smaller transmission speed). It should be noted that it is assumed that a narrow beam width is used in this exemplary embodiment. Therefore there is no significant difference in optimal beam (AWV) combinations regardless of whether the transmission is preformed at a low-rate (narrow band) or at a high-rate (wide band) because the correlative bandwidth is wide.

Fifth Exemplary Embodiment

In the first exemplary embodiment, the first DOA is detected from the first angle profile and the second and subsequent DOAs are detected from the second angle profile. This is because in many propagation environments, especially in propagation environments for millimeter waves, the first propagation path often corresponds to the LOS (Line of Sight) component and its signal strength is often overwhelmingly stronger than those of the second and subsequent propagation paths. In such cases, the dominant factor of the influence of the above-described effect of side lobes on the angle profile is the first propagation path signal. Therefore, there is a high possibility that the incoming angles of the second and subsequent propagation paths can be detected by eliminating the effect of this first propagation path signal in the creation of the second angle profile. Note that the propagation path numbers in the above explanation are assigned according to the received power or other received-signal characteristics for the sake of convenience.

However, though depending on the propagation environment, it is conceivable that the detection of signals on third and subsequent propagation paths becomes very difficult due to the side lobe effect resulting from the second propagation path signal in the second angle profile. In such cases, procedure as shown as a sequence diagram in FIGS. 20A to 20D may be employed. In this exemplary embodiment, the first DOA is detected (S607-2) from the first angle profile (S606-2); the second DOA is detected (S6072-2) from the second angle profile (S6062-2); and similar procedure is repeated successively. Then, at the point when the side lobe effect becomes sufficiently small to detect all the remaining signals, all the remaining signals may be detected at once (S612-2). Note that in an AWV setting for training (S603$k$–2) to create the kth (k=2, 3, . . . ) angle profile (S606$k$–2), the main beam is scanned while fixing the null points in (k–1) DOAs consisting of 1st to (k–1)th DOAs that are detected prior to the current angle profile creation. Similarly, in a step S608-2, the main beam is scanned while fixing the null points in k DOAs consisting of 1st to kth DOAs. Further, the steps S603$k$–2 to S607$k$–2 may be repeated to the last signal. That is, detection in which one DOA is detected from one angle profile may be repeated for every signal. Although the above explanation is made for the training for the transceiver 500 (transceiver 2 in FIGS. 20A to 20D), the explanation may be also applied to the training for the transceiver 400 (transceiver 1 in FIGS. 20A to 20D).

Sixth Exemplary Embodiment

Figure 21A:
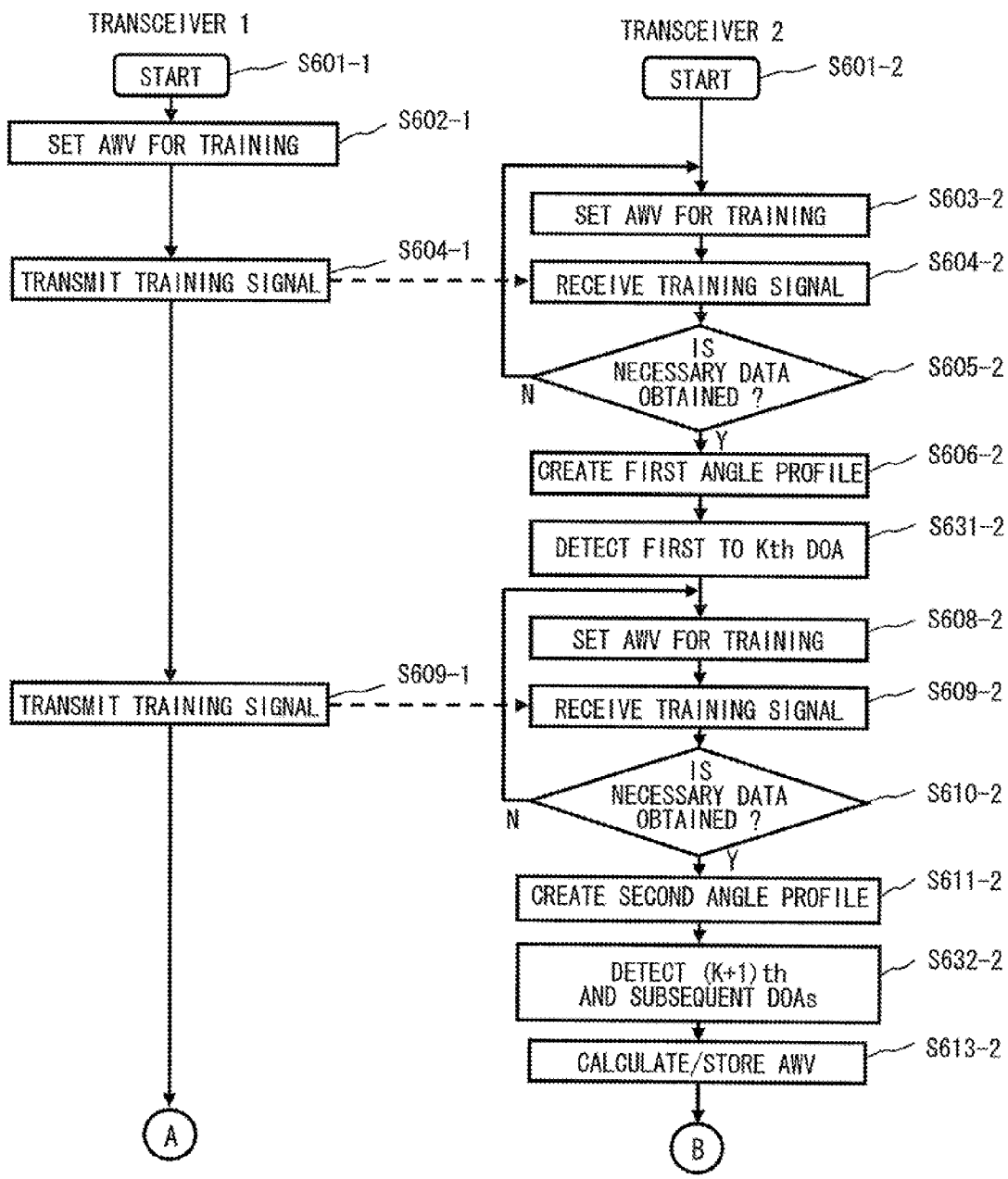
FIG. 21A is a sequence diagram illustrating operations of a transmitter and a receiver that are carried out before actual wireless communication in radio control procedure in accordance with a sixth exemplary embodiment of the present invention.
Figure 21B:
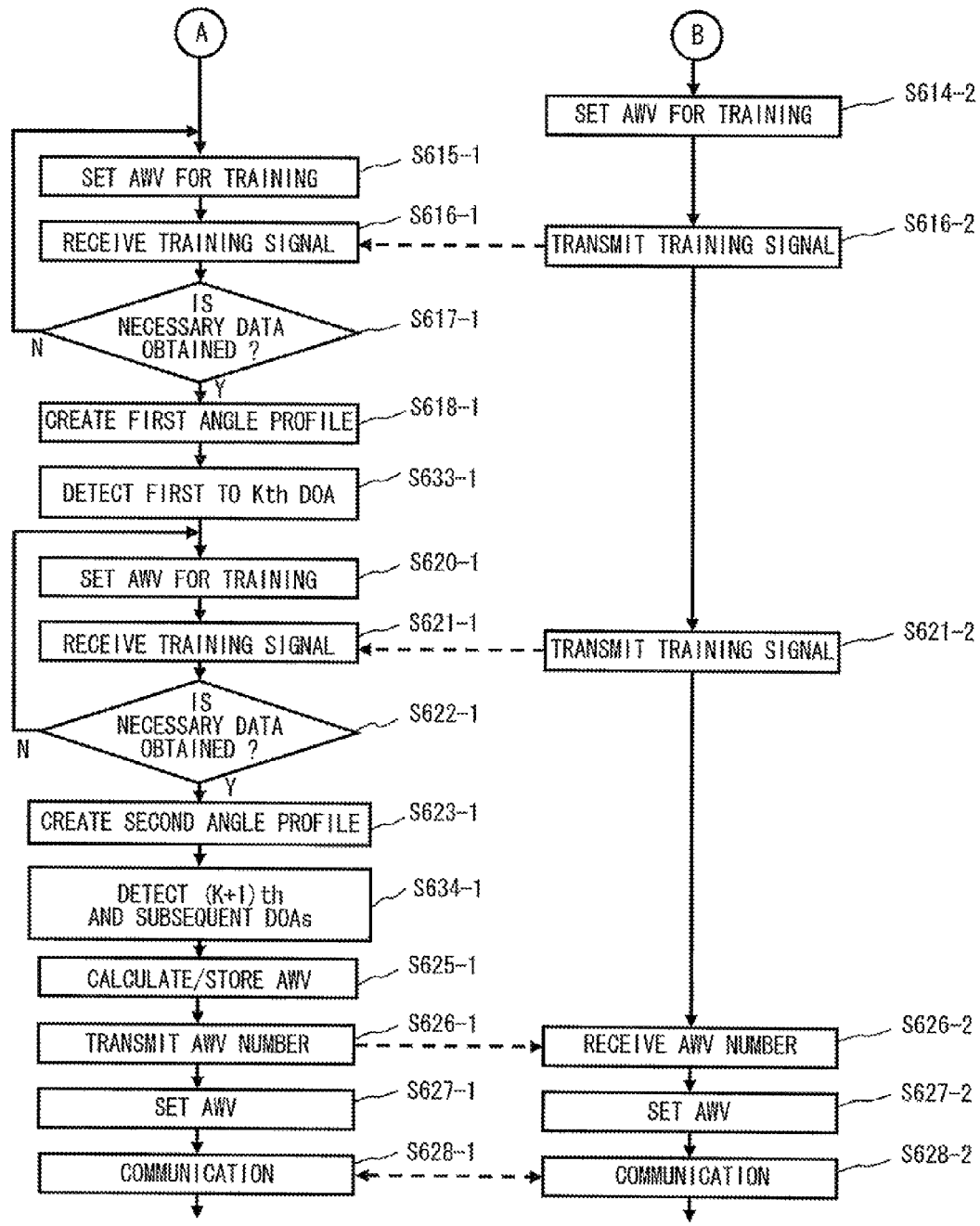
FIG. 21B is a sequence diagram illustrating operations of a transmitter and a receiver that are carried out before actual wireless communication in radio control procedure in accordance with a sixth exemplary embodiment of the present invention.

For example, for a propagation environment in which the signal strength of the first to kth propagation paths are relatively strong and the signal strength drop significantly in the (k+1)th and subsequent propagation paths, procedure as shown as a sequence diagram in FIGS. 21A and 21B is effective. In this exemplary embodiment, the first to kth signal DOAs are detected (S631-2) by using the first angle profile (S606-2), and then the (k+1) and subsequent signal DOAs are detected (S632-2) by using the subsequently obtained second angle profile (S611-2). Note that in an AWV setting for training (S608-2) to create the second angle profile (S611-2), the main beam is scanned while fixing the null points in k DOAs consisting of 1st to kth DOAs that are detected in the step S631-2. Although the above explanation is made for the training for the transceiver 500 (transceiver 2 in FIG. 21), the explanation may be also applied to the training for the transceiver 400 (transceiver 1 in FIG. 21).

Seventh Exemplary Embodiment

As stated in the last part of the explanation of the first exemplary embodiment, in a case where AWV combinations to be set in the transceivers 400 and 500 are created based on the order of received power at the initial training, there is a possibility that an error occurs in the AWV combinations in certain situations such as when two or more propagation paths have propagation losses close to each other, or when the quasi-omni pattern has poor accuracy, i.e., when there are variations among the antenna gains depending on the DOD. Note that the "error" means a situation where AWVs corresponding to different propagation paths are combined. It is believed that the possibility of such errors depends on the propagation environment. However, when errors occur with high frequency, it is desirable to apply procedure in accordance with this exemplary embodiment.

Figure 22A:
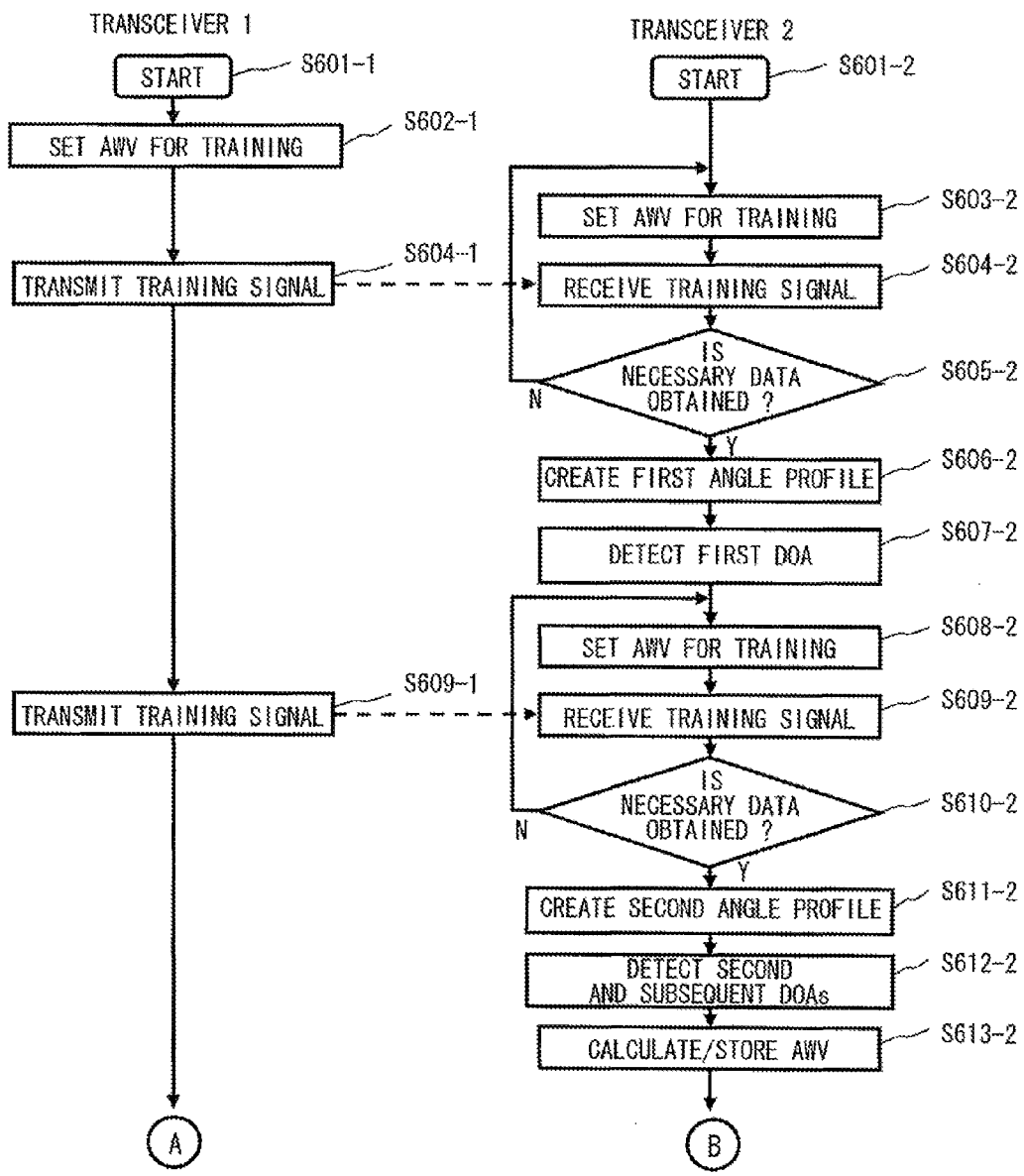
FIG. 22A is a sequence diagram illustrating operations of a transmitter and a receiver that are carried out before actual wireless communication in radio control procedure in accordance with a seventh exemplary embodiment of the present invention.
Figure 22B:
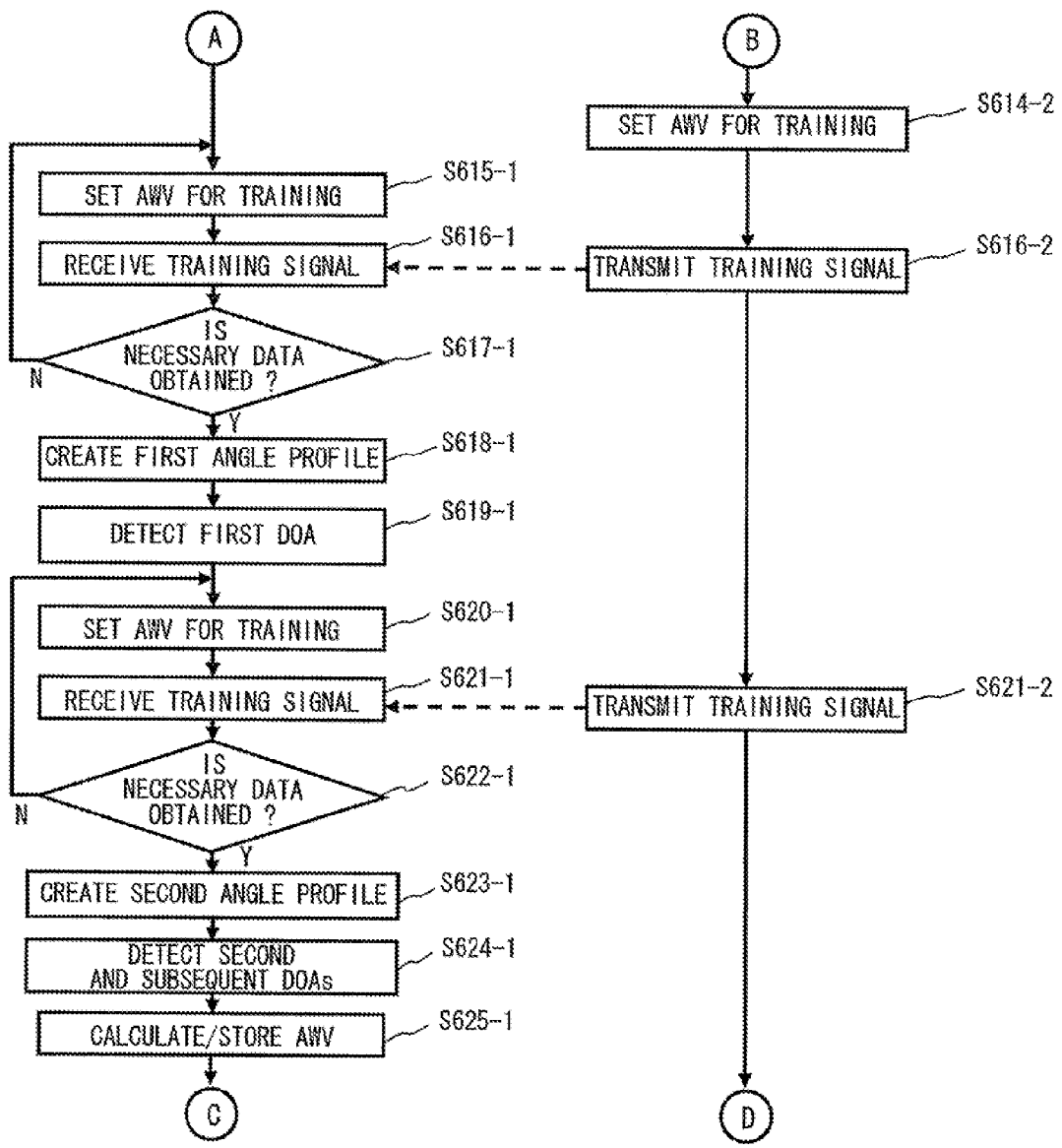
FIG. 22B is a sequence diagram illustrating operations of a transmitter and a receiver that are carried out before actual wireless communication in radio control procedure in accordance with a seventh exemplary embodiment of the present invention.
Figure 22C:
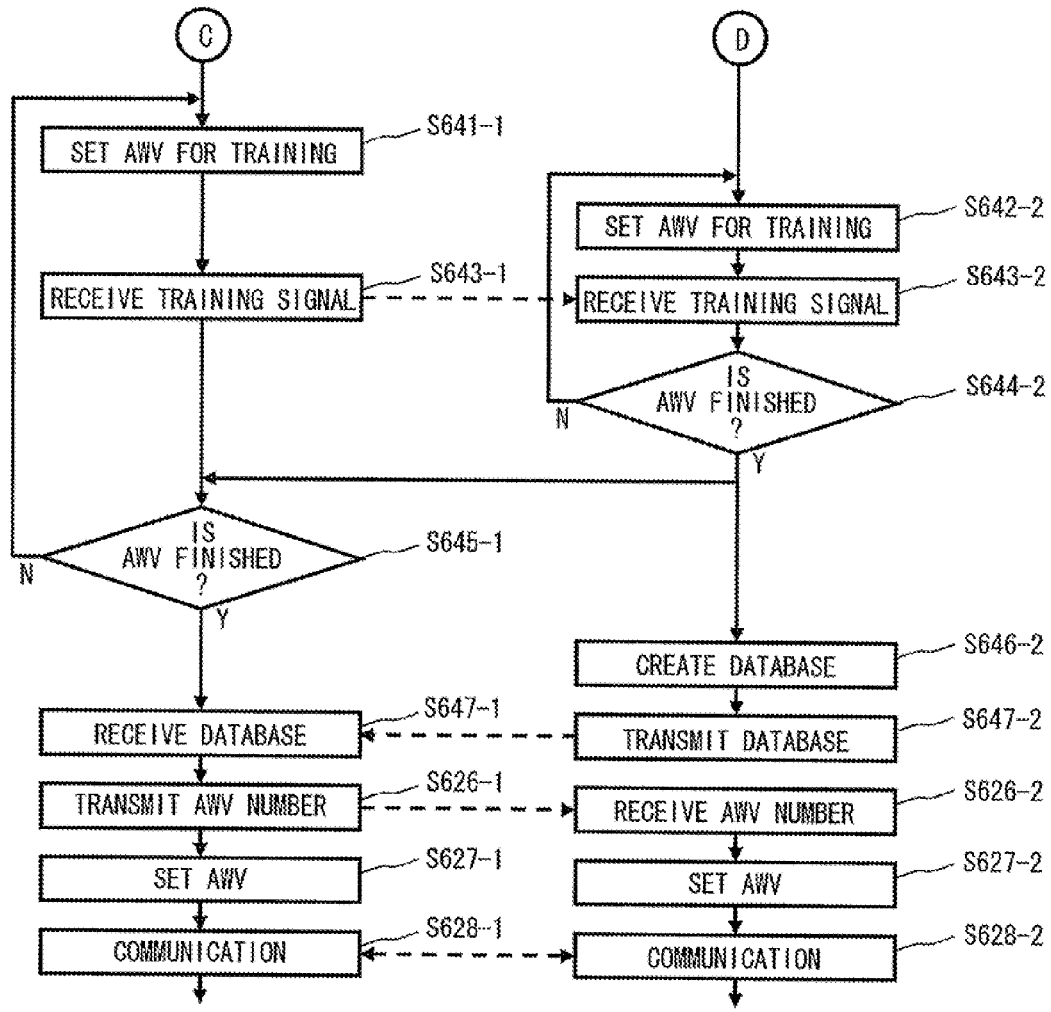
FIG. 22C is a sequence diagram illustrating operations of a transmitter and a receiver that are carried out before actual wireless communication in radio control procedure in accordance with a seventh exemplary embodiment of the present invention.
Figure 23:
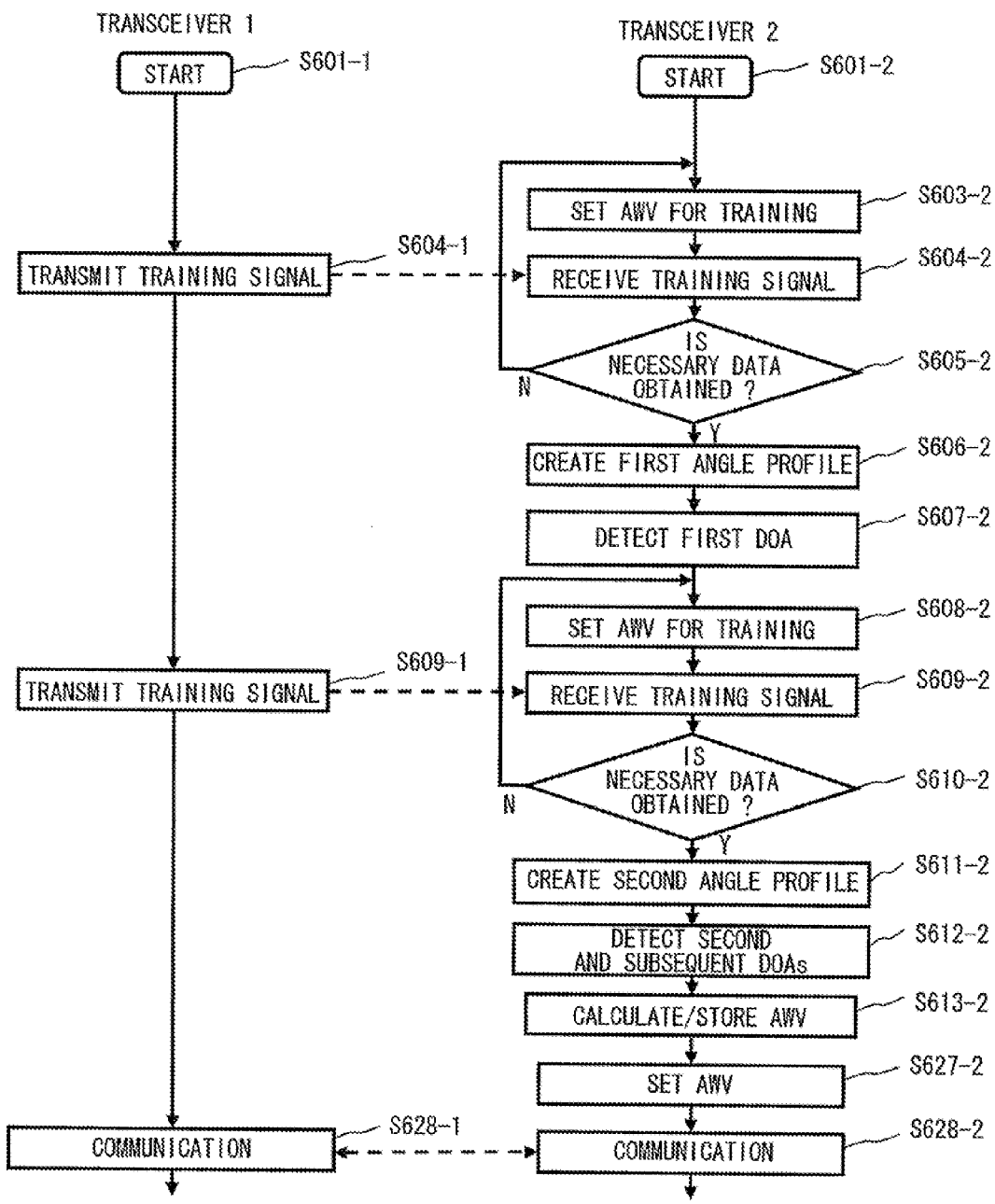
FIG. 23 is a sequence diagram illustrating operations of a transmitter and a receiver that are carried out before actual wireless communication in radio control procedure in accordance with a eighth exemplary embodiment of the present invention.

This exemplary embodiment is characterized in that, instead of combining AWV combinations between the transceivers based on the order of the received power at the initial training, training is performed for all the stored AWV combinations for both the transceiver 400 and the transceiver 500 in order to ensure AWV combinations having satisfactory communication quality. FIGS. 22A to 22C show an example of a sequence diagram.

FIGS. 22A to 22C are a modified version of the sequence diagram shown in FIGS. 18A and 18B, and have additional steps S641 to S647 between the steps S625 and S626. In the steps S641-1, S643-1, and S645-1, the transceiver 400 sets an AWV form plurality of AWVs stored in the storage circuit 408 one by one and transmits a training signal in each setting. In the steps S642-2 to S644-2, the transceiver 500 performs a reception operation on the training signals transmitted from the transceiver 400 while setting all the AWVs stored in the storage circuit 508 one by one. After the transmission/reception of the training signals for all the AWV combinations has been completed, the transceiver 500 determines an AWV for reception having the best communication quality for each AWV for transmission used in the transceiver 400. Then, the transceiver 500 creates a data string (database) indicating combinations of AWVs having satisfactory communication quality (S646-2), and transmits the data string (database) indicating the combinations of AWVs to the transceiver 400 (S647-2). The transceiver 400 updates the AWV information stored in the storage circuit 408 by using the database received from the transceiver 500 (S647-1).

In general, it is unrealistic to measure communication quality for all the AWV combinations between a plurality of transceivers in terms of processing time. However, since the number of candidate AWVs is reduced to a small number through the processes up to S625-1 in this exemplary embodiment, the processing time required to measure communication quality for all the combinations can be reduced. Three propagation paths have been examined in each of the two-dimensional propagation environments explained above with FIGS. 6 and 15. In fact, it is expected that the number of propagation paths available for communicant in an actual three-dimensional millimeter-wave propagation environment is limited to a small number. For example, even in a case where there are seven propagation paths, the number of all the AWV combinations is 49 at the most.

Further, the above-described procedure to measure communication quality for all the AWV combinations may be modified as shown below in order to reduce the processing time. Firstly, AWV combinations to be set in the transceivers 400 and 500 are determined based on the order of the received power at the initial training or the order of other communication quality in accordance with procedure described above with the first exemplary embodiment. Next, a communication quality test is carried out on these AWV combinations, and only the AWV combinations that do not satisfy a predetermined communication quality criterion are cancelled. Then, for the AWV combinations that are cancelled because their communication quality is lower than the communication quality criterion, a search for a new AWV combination is performed by carrying out a communication quality test on all the combinations. After that, the priority order of AWV combinations may be determined again based on the above-described two communication quality tests. By employing the method like this, among the AWV combinations that are determined based on the initial training result, the available AWV combinations can be excluded from the AWV combinations on which the round-robin-based communication quality measurement is performed to find new combinations, and thus making it possible to reduce the processing time.

Eighth Exemplary Embodiment

In the above explanation, it is assumed that communication is performed between transceivers that form a directional beam by beam forming. However, the present invention is also applicable to communication between a transceiver that forms a fixed beam and a transceiver that forms a directional beam by beam forming. Assuming a case where the transceiver 400 is a transceiver that forms a fixed beam and the transceiver 500 is a transceiver that forms a directional beam by beam forming, the training needs to be performed only for the transceiver 500 in this case. Therefore, the sequence diagram becomes, for example, the one shown in FIG. 23.

Ninth Exemplary Embodiment

Figure 24A:
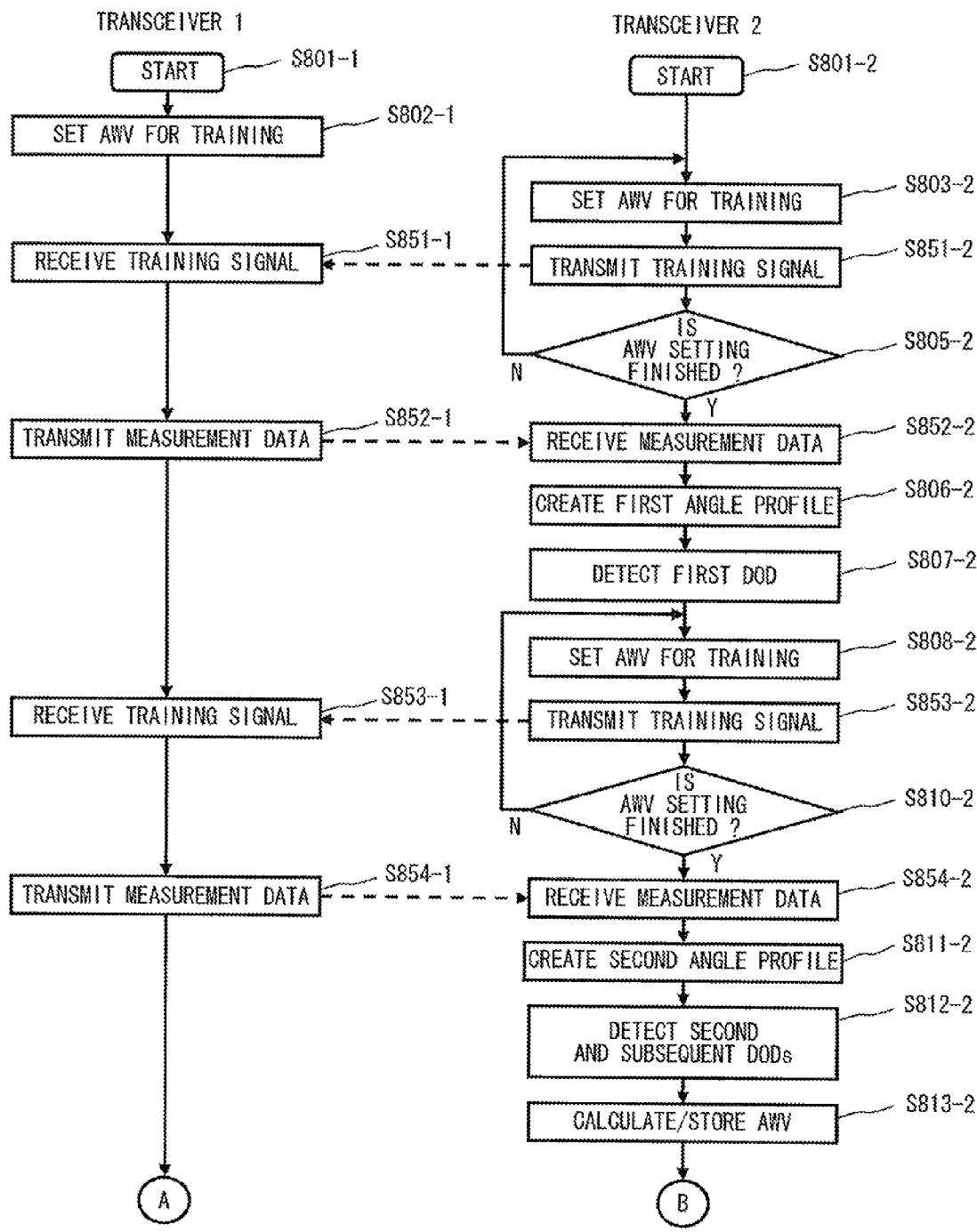
FIG. 24A is a sequence diagram illustrating operations of a transmitter and a receiver that are carried out before actual wireless communication in radio control procedure in accordance with a ninth exemplary embodiment of the present invention.
Figure 24B:
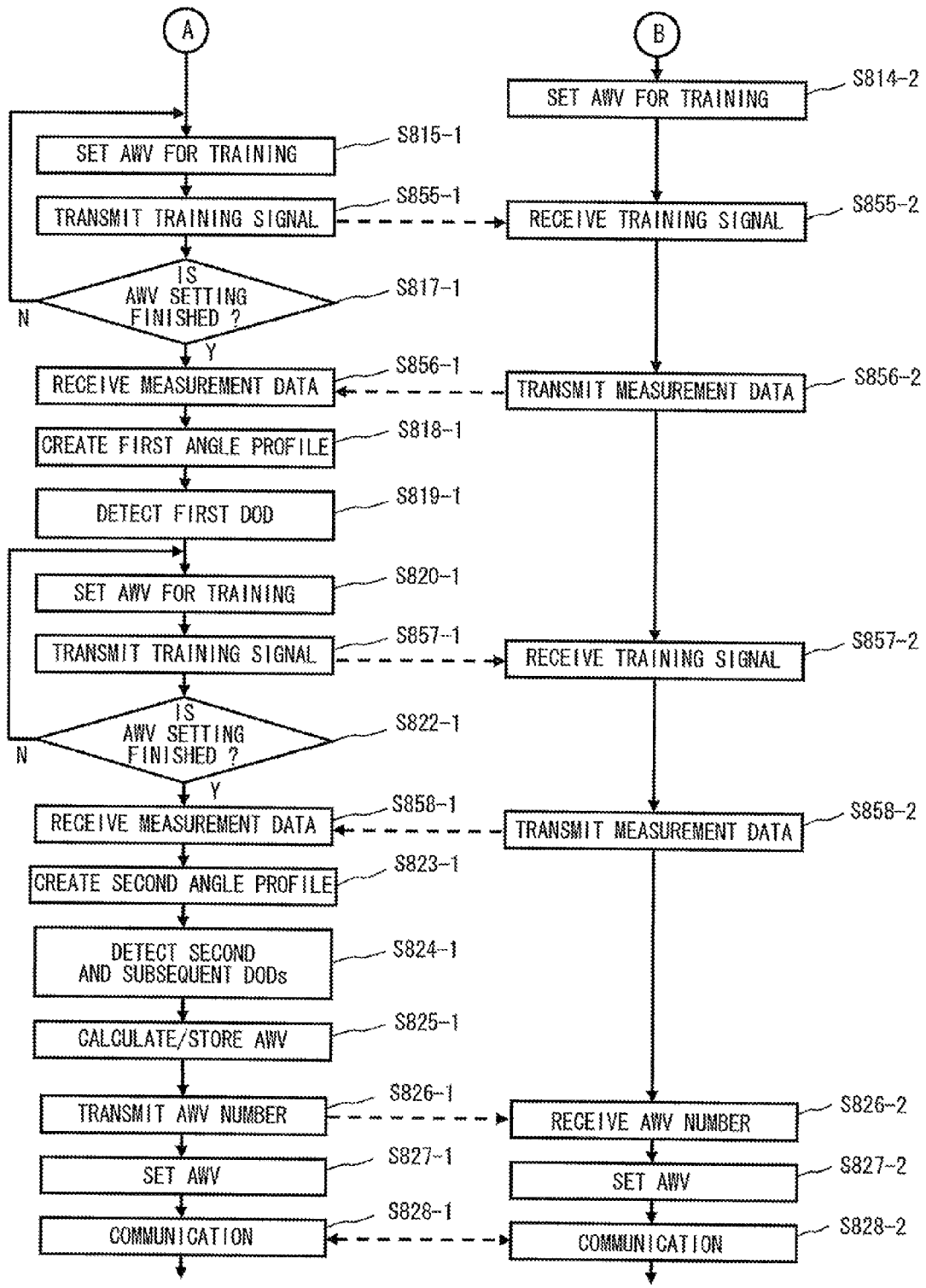
FIG. 24B is a sequence diagram illustrating operations of a transmitter and a receiver that are carried out before actual wireless communication in radio control procedure in accordance with a ninth exemplary embodiment of the present invention.

In the above exemplary embodiments, an angle profile is created in the initial training by transmitting training signals from one transceiver that generates a quasi-omni pattern and measuring received signals in the other transceiver while changing the AWV. However, it is also possible to create an angle profile by changing the AWV of one transceiver that transmits training signals while measuring received signals in the other transceiver that generates a quasi-omni pattern, and then feeding back the measured data to the former transceiver. FIGS. 24A and 24B show an example of a sequence diagram in a case like this.

In this case, the angle profile becomes a data string indicating a relation between the DODs and the received power of the signals. Further, processes to transmit received measurement data to the transceiver performing the training (S852-1, S852-2, S854-1, S854-2, S856-1, S856-2, S858-1, and S858-2) are incorporated.

Tenth Exemplary Embodiment

In the first exemplary embodiment, an assumption is made that the distance between the antenna array 405-1 to M of the transmitter 401 and the antenna array 411-1 to N of the receiver 402 in the transceiver 400 is negligible since it is considerably smaller than the distances of the propagation paths. Similarly, an assumption is also made that the distance between the antenna array 505-1 to K of the transmitter 501 and the antenna array 511-1 to L of the receiver 502 in the transceiver 500 is negligible since it is considerably smaller than the distances of the propagation paths. However, these assumptions on the distance between the transmission/reception antennas are unnecessary when the following procedure is performed.
(a) One of the transceivers (e.g., transceiver 400) is operated in a transmitting mode, and a quasi-omni pattern is set in its antenna array to transmit a training signal.
(b) The other transceiver (e.g., transceiver 500) is operated in a receiving mode, and a beam direction is scanned by changing the AWV of its antenna array.
(c) A data string describing a relation between the DOAs and the received-signal characteristic of the signal in the transceiver 500 is obtained based on the reception result of the training signal in the transceiver 500. These steps (b) and (c) are preformed twice in accordance with the method described above in the first exemplary embodiment. As mentioned in the first exemplary embodiment, the way of AWV setting in the second process is different from that in the first process.
(d) The transceiver 500 is operated in a receiving mode, and a quasi-omni pattern is set in its antenna array.
(e) The transceiver 400 is operated in a transmitting mode, and a beam direction is scanned by changing the AWV of its antenna array.
(f) The reception result of the training signal in the transceiver 500 performing the receiving operation is fed back to the transceiver 400 to obtain a data string describing a relation between the DODs of the signal in the transceiver 400 performing the transmitting operation and the received-signal characteristic in the opposed transceiver 500. These steps (e) and (f) are preformed twice in accordance with the method described above in the first exemplary embodiment. As mentioned in the first exemplary embodiment, the way of AWV setting in the second process is different from that in the first process.

By using the above-described result, it is possible to obtain a plurality of candidate AWV combinations for the transmitter of the transceiver 400 and the receiver of the transceiver 500. By performing the processes from (a) to (f) for the receiver of the transceiver 400 and the transmitter of the transceiver 500, it is possible to obtain a plurality of candidate AWV combinations for the receiver of the transceiver 400 and the transmitter of the transceiver 500.

Incidentally, in the above-described first exemplary embodiment, the main beam direction (main lobe direction) needs to be scanned in a state where the null point is fixed in the first DOA. A control method of an AWV for this purpose is explained hereinafter.

This control method is changed according to the hardware configuration of the transceivers 400 and 500. Specifically, the control method is changed according to whether the AWV control circuits 404-1 to M and 504-1 to M are circuits that control both the phases and the amplitudes of the signals or circuits that control only the phases of the signals. The former corresponds to, for example, a case where the control circuit is composed of serially-connected phase shifters and variable gain amplifiers, and the latter corresponds to a case where the control circuit is composed of phase shifters alone. Further, the AWV control method is also changed according to whether the above-described phase and amplitude are controlled in a continuous manner or in a discrete manner. With regard to the phase, the former corresponds to a case where analog phase shifters are used, and the latter corresponds to a case where digital phase shifters are used. Accordingly, the AWV control method is explained hereinafter for each of the conditions required in the respective hardware configurations. Note that for some of the conditions, two or more control methods may be shown for the same condition. A choice among those two or more control methods should be made based on conditions such as the antenna array characteristic, the propagation environment, or the processing speed of the process/arithmetic circuits 406 and 506, and they are not contrary to each other.

Further, in the fifth and sixth exemplary embodiments, the main beam direction (main lobe direction) needs to be scanned in a state where the null points are fixed in a plurality of DOAs. However, a method described below or a similar method is also applicable to those cases.

Eleventh Exemplary Embodiment

A control method in which both the phase and the amplitude of an AWV are controlled in a continuous manner is described hereinafter. Although the following explanation is made with an assumption that the antenna array is a regular-interval linear array, a similar concept is also applicable to other general cases such as non-regular-interval arrays and two-dimensional arrays.

In general, assuming that a desired complex signal of an antenna array output is b(t) and a complex signal of the antenna array output is y(t), the mean square error between them is defined by the following Formula (3):

$$\epsilon = E[e^2(t)] = E[(b(t)-y(t))^2] \quad (3)$$

where E[•] represents an expected value calculation.

Further, a complex vector of an antenna array input can be defined by Formula (4) shown below. In Formula (4), xi(t) (i=1, 2, ..., M) represents an input signal to each element of the antenna array. Therefore, the antenna array output can be expressed as Formula (5) shown below. In Formula (5), the superscript H represents a complex conjugate transposition.

$$\vec{X}(t) = [x_1(t), x_2(t), \ldots, x_M(t)]^T \quad (4)$$

$$y(t) = \vec{W}^H \vec{X}(t) \quad (5)$$

Furthermore, an autocorrelation matrix is defined by Formula (6) shown below. Further, a correlation vector between the desired signal and the input signal is defined by Formula (7) shown bellow. In Formula, the superscript * represents a complex conjugate.

$$R = E[\vec{X}(t)\vec{X}^H(t)] \quad (6)$$

$$\vec{r} = E[\vec{X}(t)b^*(t)] \quad (7)$$

Note that it has been known that an AWV with which the mean square error defined by Formula (3) is minimized is obtained by Formula (8) shown below. The AWV shown in Formula (8) is called "Wiener solution". Non-patent literatures 7 to 9, for example, disclose technical matters relating to the Wiener solution.

$$\vec{W}_{opt} = R^{-1}\vec{r} \quad (8)$$

Assume a situation where there is an undesired signal n(t) in addition to the desired signal b(t) and their signal directions are represented by $\theta_n$ and $\theta_b$ respectively. In this case, the complex vector of the antenna array input can be expressed as the following Formula (9).

$$\vec{X}(t) = b(t)\left[1, e^{-j\frac{2\pi d}{\lambda}\sin\theta_b}, \ldots, e^{-j(M-1)\frac{2\pi d}{\lambda}\sin\theta_b}\right]^T + \quad (9)$$

$$n(t)\left[1, e^{-j\frac{2\pi d}{\lambda}\sin\theta_n}, \ldots, e^{-j(M-1)\frac{2\pi d}{\lambda}\sin\theta_n}\right]^T$$

In this case, the (k, l) component (k, l=1, 2, ..., M) of the autocorrelation matrix shown in Formula (6) can be expressed by the following Formula (10):

$$R(k,l) = E[|b(t)|^2]\exp\left[-j(k-l)\frac{2\pi d}{\lambda}\sin\theta_b\right] + \quad (10)$$

$$E[|n(t)|^2]\exp\left[-j(k-l)\frac{2\pi d}{\lambda}\sin\theta_n\right]$$

where d represents the element interval of the antenna array and λ represents the wavelength of electromagnetic wave. Further, the correlation vector between the desired signal and the input signal shown in Formula (7) can be transformed into the following Formula (11).

$$\vec{r} = E[|b(t)|^2]\left[1, e^{-j\frac{2\pi d}{\lambda}\sin\theta_b}, e^{-j2\frac{2\pi d}{\lambda}\sin\theta_b}, \ldots, e^{-j(M-1)\frac{2\pi d}{\lambda}\sin\theta_b}\right]^T \quad (11)$$

The object here is to scan the main beam direction (main lobe direction) while fixing the null point in the first DOA. Assume a situation where, at this moment, a desired signal is coming from a certain direction and an undesired signal is coming from the first DOA. In this case, to minimize the mean square error given by Formula (3), the main beam should be pointed toward the desired signal direction and the null point should be pointed toward the first DOA. That is, by setting $\theta_n$ to the first DOA (fixed value) and $\theta_b$ to the main beam direction (variable), and calculating a Wiener solution given by Formulas (8), (10) and (11), a desired AWV can be obtained. In the calculation of Formulas (10) and (11), it is necessary to set the expected values $E[|b(t)|^2]$ and $E[|n(t)|^2]$ in advance. These values are used to determine priority weights for the main beam formation and the null point formation, and therefore appropriate values may be set to them while taking their priorities into consideration depending on the situation.

Figure 25:
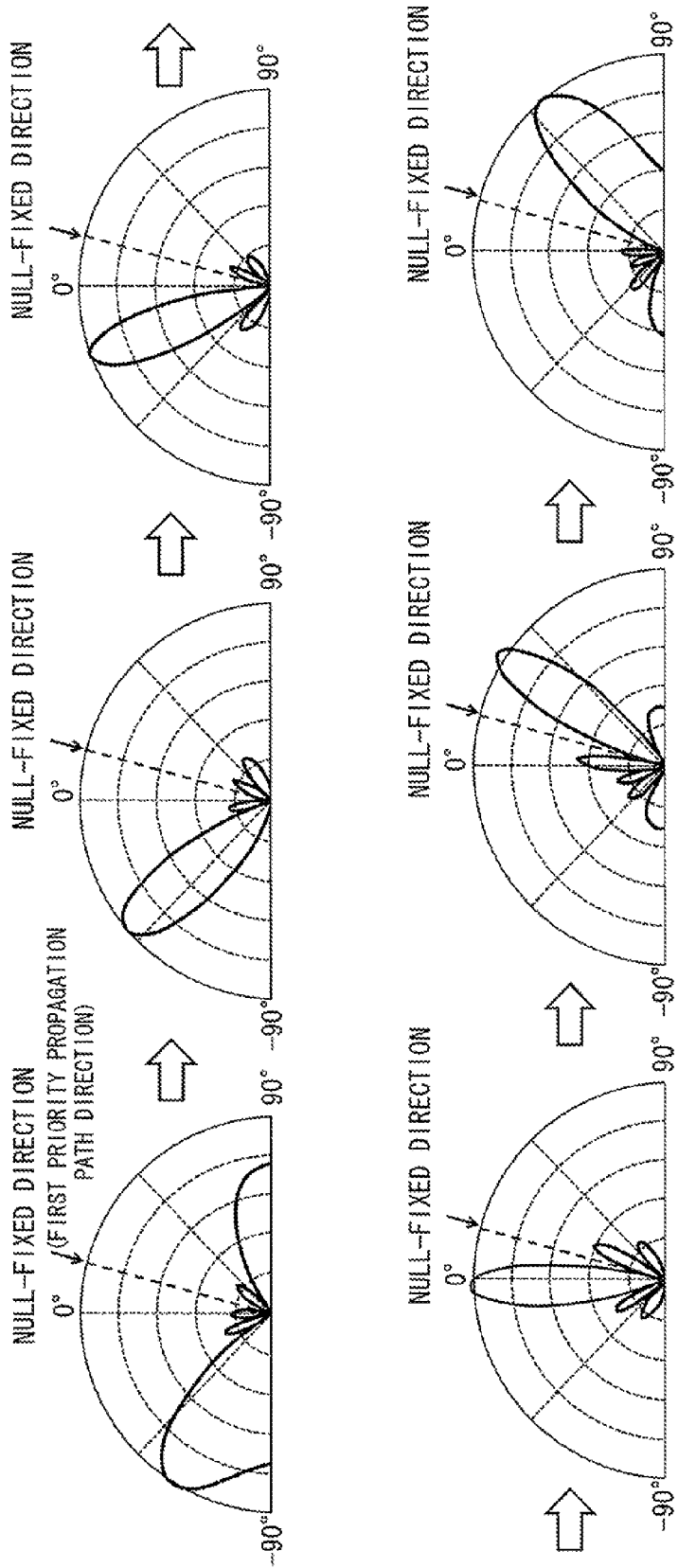
FIG. 25 show a calculation result of a radiating pattern when a main beam direction (main lobe direction) is scanned in a state where a null point is fixed in a first DOA in accordance with a eleventh exemplary embodiment of the present invention.

FIG. 25 shows calculation results of emitting patterns when the main beam direction (main lobe direction) is scanned while fixing the null point in the first DOA by determining an AWV based on the method in accordance with the above-described eleventh exemplary embodiment. In the calculation, a regular-interval linear array composed of six elements is assumed and the element interval of the antenna array is defined as d=λ/2. Further, the expected values are defined as $E[|b(t)|^2]=1.0$ and $E[|n(t)|^2]=0.1$. It can be seen that the function of the null-point-fixed main beam scanning has been excellently realized.

Twelfth Exemplary Embodiment

A control method in which both or either of the phase and the amplitude of an AWV are controlled in a continuous manner is described hereinafter. In this exemplary embodiment, firstly, an evaluation function composed of the electric field strength of a main beam direction $E_b(W)$, the electric field strength of a null point direction $E_n(W)$, the maximum electric field strength of all the side lobes except for those in and around the main beam direction $E_s(W)$, and the like is defined. The evaluation function is defined, for example, as a function of an AWV as shown as the following Formula (12).

$$f(\vec{W}) = k_b E_b(\vec{W}) + k_n E_n(\vec{W}) + k_s E_s(\vec{W}) \quad (12)$$

In the Formula, $k_b$, $k_n$ and $k_s$ are coefficients to define weights for contributions of their respective terms, and appropriate values may be set to them according to the propagation environment and the antenna array characteristics. If the coefficient $k_b$ is a positive value, the coefficients $k_n$ and $k_s$ should be typically negative values. With regard to the electric field strength of the side lobes, instead of the maximum value, the mean value of electric field strengths of a plurality of side lobes may be incorporated into the evaluation function. Next, an AWV with which the evaluation function is maximized (when $k_b$ is positive) may be obtained by numerical calculation.

Thirteenth Exemplary Embodiment

A control method in which both or either of the phase and the amplitude of an AWV are controlled in a discrete manner is described hereinafter. In this case, an emitting pattern of an antenna array is calculated for amplitude, phase, or their combination of each of all the discrete AWVs. Alternatively, the emitting patterns may be obtained by its alternative method. Then, the optimal AWV is determined while giving consideration to the electric field strength of the main beam, the depth of the null, the characteristics of all the side lobes except for those in and around the main beam direction, and the like. Note that the optimal AWV may be automatically determined by defining an evaluation function like the one described in the twelfth exemplary embodiment.

Fourteenth Exemplary Embodiment

A control method in which both the phase and the amplitude of an AWV are controlled in a discrete manner, or one of them is controlled in a discrete manner and the other is controlled in a continuous manner is described hereinafter. In this exemplary embodiment, an AWV is first calculated in accordance with the procedure described in the eleventh exemplary embodiment, and then its phase and amplitude are converted into discrete values according to the hardware configuration. For example, in a case where the phase is controlled in a discrete manner by using a two-bit (four-value) digital phase shifter, it may be converted into discrete values in such a manner that: when the Wiener solution is expressed as $-\pi/4 < \arg(W_{opt}) \leq \pi/4$, $\arg(W_{opt})=0$; when it is expressed as $\pi/4 < \arg(W_{opt}) \leq 3\pi/4$, $\arg(W_{opt})=\pi/2$; when it is expressed as $3\pi/4 < \arg(W_{opt}) \leq 5\pi/4$, $\arg(W_{opt})=\pi$; when it is expressed as $5\pi/4 < \arg(W_{opt}) \leq 7\pi/4$, $\arg(W_{opt})=3\pi/2$. This rule of the conversion into discrete values is merely an example, and other rules are also applicable. The amplitude can be also converted into discrete values in a similar manner. Note that both the phase and the amplitude may be converted into discrete values, or only one of them may be converted into discrete values. The method in accordance with this exemplary embodiment is equivalent to calculation in which an approximate solution is obtained by converting a Wiener solution into discrete values with appropriate accuracy.

Fifteenth Exemplary Embodiment

AWV control methods to scan the main beam direction (main lobe direction) while fixing the null point in the first DOA have been described in the eleventh to fourteenth exemplary embodiments. Those AWV calculations may be performed for every combination of the main beam direction and null direction that are converted into discrete values with a desired angular resolution or for each of some of them before the start of the initial training. Further, the calculation results may be stored in the storage circuits 408 and 508 or the like. Then, they may be called up in the initial training (e.g., the steps S608-2 and S620-1 in FIG. 18).

Sixteenth Exemplary Embodiment

Alternatively, they may be calculated in the initial training (e.g., the steps S608-2 and S620-1 in FIG. 18).

Incidentally, it is necessary to generate a quasi-omni pattern in the above-described first exemplary embodiment. A control method of an AWV for this purpose is explained hereinafter.

Seventeenth Exemplary Embodiment

A control method in which both or either of the phase and the amplitude of an AWV are controlled in a continuous manner is described hereinafter. In this exemplary embodiment, firstly, an evaluation function in which fluctuations in the electric field strength in regard to the emitting angle in a desired emitting angle range and the like are taken into consideration is defined. Next, an AWV with which the evaluation function is minimized (when the evaluation function is fluctuations in the electric field strength in regard to the emitting angle) may be obtained by numerical calculation.

Eighteenth Exemplary Embodiment

A control method in which both or either of the phase and the amplitude of an AWV are controlled in a discrete manner is described hereinafter. In this case, emitting patterns of an antenna array are calculated for discrete amplitude, phase, or their combination of each of all the AWVs. Alternatively, the emitting patterns are obtained by its alternative method. Then, the optimal AWV is determined while giving consideration to fluctuations in the electric field strength in regard to the emitting angle in a desired emitting angle range and the like. Note that the optimal AWV may be automatically determined by defining an evaluation function like the one described in the seventeenth exemplary embodiment.

Nineteenth Exemplary Embodiment

AWV control methods to generate a quasi-omni pattern have been described in the seventeenth and eighteenth exemplary embodiments. Those AWV calculations may be performed before the start of the initial training. Further, the calculation results may be stored in the storage circuits 408 and 508 or the like. Then, they may be called up in the initial training (e.g., the steps S602-1 and S614-2 in FIG. 18).

Incidentally, the term "communication quality" has been used in the above-described first to nineteenth exemplary embodiments. The communication quality may be any value representing communication quality such as a received-signal level, a Signal to Noise Ratio (SNR), a Bit Error Rate (BER), a Packet Error Rate (PER), and a Frame Error Rate (FER), and one or more than one of them may be used. Further, a certain data string in a preamble contained in a transmission data string of the transmitter 401 or transmitter 501 may be used for the evaluation of communication quality.

Furthermore, controls and arithmetic operations for the generation/switching of candidate AWVs that are performed in the transceivers 400 and 500 in the above-described first to tenth exemplary embodiments can be implemented by executing computer programs for transmitter/receiver controls in computers such as microprocessors. The program can be stored in various types of storage media, or can be transmitted through communication media. Note that examples of the storage media include a flexible disk, a hard disk, a magnetic disk, magneto-optic disk, a CD-ROM, a DVD, a ROM cartridge, a RAM memory cartridge with a battery backup, a flash memory cartridge, and a nonvolatile RAM cartridge. Further, examples of the communication media include a wire communication medium such as a telephone line, a wireless communication medium such as a microwave line, and the Internet.

For example, in the case of the first exemplary embodiment, the steps S602-1 to S627-1 in FIGS. 18A and 18B, and the steps S703-1 to S705-1 and S708-1 to S710-1 in FIG. 19 may be performed by a computer that executes the transmitter/receiver control program. Similarly, controls and arithmetic operations for the generation/switching of candidate AWVs that are performed in the transceiver 500 can be also implemented by executing computer programs for transmitter/receiver controls in computers such as microprocessors. For example, in the case of the first exemplary embodiment, the steps S603-2 to S627-2 in FIGS. 18A and 18B, and the steps S702-2 to S705-2 and S707-2 to S710-2 in FIG. 19 may be performed by a computer that executes the transmitter/receiver control program.

Further, in addition to the process/arithmetic circuits 406 and 506, parts of the transmitter circuits 403 and 503 (e.g., modulation process), parts of the receiver circuits 409 and 509 (e.g., demodulation process), digital signal processes of the control circuits 407 and 507 and the like, and other components relating to equipment controls may be implemented by a computer such as a microcomputer and a DSP (Digital Signal Processor). Furthermore, the so-called "software-antenna technology" may be applied to the transceivers 400 and 500. Specifically, the AWV control circuits 404-1 to M, 410-1 to N, 504-1 to K, and 510-1 to L may be constructed by digital filters, or a computer such as a DSP.

In the above explanation, situations where communication is performed between two transceivers are explained as examples. However, the present invention is applicable to other situations where three or more transceivers perform communication.

In the above explanation, the operation for the main beam direction and the creation of an angle profile and the like are implemented in a transceiver performing a receiving operation while a transceiver performing a transmitting operation generates a quasi-omni pattern. However, when the quasi-omni pattern generated in the transceiver cannot cover a sufficient directional range, the above-described procedure may be divided and performed at multiple stages. That is, after an angle profile is obtained by generating a certain quasi-omni pattern, another quasi-omni pattern covering a different directional range is generated and an angle profile is obtained again. Finally, the signal may be specified by using a plurality of obtained angle profiles. Note that the "sufficient directional range" means a directional range covering all the propagation paths used in the communication. Non-patent literature 5 discloses a method for covering a necessary angular range with a plurality of quasi-omni patterns in a manner like that.

Note that the invention described in Japanese Patent Application No. 2008-240156 (filed on Sep. 19, 2008) provides means to determine an AWV with ease in a short time under a propagation environment, or with the use of an antenna array, where the above-described side lobe effect does not pose any substantial problem. In contrast to this, although the invention in accordance with each of the above-described exemplary embodiments may require more complex procedure and longer processing time in comparison to those of Japanese Patent Application No. 2008-240156, it can provide means to determine an AWV with high accuracy even under conditions where the side lobe effect poses a substantial problem. Therefore, both of the inventions do not contrary to each other, but should be selectively used depending on the conditions.

The present invention is not limited to the above-described exemplary embodiments, and widely applicable to other embodiments to determine an AWV to be used in communication based on transmission/reception result of a training signal in wireless communication devices that perform beam forming like the ones disclosed in Patent literatures 4 and Non-patent literature 5.

Further, the following first to sixth examples are also included in the spirit of the present invention.

First Example

A control method of a wireless communication system in which a plurality of communication devices perform communication, each communication device including an antenna array and an array weight vector (hereinafter called "AWV") control circuit that changes at least one of amplitudes and phases of signals transmitted from or received by a plurality of antenna elements constituting the antenna array, the method, when an AWV of at least two antenna elements among the plurality of antenna elements constituting the antenna array are controlled, including:
(a) setting a fixed beam pattern in the antenna array of a first communication device among the plurality of communication devices and transmitting a training signal from the first communication device;
(b) receiving the training signal in a second communication device among the plurality of communication devices while scanning a beam direction by changing an AWV of the antenna array of the second communication device;
(c) obtaining a first data string representing a relation between signal directions of arrival (DOAs) and a received-signal characteristic in the second communication device based on a reception result of the training signal;
(d) determining an DOA in the second communication device (hereinafter called "first DOA") by using the first data string, and obtaining an AWV having a main beam direction or a sub-beam direction pointing to the first DOA;
(e) receiving the training signal in the second communication device while scanning a beam direction by changing an AWV of the antenna array of the second communication device in a state where a null direction or a direction close to the null direction is fixed in the first DOA;
(f) obtaining a second data string representing a relation between DOAs and a received-signal characteristic in the second communication device based on a reception result of the training signal;
(g) obtaining at least one AWV each having a main beam direction or a sub-beam direction pointing to respective one of at least one DOA in the second communication device that is determined by using the second data string;
(h) interchanging the transmitting operation and the receiving operation of the training signal performed by the first and second communication devices and performing the steps (a) to (g) to obtain an AWV having a main beam direction or a sub-beam direction pointing to the first DOA in the first communication device and at least one AWV each having a main beam direction or a sub-beam direction pointing to respective one of at least one DOA determined by using the second data string; and
(i) using a combination of an AWV from AWVs obtained in the steps (d) and (g) and an AWV from AWVs obtained in the step (h) in communication between the first and second communication devices.

Second Example

A control method of a wireless communication system in which a plurality of communication devices perform communication, each communication device including an antenna array and an array weight vector (hereinafter called "AWV") control circuit that changes at least one of amplitudes and phases of signals transmitted from or received by a plurality of antenna elements constituting the antenna array, the method, when an AWV of at least two antenna elements among the plurality of antenna elements constituting the antenna array are controlled, including:
(a) setting a fixed beam pattern in the antenna array of a first communication device among the plurality of communication devices and transmitting a training signal from the first communication device;
(b) receiving the training signal in a second communication device among the plurality of communication devices while scanning a beam direction by changing an AWV of the antenna array of the second communication device;
(c) obtaining a first data string representing a relation between signal directions of arrival (DOAs) and a received-signal characteristic in the second communication device based on a reception result of the training signal;
(d) determining an DOA in the second communication device (hereinafter called "first DOA") by using the first data string, and obtaining an AWV having a main beam direction or a sub-beam direction pointing to the first DOA;
(e) repeating following steps (e1) to (e3) from k=2 to required number;
(e1) receiving the training signal in the second communication device while scanning a beam direction by changing an AWV of the antenna array of the second communication device in a state where null directions or directions close to the null directions are fixed in the first to (k−1)th DOAs;
(e2) obtaining a kth data string representing a relation between DOAs and a received-signal characteristic in the second communication device based on a reception result of the training signal;
(e3) determining an DOA in the second communication device (hereinafter called "kth DOA) by using the kth data string, and obtaining an AWV having a main beam direction or a sub-beam direction pointing to the kth DOA;
(f) receiving the training signal in the second communication device while scanning a beam direction by changing an AWV of the antenna array of the second communication device in a state where null directions or directions close to the null directions are fixed in the first to kth DOAs;

(g) obtaining a (k+1)th data string representing a relation between DOAs and a received-signal characteristic in the second communication device based on a reception result of the training signal;

(h) obtaining at least one AWV each having a main beam direction or a sub-beam direction pointing to respective one of at least one DOA in the second communication device that is determined by using the (k+1)th data string;

(i) interchanging the transmitting operation and the receiving operation of the training signal performed by the first and second communication devices and performing the steps (a) to (h) to obtain AWVs each having a main beam direction or a sub-beam direction pointing to one of the first to kth DOAs in the first communication device and AWVs each having a main beam direction or a sub-beam direction pointing to one of at least one DOA determined by using the (k+1)th data string; and (j) using a combination an AWV form AWVs obtained in the steps (d), (e3) and (h) and an AWV from AWVs obtained in the step (i) in communication between the first and second communication devices.

Third Example

A control method of a wireless communication system in which a plurality of communication devices perform communication, each communication device including an antenna array and an array weight vector (hereinafter called "AWV") control circuit that changes at least one of amplitudes and phases of signals transmitted from or received by a plurality of antenna elements constituting the antenna array, the method, when an AWV of at least two antenna elements among the plurality of antenna elements constituting the antenna array are controlled, including:

(a) setting a fixed beam pattern in the antenna array of a first communication device among the plurality of communication devices and transmitting a training signal from the first communication device;

(b) receiving the training signal in a second communication device among the plurality of communication devices while scanning a beam direction by changing an AWV of the antenna array of the second communication device;

(c) obtaining a first data string representing a relation between signal directions of arrival (DOAs) and a received-signal characteristic in the second communication device based on a reception result of the training signal;

(d) determining DOAs in the second communication device (hereinafter called "first, second, . . . , and kth DOAs") of k signals (k is a natural number no less than 2) by using the first data string, and obtaining AWVs each having a main beam direction or a sub-beam direction pointing to respective one of the first, second, . . . , and kth DOAs;

(e) receiving the training signal in the second communication device while scanning a beam direction by changing an AWV of the antenna array of the second communication device in a state where null directions or directions close to the null directions are fixed in the first, second, . . . , and kth DOAs;

(f) obtaining a second data string representing a relation between DOAs and a received-signal characteristic in the second communication device based on a reception result of the training signal;

(g) obtaining at least one AWV each having a main beam direction or a sub-beam direction pointing to respective one of at least one DOA in the second communication device that is determined by using the second data string;

(h) interchanging the transmitting operation and the receiving operation of the training signal performed by the first and second communication devices and performing the steps (a) to (g) to obtain AWVs each having a main beam direction or a sub-beam direction pointing to respective one of the first to kth DOAs in the first communication device and at least one AWV each having a main beam direction or a sub-beam direction pointing to respective one of DOA determined by using the second data string; and (i) using a combination of an AWV from AWVs obtained in the steps (d) and (g) and an AWV from AWVs obtained in the step (h) in communication between the first and second communication devices.

Fourth Example

A control method of a wireless communication system in which a plurality of communication devices perform communication, each communication device including an antenna array and an array weight vector (AWV) control circuit that changes at least one of amplitudes and phases of signals transmitted from or received by a plurality of antenna elements constituting the antenna array, the method, when an AWV of at least two antenna elements among the plurality of antenna elements constituting the antenna array are controlled, including:

(a) operating a first communication device among the plurality of communication devices for reception and setting a fixed beam pattern in its antenna array;

(b) emitting a training signal by a second communication device among the plurality of communication devices while scanning a beam direction by changing an AWV of its antenna array;

(c) feeding back received signal data indicating a reception result of the training signal measured in the first communication device to the second communication device;

(d) obtaining a first data string representing a relation between \ signal directions of departure (DODs) in the second communication device and a received-signal characteristic in the first communication device based on the received signal data;

(e) determining an DOD in the second communication device (hereinafter called "first DOD") by using the first data string, and obtaining an AWV having a main beam direction or a sub-beam direction pointing to the first DOD;

(f) emitting a training signal while scanning a beam direction by changing an AWV of the antenna array of the second communication device in a state where a null direction or a direction close to the null direction is fixed in the first DOD;

(g) feeding back received signal data indicating a reception result of the training signal measured in the first communication device to the second communication device;

(h) obtaining a second data string representing a relation between DODs in the second communication device and a received-signal characteristic in the first communication device based on the received signal data;

(i) obtaining at least one AWV each having a main beam direction or a sub-beam direction pointing to respective one of at least one DOD determined by using the second data string;

(j) interchanging the transmitting operation and the receiving operation of the training signal performed by the first and second communication devices and performing the steps (a) to (i) to obtain at least one AWV each having a main beam direction or a sub-beam direction pointing to respective one of at least one DOD in the first communication device; and (k) using a combination of an AWV from AWVs obtained in the steps (e) and (i) and an AWV from AWVs obtained in the step (j) in communication between the first and second communication devices.

Fifth Example

A control method of a wireless communication system in which communication is performed between a first communication device including an antenna array and an array weight vector (AWV) control circuit that changes at least one of amplitudes and phases of signals transmitted from or received by a plurality of antenna elements constituting the antenna array and a second communication device using a fixed beam pattern, the method, when AWVs of at least two antenna elements among the plurality of antenna elements constituting the antenna array are controlled, including:

operating the first communication device for reception in a state where a training signal is being transmitted from the second communication device, and scanning a beam direction by changing an AWV of the antenna array;

obtaining a first data string representing a relation between signal directions of arrival (DOAs) and a received-signal characteristic in the first communication device based on a reception result of the training signal;

determining an DOA in the first communication device (hereinafter called "first DOA") by using the first data string, and obtaining an AWV having a main beam direction or a sub-beam direction pointing to the first DOA;

receiving the training signal in the first communication device while scanning a beam direction by changing an AWV of the antenna array of the first communication device in a state where a null direction or a direction close to the null direction is fixed in the first DOA;

obtaining a second data string representing a relation between DOAs and a received-signal characteristic in the first communication device based on a reception result of the training signal;

obtaining at least one AWV each having a main beam direction or a sub-beam direction pointing to respective one of at least one DOA in the first communication device that is determined by using the second data string; and using an AWV from AWVs obtained by using the first and second data strings in wireless communication between the first and second communication devices.

Sixth Example

A control method of a wireless communication system in which communication is performed between a first communication device including an antenna array and an array weight vector (AWV) control circuit that changes at least one of amplitudes and phases of signals transmitted from or received by a plurality of antenna elements constituting the antenna array and a second communication device using a fixed beam pattern, the method, when AWVs of at least two antenna elements among the plurality of antenna elements constituting the antenna array are controlled, including:

operating the first communication device for transmission in a state where the second communication device performing a receiving operation, and transmitting a training signal while scanning a beam direction by changing an AWV of the antenna array;

feeding back received signal data indicating a reception result of the training signal measured in the second communication device to the first communication device;

creating a first data string representing a relation between signal directions of departure (DOD) in the first communication device and a received-signal characteristic in the second communication device based on the received signal data;

determining an DOD in the first communication device (hereinafter called "first DOD") by using the first data string, and obtaining an AWV having a main beam direction or a sub-beam direction pointing to the first DOD;

emitting the training signal from the first communication device while scanning a beam direction by changing an AWV of the antenna array of the first communication device in a state where a null direction or a direction close to the null direction is fixed in the first DOD;

feeding back received signal data indicating a reception result of the training signal measured in the second communication device to the first communication device;

obtaining a second data string representing a relation between DODs in the first communication device and a received-signal characteristic in the first communication device based on a reception result of the training signal;

obtaining at least one AWV each having a main beam direction or a sub-beam direction pointing to respective one of at least one DOD determined by using the second data string; and using an AWV from AWVs obtained by using the first and second data strings in wireless communication between the first and second communication devices.

Further, the present invention is not limited to the above-described exemplary embodiments, and needless to say, various modifications can be made without departing from the above-described spirit of the present invention.

REFERENCE SIGNS LIST

| | |
|---|---|
| 400, 500 | TRANSCEIVER |
| 401, 801, 81, 91 | TRANSMITTER |
| 402, 502, 82, 92 | RECEIVER |
| 403, 503 | TRANSMITTER CIRCUIT |
| 404-1 to M, 504-1 to K | AWV (ARRAY WEIGHT VECTOR) CONTROL CIRCUIT |
| 405-1 to M, 505-1 to K | TRANSMITTING ANTENNA ARRAY |
| 406, 506 | PROCESS/ARITHMETIC CIRCUIT |
| 407, 507 | CONTROL CIRCUIT |
| 408, 508 | STORAGE CIRCUIT |
| 409, 509 | RECEIVER CIRCUIT |
| 410-1 to N, 510-1 to L | AWV (ARRAY WEIGHT VECTOR) CONTROL CIRCUIT |
| 411-1 to N, 511-1 to L | RECEIVING ANTENNAL ARRAY |
| 413, 513 | CONTROL CIRCUIT |
| 83 | BEAM PATTERN (IMAGE) |
| 84, 85 | REFLECTOR |
| 86 | HUMAN BODY |
| 61 | WALL |

The invention claimed is:

1. A control method of a wireless communication system comprising first and second communication devices,
the first communication device comprising:
an antenna array comprising a plurality of antenna elements; and
an array weight vector (AWV) control circuit that changes at least one of amplitudes and phases of transmission signals or received signals of the plurality of antenna elements, the control method comprising:

(a) transmitting a training signal between the first and second communication devices, the first communication device being configured to transmit or receive the training signal while scanning a beam pattern, and the second communication device being configured to receive or transmit the training signal with a fixed beam pattern;

(b) determining at least one primary direction of departure (DOD) or direction of arrival (DOA) in the first communication device based on a relation between DODs or DOAs of the training signal in the first communication device and a received signal characteristic of the training signal in the first or the second communication device;

(c) transmitting the training signal again between the first and second communication devices, the first communication device being configured to transmit or receive the training signal while scanning a beam pattern in a state where signal emission toward the at least one primary DOD or signal reception from the at least one primary DOA is restricted, and the second communication device being configured to receive or transmit the training signal with a fixed beam pattern;

(d) determining at least one secondary DOD or DOA based on a relation between DODs or DOAs of the training signal in the first communication device and a received signal characteristic of the training signal in the first or the second communication device obtained while restricting signal emission toward the at least one primary DOD or signal reception from the at least one primary DOA;

(e) obtaining at least one primary AWV each having a main beam direction or a sub-beam direction pointing to respective one of the at least one primary DOD or DOA and at least one secondary AWV each having a main beam direction or a sub-beam direction pointing to respective one of the at least one secondary DOD or DOA; and (f) selectively using the at least one primary AWV and the at least one secondary AWV in communication between the first and second communication devices.

2. The control method according to claim 1, wherein the second communication device comprises: an antenna array comprising a plurality of antenna elements; and an array weight vector (AWV) control circuit that changes at least one of amplitudes and phases of transmission signals or received signals of the plurality of antenna elements, the method further comprises (g) interchanging roles of the first and second communication devices and performing the steps (a) to (d), and obtaining at least one primary AWV each having a main beam direction or a sub-beam direction pointing to respective one of at least one primary DOD or DOA in the second communication device and at least one AWV each having a main beam direction or a sub-beam direction pointing to respective one of at least one secondary DOD or DOA, and the step (f) comprises using a combination of AWVs including an AWV obtained in the step (e) and an AWV obtained in the step (g) in communication between first and second communication devices.

3. The control method according to claim 1, wherein the at least one primary DOD or DOA includes only one DOD or DOA.

4. The control method according to claim 3, wherein the at least one primary DOD or DOA corresponds to a direction in which the reception signal characteristic is the best.

5. The control method according to claim 1, further comprising repeating the steps (c) to (e) for multiple times, wherein when a beam pattern is scanned in a second or subsequent repetition, in addition to restring signal emission toward the at least one primary DOD or signal reception from the at least one primary DOA, signal emission toward the at least one secondary DOD or signal reception from the at least one secondary DOA that is obtained until then is restricted.

6. The control method according to claim 5, wherein in the step (b), only one DOD or DOA in which the reception quality characteristic is the best is determined as the at least one primary DOD or DOA, and in each of the step (d) that is repeated for multiple times, only one DOD or DOA in which the reception quality characteristic is the best is determined as the at least one secondary DOD or DOA.

7. The control method according to claim 1, wherein the at least one primary DOD or DOA includes a plurality of DODs or DOAs, and the at least one secondary DOD or DOA includes a plurality of DODs or DOAs.

8. The control method according to claim 7, wherein the plurality of DODs or DOAs included in the at least one primary DOD or DOA are selected in a descending order of the reception quality characteristic.

9. The control method according to claim 1, wherein the fixed beam pattern is an omni pattern or a quasi-omni pattern.

10. The control method according to claim 1, wherein in the steps (a) and (c), the first communication device receives the training signal while scanning a beam pattern, and in the steps (b) and (d), the first communication device obtains a relation between DOAs of the training signal in the first communication device and a received signal characteristic of the training signal in the first communication device by using an DOA estimation algorithm.

11. The control method according to claim 2, wherein the combination of AWVs is determined by combining AWVs ranked at same places when AWVs obtained in each of the communication devices are arranged according to the received signal characteristic at the time of the training.

12. The control method according to claim 11, wherein priority order is assigned to AWV combinations obtained by the procedure recited in claim 11 in a descending order of the received signal characteristic, and wireless communication is performed by using an AWV combination that is selected according to this priority order.

13. The control method according to claim 12, wherein an AWV combination at a next rank is selected according to the priority order in response to deterioration in communication quality during communication, and wireless communication is performed by applying the selected AWV combination.

14. The control method according to claim 2, wherein communication quality of some of combinations of AWVs including an AWV obtained in the step (e) and an AWV obtained in the step (g) is measured, and at least one AWV combination to be used in communication is selected based on the measured communication quality.

15. The control method according to claim 14, wherein priority order is assigned to AWV combinations obtained by the procedure recited in claim 14 in a descending order of the communication quality, and wireless communication is performed by using an AWV combination that is selected according to this priority order.

16. The control method according to claim 15, wherein an AWV combination at a next rank is selected according to the priority order in response to deterioration in communication quality during communication, and wireless communication is performed by applying the selected AWV combination.

17. The control method according to claim 1, wherein the received signal characteristic includes at least one of a received power, a Signal to Noise Ratio (SNR), a Bit Error Rate (BER), a Packet Error Rate (PER), and a Frame Error Rate (FER).

18. The control method according to claim 1, wherein a first radio wave containing a signal that is mainly used for data communication, and a second radio wave having a smaller data transmission speed or a narrower transmission frequency band than that of the first radio wave are used; and the training signal is transmitted/received by using the second radio wave.

19. The control method according to claim 10, wherein the DOA estimation algorithm is a beam former method.

20. The control method according to claim 1, wherein the restricting signal emission toward the at least one primary DOD or signal reception from the at least one primary DOA is performed by changing an AWV of the antenna array and thereby fixing a null direction or a direction close to the null direction in the at least one primary DOD or DOA.

21. The control method according to claim 20, further comprising obtaining an AWV that is used to fix a null direction or a direction close to the null direction in the at least one primary DOD or DOA by calculating a Wiener solution.

22. The control method according to claim 21, wherein
the scanning that is performed in a state where a null direction or a direction close to the null direction is fixed in the at least one primary DOD or DOA is performed by changing at least one of amplitude and phase of an AWV of the antenna array in a discrete manner, and
the AWV that is changed in a discrete manner is obtained by changing at least one of an amplitude and a phase of the Wiener solution in a discrete manner.

23. The control method according to claim 20, wherein
the scanning that is performed in a state where a null direction or a direction close to the null direction is fixed in the at least one primary DOD or DOA is performed by changing at least one of amplitude and phase of an AWV of the antenna array in a continuous manner, and
the AWV that is changed in a continuous manner is obtained by optimization calculation using an evaluation function in which at least one of a main beam strength, a null depth, and a side-lobe level in a direction other than the main beam and null directions is taken into consideration.

24. The control method according to claim 20, wherein
the scanning that is performed in a state where a null direction or a direction close to the null direction is fixed in the at least one primary DOD or DOA is performed by changing at least one of amplitude and phase of an AWV of the antenna array in a discrete manner, and
the AWV that is changed in a discrete manner is obtained by obtaining an emitting pattern of an antenna array for each of discrete amplitudes, phases, or combinations thereof and determined from among emitting patterns in which at least one of a main beam strength, a null depth, and a side-lobe level in a direction other than the main beam and null directions is taken into consideration.

25. The control method according to claim 20, wherein the first communication device determines and stores AWVs in advance for each of combinations of main beam directions and null directions that are converted into discrete values with a desired angular resolution, and calls up and uses them during training or communication.

26. The control method according to claim 20, wherein the calculation to obtain an AWV is performed during training or during communication.

27. The control method according to claim 9, wherein when at least one of an amplitude and a phase of an AWV of the second communication device is changed in a continuous manner to set an omni or quasi-omni pattern in the second communication device, an evaluation function in which fluctuations in an electric field strength in regard to an emitting angle in a desired emitting angle range is taken into consideration is defined and an AWV is determined by optimization calculation.

28. The control method according to claim 9, wherein when at least one of an amplitude and a phase of an AWV of the second communication device is changed in a discrete manner to set an omni or quasi-omni pattern in the second communication device, an emitting pattern of an antenna array of the second communication device is obtained for each of discrete amplitudes, phases, or combinations thereof and an optimal AWV is determined from among the obtained emitting patterns while giving consideration to fluctuations in an electric field strength in regard to an emitting angle in a desired emitting angle range.

29. The control method according to claim 27, wherein AWVs are determined and stored in advance by the procedure recited in claim 27, and they are called up and used during training or during communication.

30. The control method according to claim 28, wherein AWVs are determined and stored in advance by the procedure recited in claim 28, and they are called up and used during training or during communication.

31. A wireless communication system comprising first and second communication devices,
the first communication device comprising: an antenna array including a plurality of antenna elements; and
an array weight vector (AWV) control circuit that changes at least one of amplitudes and phases of transmission signals or received signals of the plurality of antenna elements,
the first and second communication devices being configured to perform an AWV determination process in cooperation,
the AWV determination process comprising:
(a) transmitting a training signal between the first and second communication devices, the first communication device being configured to transmit or receive the training signal while scanning a beam pattern, and the second communication device being configured to receive or transmit the training signal with a fixed beam pattern;
(b) determining at least one primary direction of departure (DOD) or direction of arrival (DOA) in the first communication device based on a relation between DODs or DOAs of the training signal in the first communication device and a received signal characteristic of the training signal in the first or the second communication device;
(c) transmitting the training signal again between the first and second communication devices, the first communication device being configured to transmit or receive the training signal while scanning a beam pattern in a state where signal emission toward the at least one primary DOD or signal reception from the at least one primary DOA is restricted, and the second communication device being configured to receive or transmit the training signal with a fixed beam pattern;
(d) determining at least one secondary DOD or DOA based on a relation between DODs or DOAs of the training signal in the first communication device and a received signal characteristic of the training signal in the first or the second communication device obtained while restricting signal emission toward the at least one primary DOD or signal reception from the at least one primary DOA;

(e) obtaining at least one primary AWV each having a main beam direction or a sub-beam direction pointing to respective one of the at least one primary DOD or DOA and at least one secondary AWV each having a main beam direction or a sub-beam direction pointing to respective one of the at least one secondary DOD or DOA; and (f) selectively using the at least one primary AWV and the at least one secondary AWV in communication between the first and second communication devices.

32. The wireless communication system according to claim 31, wherein
the second communication device comprises: an antenna array comprising a plurality of antenna elements; and an array weight vector (AWV) control circuit that changes at least one of amplitudes and phases of transmission signals or received signals of the plurality of antenna elements,
the AWV determination process further comprises (g) interchanging roles of the first and second communication devices and performing the steps (a) to (d), and obtaining at least one primary AWV each having a main beam direction or a sub-beam direction pointed to respective one of at least one primary DOD or DOA in the second communication device and at least one AWV each having a main beam direction or a sub-beam direction pointed to respective one of at least one secondary DOD or DOA, and
the step (f) comprising using a combination of AWVs including an AWV obtained in the step (e) and an AWV obtained in the step (g) in communication between first and second communication devices.

33. The wireless communication system according to claim 31, wherein the at least one primary DOD or DOA includes only one DOD or DOA.

34. The wireless communication system to claim 33, wherein the at least one primary DOD or DOA corresponds to a direction in which the reception signal characteristic is the best.

35. The wireless communication system according to claim 31, wherein
the AWV determination process further comprises repeating the steps (c) to (e) for multiple times, and
when a beam pattern is scanned in a second or subsequent repetition, in addition to restring signal emission toward the at least one primary DOD or signal reception from the at least one primary DOA, signal emission toward the at least one secondary DOD or signal reception from the at least one secondary DOA that is obtained until then is restricted.

36. The wireless communication system according to claim 35, wherein
in the step (b), only one DOD or DOA in which the reception quality characteristic is the best is determined, as the at least one primary DOD or DOA, and
in each of the step (d) that is repeated for multiple times, only one DOD or DOA in which the reception quality characteristic is the best is determined as the at least one secondary DOD or DOA.

37. The wireless communication system according to claim 31, wherein the at least one primary DOD or DOA includes a plurality of DODs or DOAs, and
the at least one secondary DOD or DOA includes a plurality of DODs or DOAs.

38. The wireless communication system according to claim 37, wherein the plurality of DODs or DOAs included in the at least one primary DOD or DOA are selected in a descending order of the reception quality characteristic.

39. The wireless communication system according to claim 31, wherein the fixed beam pattern is an omni pattern or quasi-omni pattern.

40. The wireless communication system according to claim 31, wherein the first communication device is configured to:
receive the training signal while scanning a beam pattern; and
obtain a relation between DOAs of the training signal in the first communication device and a received signal characteristic of the training signal in the first communication device by using an DOA estimation algorithm.

41. The wireless communication system according to claim 32, wherein the combination of AWVs is determined by combining AWVs ranked at same places when AWVs obtained in each of the communication devices are arranged according to the received signal characteristic at the time of the training.

42. The wireless communication system according to claim 41, wherein the first and second communication devices assign priority order to AWV combinations in a descending order of the received signal characteristic, and perform wireless communication by using an AWV combination that is selected according to this priority order.

43. The wireless communication system according to claim 42, wherein the first and second communication devices select an AWV combination at a next rank according to the priority order in response to deterioration in communication quality during communication, and perform wireless communication by applying the selected AWV combination.

44. The wireless communication system according to claim 32, wherein the first and second communication devices measure communication quality of some of combinations of AWVs including an AWV obtained in the step (e) and an AWV obtained in the step (g), and select at least one AWV combination to be used in communication based on the measured communication quality.

45. The wireless communication system according to claim 44, wherein the first and second communication devices assigns priority order to AWV combinations in a descending order of the communication quality, and perform wireless communication by using an AWV combination that is selected according to this priority order.

46. The wireless communication system according to claim 45, wherein the first and second communication devices select an AWV combination at a next rank according to the priority order in response to deterioration in communication quality during communication, and perform wireless communication by applying the selected AWV combination.

47. The wireless communication system according to claim 31, wherein the received signal characteristic includes at least one of a received power, a Signal to Noise Ratio (SNR), a Bit Error Rate (BER), a Packet Error Rate (PER), and a Frame Error Rate (FER).

48. The wireless communication system according to claim 31, wherein the first and second communication devices are configured to use a first radio wave containing a signal that is mainly used for data communication and a second radio wave having a smaller data transmission speed or a narrower transmission frequency band than that of the first radio wave are used, and transmit/receive the training signal by using the second radio wave.

49. The wireless communication system according to claim 40, wherein the DOA estimation algorithm is a beam former method.

50. The wireless communication system according to claim 31, wherein the restricting signal emission toward the at least one primary DOD or signal reception from the at least one primary DOA is performed by changing an AWV of the antenna array and thereby fixing a null direction or a direction close to the null direction inthe at least one primary DOD or DOA.

51. An AWV adjustment method for a wireless communication device comprising an antenna array, and an array weight vector (hereinafter called "AWV") control circuit that changes at least one of amplitudes and phases of signals received by a plurality of antenna elements constituting the antenna array,
the AWV adjustment method comprising:
(a) receiving a training signal transmitted from a device to be communicated with while scanning a beam direction of the antenna array in the wireless communication device;
(b) determining at least one primary direction of arrival (hereinafter called "first DOA") based on a reception result of the training signal in the wireless communication device;
(c) receiving the training signal while scanning a beam direction of the antenna array in a state where signal reception from the first DOA is restricted in the wireless communication device;
(d) determining at least another direction of arrival (hereinafter called "second DOA") different from the first DOA in the wireless communication device based on a reception result of the training signal obtained while restricting signal reception from the first DOA;
(e) obtaining an AWV having a main beam direction or a sub-beam direction pointing to the first DOA and an AWV having a main beam direction or a sub-beam direction pointing to the second DOA; and
(f) using the AWV obtained in the step (e) in communication with the device to be communicated with.

52. The AWV adjustment method according to claim 51, wherein the step (e) is performed in the wireless communication device or in the device to be communicated with.

53. A wireless communication device comprising:
an antenna array;
an array weight vector (hereinafter called "AWV") control unit that changes at least one of amplitudes and phases of signals received by a plurality of antenna elements constituting the antenna array;
a processing unit that determines an AWV to be used in communication with a device to be communicated with, and supplies the determined AWV to the AWV control unit; and
a receiving unit that performs a demodulation process on a signal received by the antenna array,
wherein the processing unit:
determines at least one primary direction of arrival (hereinafter called "first DOA") based on a reception result of a training signal being transmitted by the device to be communicated with and received by the receiving unit while scanning a beam direction of the antenna array;
determines at least another direction of arrival (hereinafter called "second DOA") different from the first DOA based on a reception result of the training signal being received by the receiving unit while scanning a beam direction of the antenna array in a state where signal reception from the first DOA is restricted; and
obtains an AWV having a main beam direction or a sub-beam direction pointing to the first DOA and an AWV having a main beam direction or a sub-beam direction pointing to the second DOA in order to supply the obtained AWVs to the AWV control unit.

54. The wireless communication device according to claim 53, wherein the restriction of signal reception from the first DOA is performed by using a directional pattern in which a null direction or a direction close to the null direction is fixed in the first DOA.

55. A wireless communication device comprising:
an antenna array;
an array weight vector (hereinafter called "AWV") control unit that changes at least one of amplitudes and phases of signals transmitted by a plurality of antenna elements constituting the antenna array;
a processing unit that determines an AWV to be used in communication with a device to be communicated with, and supplies the determined AWV to the AWV control unit; and
a transmitting unit that generates a transmission signal to be transmitted from the antenna array,
wherein the processing unit:
determines at least one primary direction of departure (hereinafter called "first DOD") based on a result of wireless transmission of a training signal being generated by the transmission unit while scanning a beam direction of the antenna array;
determines at least another direction of departure (hereinafter called "second DOD") different from the first DOD based on a result of wireless transmission of the training signal while scanning a beam direction of the antenna array in a state where signal emission to the first DOD is restricted; and
obtains an AWV having a main beam direction or a sub-beam direction pointing to the first DOD and an AWV having a main beam direction or a sub-beam direction pointing to the second DOD in order to supply the obtained AWVs to the AWV control unit.

* * * * *